(12) United States Patent
Wahadaniah et al.

(10) Patent No.: US 11,115,677 B2
(45) Date of Patent: *Sep. 7, 2021

(54) IMAGE CODING METHOD, IMAGE DECODING METHOD, IMAGE CODING APPARATUS, AND IMAGE DECODING APPARATUS

(71) Applicant: Sun Patent Trust, New York, NY (US)

(72) Inventors: Viktor Wahadaniah, Singapore (SG); Chong Soon Lim, Singapore (SG); Sue Mon Thet Naing, San Jose, CA (US); Hai Wei Sun, Singapore (SG); Takahiro Nishi, Nara (JP); Hisao Sasai, Osaka (JP); Youji Shibahara, Tokyo (JP); Kyoko Tanikawa, Osaka (JP); Toshiyasu Sugio, Osaka (JP); Kengo Terada, Osaka (JP); Toru Matsunobu, Osaka (JP)

(73) Assignee: SUN PATENT TRUST, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/813,994

(22) Filed: Mar. 10, 2020

(65) Prior Publication Data

US 2020/0213614 A1    Jul. 2, 2020

Related U.S. Application Data

(60) Continuation of application No. 16/399,437, filed on Apr. 30, 2019, now Pat. No. 10,631,004, which is a
(Continued)

(51) Int. Cl.
*H04N 19/527* (2014.01)
*H04N 19/52* (2014.01)
(Continued)

(52) U.S. Cl.
CPC ......... *H04N 19/527* (2014.11); *H04N 19/513* (2014.11); *H04N 19/52* (2014.11); *H04N 19/58* (2014.11)

(58) Field of Classification Search
CPC .... H04N 19/527; H04N 19/513; H04N 19/52; H04N 19/58
(Continued)

(56) References Cited

U.S. PATENT DOCUMENTS 6,160,920 A    12/2000  Shyu
7,394,853 B2   7/2008   Kondo et al.
(Continued)

FOREIGN PATENT DOCUMENTS

CN    1413017    4/2003
CN    1585487    2/2005
(Continued)

OTHER PUBLICATIONS

"Information technology—Coding of audio-visual objects", ISO/IEC 14496-10 (MPEG-4 Part 10: Advanced Video Coding), Oct. 1, 2004.
(Continued)

*Primary Examiner* — On S Mung
(74) *Attorney, Agent, or Firm* — Wenderoth, Lind & Ponack, L.L.P.

(57) ABSTRACT

An image coding method includes: deriving a candidate for a motion vector of a current block from a co-located motion vector; adding the candidate to a list; selecting the motion vector of the current block from the list; and coding the current block, wherein the deriving includes: deriving the candidate by a first derivation scheme in the case of determining that each of a current reference picture and a co-located reference picture is a long-term reference picture; and deriving the candidate by a second derivation scheme in
(Continued)

the case of determining that each of the current reference picture and the co-located reference picture is a short-term reference picture.

1 Claim, 35 Drawing Sheets

Related U.S. Application Data continuation of application No. 14/074,179, filed on Nov. 7, 2013, now Pat. No. 10,321,152, which is a division of application No. 13/660,245, filed on Oct. 25, 2012, now Pat. No. 8,913,665.

(60) Provisional application No. 61/552,848, filed on Oct. 28, 2011.

(51) Int. Cl.
   H04N 19/513 (2014.01)
   H04N 19/58 (2014.01)
(58) Field of Classification Search
   USPC .................................................. 375/240.16
   See application file for complete search history.

(56) References Cited

U.S. PATENT DOCUMENTS

| | | |
|---|---|---|
| 7,542,510 B2 | 6/2009 | Kadono et al. |
| 7,848,411 B2 | 12/2010 | Kadono et al. |
| 8,014,566 B2 | 9/2011 | Ogawa |
| 8,131,095 B2 | 3/2012 | Larrieu et al. |
| 8,155,200 B2 | 4/2012 | Kondo et al. |
| 8,155,201 B2 | 4/2012 | Kondo et al. |
| 8,160,147 B2 | 4/2012 | Kondo et al. |
| 8,160,299 B2 | 4/2012 | Ogawa |
| 8,179,968 B2 | 5/2012 | Kondo et al. |
| 8,194,745 B2 | 6/2012 | Kondo et al. |
| 8,204,119 B2 | 6/2012 | Kadono et al. |
| 8,213,510 B2 | 7/2012 | Kondo et al. |
| 8,249,147 B2 | 8/2012 | Watanabe et al. |
| 8,553,770 B2 | 10/2013 | Kadono et al. |
| 8,582,651 B2 | 11/2013 | Jeon |
| 8,665,961 B2 | 3/2014 | Kondo et al. |
| 8,861,606 B2 | 10/2014 | Wahadaniah et al. |
| 8,885,713 B2 | 11/2014 | Kadono et al. |
| 9,020,034 B2 | 4/2015 | Kondo et al. |
| 9,020,035 B2 | 4/2015 | Kondo et al. |
| 9,020,036 B2 | 4/2015 | Kondo et al. |
| 9,020,037 B2 | 4/2015 | Kondo et al. |
| 9,031,132 B2 | 5/2015 | Kondo et al. |
| 9,118,930 B2 | 8/2015 | Kondo et al. |
| 9,204,163 B2 | 12/2015 | Kim et al. |
| 9,357,227 B2 | 5/2016 | Wahadaniah et al. |
| 9,420,286 B2 | 8/2016 | Chen et al. |
| 9,491,461 B2 | 11/2016 | Chen et al. |
| 9,641,862 B2 | 5/2017 | Hannuksela |
| 9,686,555 B2 | 6/2017 | Song et al. |
| 9,992,511 B2 | 6/2018 | Bici et al. |
| 2003/0067560 A1 | 4/2003 | Suzuki |
| 2003/0123738 A1 | 7/2003 | Frojdh et al. |
| 2003/0202605 A1 | 10/2003 | Hazra et al. |
| 2003/0206589 A1 | 11/2003 | Jeon |
| 2004/0013308 A1 | 1/2004 | Jeon et al. |
| 2004/0156552 A1 | 8/2004 | Larrieu et al. |
| 2004/0218674 A1 | 11/2004 | Kondo et al. |
| 2004/0234143 A1 | 11/2004 | Hagai |
| 2004/0247031 A1 | 12/2004 | Hagai |
| 2004/0252764 A1 | 12/2004 | Hur et al. |
| 2005/0047506 A1 | 3/2005 | Kadono et al. |
| 2005/0129116 A1 | 6/2005 | Jeon |
| 2005/0129117 A1 | 6/2005 | Jeon |
| 2005/0141612 A1 | 6/2005 | Abe et al. |
| 2006/0262981 A1 | 11/2006 | Jeon et al. |
| 2006/0291556 A1 | 12/2006 | Watanabe et al. |
| 2006/0291562 A1 | 12/2006 | Lee et al. |
| 2007/0014357 A1 | 1/2007 | Jeon |
| 2007/0071088 A1 | 3/2007 | Lee et al. |
| 2007/0076795 A1 | 4/2007 | Lee |
| 2007/0098073 A1 | 5/2007 | Maeda |
| 2007/0127773 A1 | 6/2007 | Ogawa |
| 2008/0037636 A1 | 2/2008 | Jeon et al. |
| 2008/0037645 A1 | 2/2008 | Jeon et al. |
| 2008/0037646 A1 | 2/2008 | Jeon et al. |
| 2008/0037885 A1 | 2/2008 | Jeon et al. |
| 2008/0037886 A1 | 2/2008 | Jeon et al. |
| 2008/0043849 A1 | 2/2008 | Jeon et al. |
| 2008/0044093 A1 | 2/2008 | Jeon et al. |
| 2008/0044094 A1 | 2/2008 | Jeon et al. |
| 2008/0063077 A1 | 3/2008 | Kondo et al. |
| 2008/0069235 A1 | 3/2008 | Abe et al. |
| 2008/0069236 A1 | 3/2008 | Kondo et al. |
| 2008/0069237 A1 | 3/2008 | Kondo et al. |
| 2008/0084931 A1 | 4/2008 | Kondo et al. |
| 2008/0089416 A1 | 4/2008 | Jeon |
| 2008/0117979 A1 | 5/2008 | Kondo et al. |
| 2008/0187049 A1 | 8/2008 | Tokumitsu et al. |
| 2008/0260035 A1 | 10/2008 | Kondo et al. |
| 2008/0304761 A1 | 12/2008 | Larrieu et al. |
| 2009/0110072 A1 | 4/2009 | Kadono et al. |
| 2009/0132782 A1 | 5/2009 | Jeffrey |
| 2009/0323801 A1 | 12/2009 | Imajou |
| 2010/0266011 A1 | 10/2010 | Kadono et al. |
| 2010/0266042 A1 | 10/2010 | Koo |
| 2011/0080949 A1 | 4/2011 | Takahashi et al. |
| 2011/0090957 A1 | 4/2011 | Liao et al. |
| 2011/0103475 A1 | 5/2011 | Alshina et al. |
| 2011/0164684 A1 | 7/2011 | Sato et al. |
| 2011/0176612 A1 | 7/2011 | Tsai et al. |
| 2011/0176613 A1 | 7/2011 | Tsai et al. |
| 2011/0199513 A1 | 8/2011 | Ogawa |
| 2011/0317930 A1 | 12/2011 | Kim et al. |
| 2012/0147957 A1 | 6/2012 | Alshina et al. |
| 2012/0275520 A1 | 11/2012 | Kondo et al. |
| 2012/0287996 A1 | 11/2012 | Kadono et al. |
| 2013/0022127 A1 | 1/2013 | Park |
| 2013/0077677 A1 | 3/2013 | Wang et al. |
| 2013/0077686 A1 | 3/2013 | Alshina et al. |
| 2013/0083849 A1 | 4/2013 | Alshina et al. |
| 2013/0083850 A1 | 4/2013 | Alshina et al. |
| 2013/0156108 A1 | 6/2013 | Jeon et al. |
| 2013/0163672 A1 | 6/2013 | Jeon et al. |
| 2013/0188721 A1 | 7/2013 | Jeong et al. |
| 2013/0188722 A1 | 7/2013 | Jeon et al. |
| 2013/0195192 A1 | 8/2013 | Jeon et al. |
| 2013/0202045 A1 | 8/2013 | Jeon et al. |
| 2013/0202046 A1 | 8/2013 | Jeon et al. |
| 2013/0208800 A1 | 8/2013 | Jeon et al. |
| 2013/0208993 A1 | 8/2013 | Jeon et al. |
| 2013/0279819 A1 | 10/2013 | Kim et al. |
| 2014/0010298 A1 | 1/2014 | Kadono et al. |
| 2014/0044172 A1 | 2/2014 | Kondo et al. |
| 2014/0044173 A1 | 2/2014 | Kondo et al. |
| 2014/0044182 A1 | 2/2014 | Kondo et al. |
| 2014/0044183 A1 | 2/2014 | Kondo et al. |
| 2014/0044184 A1 | 2/2014 | Kondo et al. |
| 2014/0044185 A1 | 2/2014 | Kondo et al. |
| 2014/0072042 A1 | 3/2014 | Jeon |
| 2014/0072044 A1 | 3/2014 | Jeon |
| 2014/0072050 A1 | 3/2014 | Jeon |
| 2014/0072052 A1 | 3/2014 | Jeon |
| 2014/0072054 A1 | 3/2014 | Jeon |
| 2014/0098876 A1 | 4/2014 | Jeon |
| 2014/0105287 A1 | 4/2014 | Alshina et al. |
| 2014/0105296 A1 | 4/2014 | Alshina et al. |
| 2014/0105297 A1 | 4/2014 | Jeon et al. |
| 2014/0105300 A1 | 4/2014 | Jeon |
| 2014/0105301 A1 | 4/2014 | Jeon |
| 2014/0177715 A1 | 6/2014 | Jeon |
| 2014/0177719 A1 | 6/2014 | Jeon |
| 2014/0198849 A1 | 7/2014 | Jeon |
| 2015/0016525 A1 | 1/2015 | Alshina et al. |
| 2015/0030077 A1 | 1/2015 | Jeon et al. |

(56) References Cited

U.S. PATENT DOCUMENTS

| | | | |
|---|---|---|---|
| 2015/0030078 A1 | 1/2015 | Jeon et al. |
| 2015/0030079 A1 | 1/2015 | Jeon et al. |
| 2015/0030080 A1 | 1/2015 | Jeon et al. |
| 2015/0036746 A1 | 2/2015 | Kadono et al. |
| 2015/0049808 A1 | 2/2015 | Jeon |
| 2015/0049809 A1 | 2/2015 | Jeon |
| 2015/0049810 A1 | 2/2015 | Jeon |
| 2015/0049811 A1 | 2/2015 | Jeon |
| 2015/0222922 A1 | 8/2015 | Tsai et al. |
| 2015/0256847 A1 | 9/2015 | Kim et al. |
| 2015/0256848 A1 | 9/2015 | Kim et al. |
| 2015/0256849 A1 | 9/2015 | Kim et al. |
| 2015/0326879 A1 | 11/2015 | Alshina et al. |
| 2016/0014427 A1 | 1/2016 | Jeon |
| 2016/0219300 A1 | 7/2016 | Jeon |
| 2016/0241870 A1 | 8/2016 | Sugio et al. |

FOREIGN PATENT DOCUMENTS

| | | |
|---|---|---|
| CN | 1633812 | 6/2005 |
| CN | 1965582 | 5/2007 |
| CN | 101005614 | 7/2007 |
| CN | 102036066 | 4/2011 |
| CN | 102045557 | 5/2011 |
| CN | 102131094 | 7/2011 |
| CN | 102160384 | 8/2011 |
| EP | 2 290 991 | 3/2011 |
| JP | 2003-333602 | 11/2003 |
| JP | 2004-215215 | 7/2004 |
| JP | 2008-199653 | 8/2008 |
| KR | 20030088543 | 11/2003 |
| RU | 2 335 859 | 10/2008 |
| RU | 2 360 375 | 6/2009 |
| TW | I280781 | 5/2007 |
| TW | I323614 | 4/2010 |
| TW | I326188 | 6/2010 |
| TW | I328357 | 8/2010 |
| TW | I328969 | 8/2010 |
| TW | I334729 | 12/2010 |
| WO | 2010/002214 | 1/2010 |
| WO | 2010/085064 | 7/2010 |

OTHER PUBLICATIONS

International Search Report dated Dec. 4, 2012 in corresponding International Application No. PCT/JP2012/006674.
Rickard Sjöberg and Jonatan Samuelsson, "Absolute signaling of reference pictures", Joint Collaborative Team on Video Coding (JCT-VC) of ITU-T SG16 WP3 and ISO/IEC JTC1/SC9/WG11 6th Meeting: Torino, Document: JCTVC-F493, ITU-T, Jul. 2011.
Benjamin Bross et al., "WD4: Working Draft 4 of High-Efficiency Video Coding", Joint Collaborative Team on Video Coding (JCT-VC) of ITU-T SG16 WP3 and ISO/IEC JTC1/SC29/WG11, JCTVC-F803_d4, Ver. 5, 6th Meeting: Torino, IT, Jul. 14-22, 2011.
International Search Report dated Dec. 4, 2012 in corresponding International Application No. PCT/JP2012/006651.
International Search Report dated Dec. 4, 2012 in corresponding International Application No. PCT/JP2012/006684.
Joel Jung et al., "Competition-Based Scheme for Motion Vector Selection and Coding", ITU-Telecommunications Standardization Sector Study Group 16 Question 6 Video Coding Experts Group (VCEG) 29th Meeting: Klagenfurt, Austria, Document VCEG-AC06, ITU-T, Jul. 2006.
Office Action dated Feb. 26, 2014 in U.S. Appl. No. 13/660,245.
Jian-Liang Lin et al., "Improved Advanced Motion Vector Prediction", Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document: JCTVC-D125, XP030008165.
Joonyoung Park et al., "Improvements on median motion vectors of AMVP", Joint Collaborative Team on Video Coding (JCT-VC) of ITU-T SG16 WP3 and ISO/IEC JTC1/SC29/WG11, 4th Meeting: Daegu, KR, Jan. 20-28, 2011, Document: JCTVC-D095, XP030008135.

Guillaume Laroche et al., "RD Optimized Coding for Motion Vector Predictor Selection", IEEE Transactions on Circuits and Systems For Video Technology, IEEE Service Center, Piscataway, NJ, US, vol. 18, No. 9, Sep. 1, 2008, pp. 1247-1257, XP011231739, ISSN: 1051-8215, DOI: 10.1109/TCSCT.2008.928882.
Alexis M. Tourapis et al., "Motion Vector Prediction With Reference Frame Consideration", Proceedings of SPIE, SPIE-International Society for Optical Engineering, US, vol. 5203, Jan. 1, 2003, pp. 440-447, XP002550052, ISSN: 0277-786X, DOI: 10.1117/12.507858.
Chong Soon Levi et al., "High-level Syntax: MW scaling issue for LTRPs", Joint Collaborative Team on Video Coding (JCT-VC) of ITU-T SG16 WP3 and ISO/IEC JTC1/SC29/WG11, 9th Meeting: Geneva, CH, Apr. 27-May 7, 2012, Document: JCTVC-I0422, XP030112185.
Yoshitomo Takahashi et al., "High-level Syntax: Motion vector prediction issue for long-term reference picture", Joint Collaborative Team on Video Coding (JCT-VC) of ITU-T SG16 WP3 and ISO/IEC HTC1/SC29/WG11, 10th Meeting: Stockholm, SE, Jul. 11-20, 2012, Document: JCTVC-J0071, XP030112433.
Ying Chen et al., "AHG10: Motion related hooks for HEVC multiview/3DV extension based on long-term reference pictures", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, Document: JCTVC-J0121, XP030112483.
Extended European Search Report dated Mar. 18, 2015 for the European Patent Application No. 12843874.4.
Extended European Search Report dated Mar. 18, 2015 for the European Patent Application No. 12842944.6.
Extended European Search Report dated Mar. 18, 2015 for the European Patent Application No. 12844046.8.
Yunfei Zheng et al., "Unified Motion Vector Predictor Selection for Merge and AMVP", Joint Collaborative Team on Video Coding (JCT-VC) of ITU-T SG16 WP3 and ISO/IEC JTC1/SC29/WG11, 5th Meeting: Geneva, Mar. 16-23, 2011, Document: JCTVC-E396, XP030008902.
Il-Koo Kim et al., "Restriction on motion vector scaling for Merge and AMVP", Joint Collaborative Team on Video Coding (JCT-VC) of ITU-T SG16 WP3 and ISO/IEC JTC1/SC29/WG11, 7th Meeting: Geneva, CH, Nov. 21-30, 2011, Document: JCTVC-G551, XP030110535.
Il-Koo Kim et al., "Restricted usage of motion vectors for long-term reference picture in motion vector prediction process", Joint Collaborative Team on Video Coding (JCT-VC) of ITU-T SG16 WP3 and ISO/IEC JTC1/SC29/WG11, 10th Meeting: Stockholm, SE, Jul. 11-20, 2012, Document: JCTVC-J0302, XP030112664.
Office Action dated Apr. 28, 2015 in corresponding Mexican Patent Application No. MX/a/2014/013718 (with English translation).
Office Action dated Sep. 16, 2015 in corresponding Taiwanese Application No. 101139467, with English translation of Search Report.
Joch, "Comments on JVR-E22d7", Joint Video Team (JCT) of ISO/IEC MPEG & ITU-T VCEG (ISO/IEC JTC1/SC29/WG11 and ITU-T SG16 Q.6), 5th Meeting: Geneva, CH, Oct. 9-17, 2002; JVT-E135r1, XP030005550, ISSN: 0000-0430.
Wiegand, "Editor's Proposed Draft Text Modifications for Joint Video Specification (ITU-T Rec. H.264 ISO/IEC 14496-10 AVC), Draft 7", Joint Video Team (JVT) of ISO/IEC MPEG and ITU-T VCEG, 5th Meeting: Geneva, Switzerland, Oct. 9-17, 2002: JVT-E022d7, XP030005439, ISSN:0000-0438.
Office Action dated Sep. 16, 2016 in European Patent Application No. 12843874.4.
Decision on Grant dated Sep. 22, 2016 in Russian Patent Application No. 2013147415, with English translation.
Yin et al., "Unification of Motion Vector Prediction Methods", Joint Video Team (JVT) of ISO/IEC MPEG & ITU-T VCEG (ISO/IEC JTC1/SC29/WG11 and ITU-T SG16 Q.6), 5th Meeting: Geneva, Switzerland, Oct. 9-17, 2002, JVT-E061r1, XP030005478.
Office Action dated Oct. 24, 2016 in U.S. Appl. No. 15/140,673.
Office Action dated May 9, 2017 in European Patent Application No. 12 843 874.4.
Office Action dated Jun. 28, 2017 in U.S. Appl. No. 15/606,615.

(56) References Cited

OTHER PUBLICATIONS

Office Action dated Oct. 10, 2017 for European Patent Application No. 12 843 874.4.
Il-Koo Kim et al., "Restriction on motion vector scaling for Merge and AMVP", Joint Collaborative Team on Video Coding (JCT-VC) of ITU-T SG16 WP3 and ISO/IEC JTC1/SC29/WG11, 7th Meeting: Geneva, CH, Nov. 21-30, 2011, JCTVC-G551, Nov. 18, 2011, p. 1-4.
Office Action issued for Canadian Patent Application No. 2,826,787 dated May 16, 2018.
Office Action issued for Canadian Patent Application No. 2,836,244 dated May 29, 2018.
Office Action issued for Canadian Patent Application No. 2,836,243 dated Jun. 5, 2018.
Office Action issued for Indian Patent Application No. 6382/CHENP/2013 dated Aug. 30, 2018.
Summons to attend Oral Proceedings issued for European Application No. 12842944.6 dated Oct. 31, 2018.
Benjamin Bross et al., High Efficiency Video Coding (HEVC) text specification Meeting; Jan. 2, 2012-Oct. 2, 2012; San Jose; (Joint Collaborative Team on Video Coding of ISO/IEC JTC1/SC29/WG11 and ITU-T SG.16); URL: http://wftp3.itu.int/av-arch/jctvc-site/, No. JCTVC-H1003_d0, Feb. 10, 2012 (Feb. 10, 2012), XP030111769.
Benjamin Bross et al., "WD4: Working Draft 4 of High-Efficiency Video Coding", 6. JCT-VC Meeting; 97. MPEG Meeting; Jul. 14, 2011-Jul. 22, 2011; Torino; (Joint Collaborative Team of Video Coding of ISO/IEC JTC1/SC29/WG11 and ITU-T SG.16); URL: http://wftp3.itu.int/av-arch/jctvc-site/, No. JCTVC-F803_d0, Aug. 9, 2011 (Aug. 9, 2011), XP030009800.
Summons to attend Oral Proceedings issued for European Application No. 12844046.8 dated Oct. 31, 2018.
J-L. Lin et al., "Improved Advanced Motion Vector Prediction", JCT-VC of ITU-T and ISO/IEC, JCTVC-D125 Ver. 3, Jan. 23, 2011, pp. 1-8.
Office Action dated Jan. 7, 2019 for Indian Patent Application No. 8667/CHENP/2013.
Office Action dated May 3, 2019 in Canadian Patent Application No. 2,836,244.
Office Action issued for Canadian Patent Application No. 2,836,243 dated May 23, 2019.
Office Action issued for Indian Patent Application No. 8668/CHENP/2013 dated Jun. 18, 2019.
Office Action dated Jul. 10, 2020 in U.S. Appl. No. 16/738,322.
Office Action dated Dec. 23, 2020 in Chinese Application No. 201711189653.9, with English translation of the Search Report.

FIG. 26
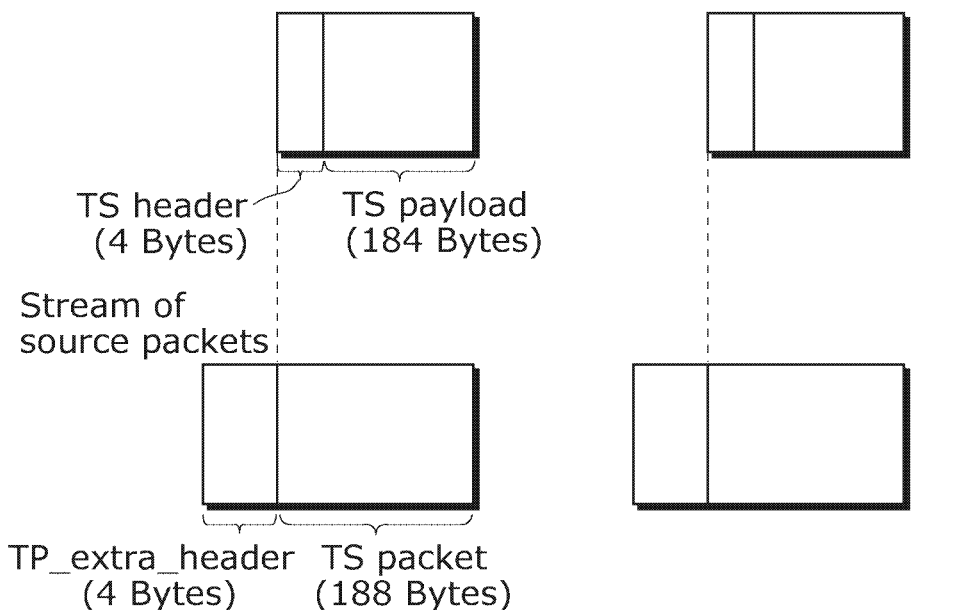
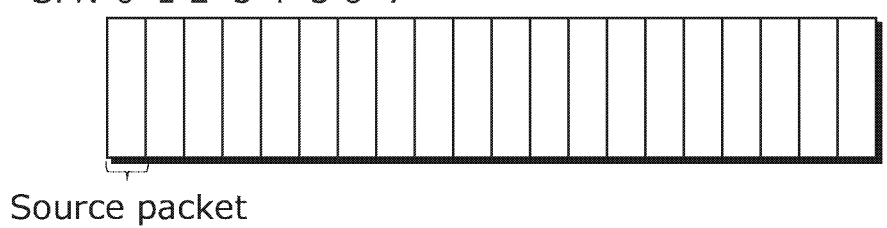

FIG. 34

| Corresponding standard | Driving frequency |
|---|---|
| MPEG-4 AVC | 500 MHz |
| MPEG-2 | 350 MHz |
| ⋮ | ⋮ |

IMAGE CODING METHOD, IMAGE DECODING METHOD, IMAGE CODING APPARATUS, AND IMAGE DECODING APPARATUS

FIELD

One or more exemplary embodiments disclosed herein relate generally to an image coding method of coding each of blocks of pictures.

BACKGROUND

A technique relating to an image coding method of coding each of blocks of pictures is described in Non Patent Literature (NPL) 1.

CITATION LIST

Non Patent Literature

[NPL 1]
ISO/IEC 14496-10—MPEG-4 Part 10, Advanced Video Coding

SUMMARY

Technical Problem

However, there are cases where the conventional image coding method cannot achieve sufficiently high coding efficiency.

In view of this, one non-limiting and exemplary embodiment provides an image coding method that can improve coding efficiency in image coding.

Solution to Problem

In one general aspect, the techniques disclosed here feature an image coding method of coding each of blocks of pictures, the image coding method including: deriving a candidate for a motion vector of a current block to be coded, from a motion vector of a co-located block which is a block included in a picture different from a picture that includes the current block; adding the derived candidate to a list; selecting the motion vector of the current block from the list to which the candidate is added; and coding the current block using the selected motion vector and a reference picture of the current block, wherein the deriving includes: determining whether the reference picture of the current block is a long-term reference picture or a short-term reference picture, and whether a reference picture of the co-located block is a long-term reference picture or a short-term reference picture; deriving the candidate from the motion vector of the co-located block by a first derivation scheme that does not involve scaling based on a temporal distance, in the case of determining that each of the reference picture of the current block and the reference picture of the co-located block is a long-term reference picture; and deriving the candidate from the motion vector of the co-located block by a second derivation scheme that involves scaling based on a temporal distance, in the case of determining that each of the reference picture of the current block and the reference picture of the co-located block is a short-term reference picture.

These general and specific aspects may be implemented using a system, an apparatus, an integrated circuit, a computer program, or a non-transitory computer-readable recording medium such as a CD-ROM, or any combination of systems, apparatuses, methods, integrated circuits, computer programs, and recording media.

Additional benefits and advantages of the disclosed embodiments will be apparent from the Specification and Drawings. The benefits and/or advantages may be individually obtained by the various embodiments and features of the Specification and Drawings, which need not all be provided in order to obtain one or more of such benefits and/or advantages.

Advantageous Effects

One or more exemplary embodiments or features disclosed herein provide an image coding method that can improve coding efficiency in image coding.

BRIEF DESCRIPTION OF DRAWINGS

These and other advantages and features will become apparent from the following description thereof taken in conjunction with the accompanying Drawings, by way of non-limiting examples of embodiments of the present disclosure.

FIG. 26 shows a structure of TS packets and source packets in the multiplexed data.

FIG. 34 shows an example of a look-up table in which standards of video data are associated with the driving frequencies.

Figure 1:
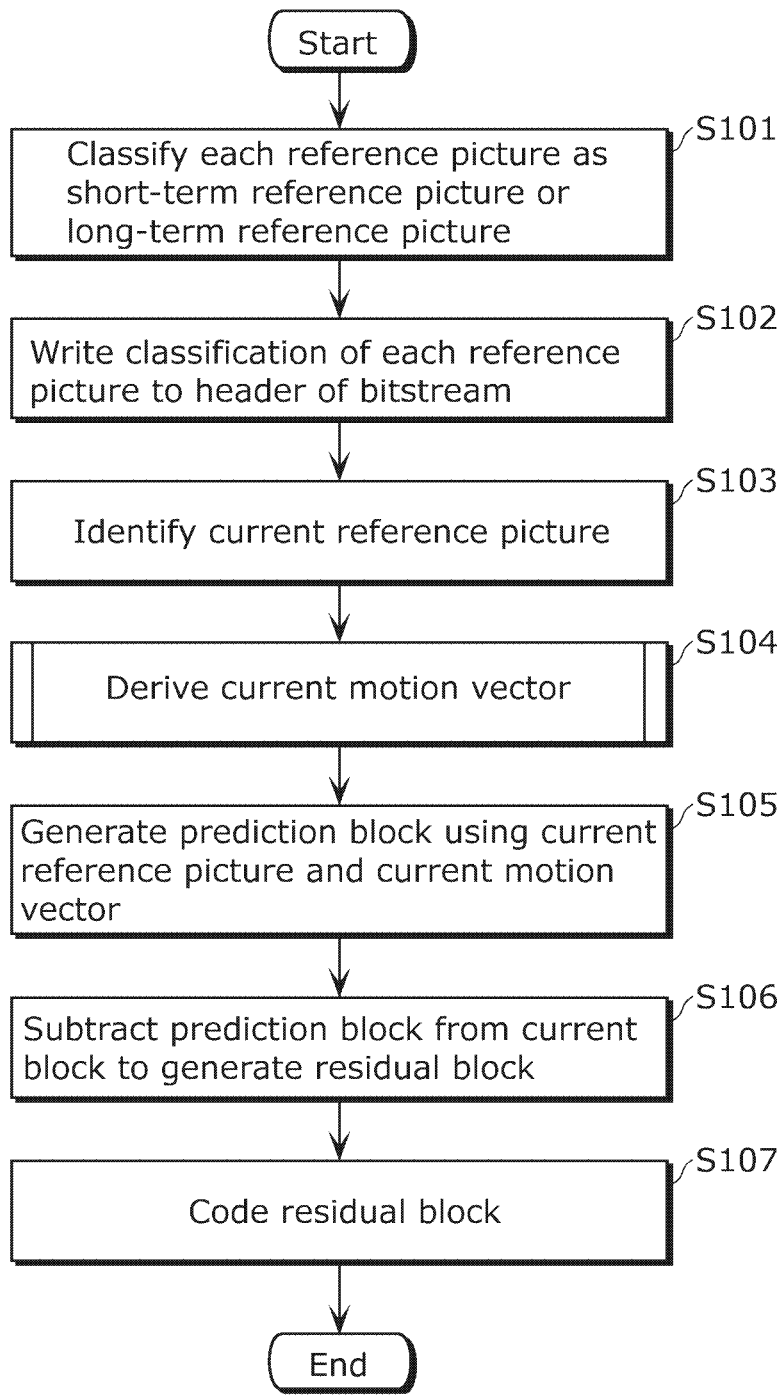
FIG. 1 is a flowchart showing an operation of an image coding apparatus according to a reference example.

DESCRIPTION OF EMBODIMENTS (Underlying Knowledge Forming Basis of the Present Disclosure)

In relation to the image coding method disclosed in the Background Art section, the inventors have found the following problem. Note that, in the following description, an image may be any of a moving image composed of a plurality of pictures, a still image composed of one picture, a part of a picture, and the like.

Image coding schemes in recent years include MPEG-4 AVC/H.264 and HEVC (High Efficiency Video Coding). In these image coding schemes, inter prediction using coded reference pictures is available.

Moreover, in these image coding schemes, a reference picture called a long-term reference picture may be used. For example, in the case where a reference picture is retained in a DPB (Decoded Picture Buffer) for a long time, the reference picture may be used as a long-term reference picture.

In HEVC, there is a mode called a merge mode. In the merge mode, a motion vector predictor obtained by predicting a motion vector of a current block from a motion vector of an adjacent block or the like is used for coding the current block as the motion vector of the current block. That is, in the merge mode, the motion vector predictor is treated as the motion vector of the current block. The motion vector predictor and the motion vector of the current block in the merge mode are also referred to as a merge vector.

In HEVC, a temporal motion vector predictor can be used, too. The temporal motion vector predictor is derived from a motion vector of a co-located block in a coded co-located picture. Coordinates of the co-located block in the co-located picture correspond to coordinates of the current block in the current picture to be coded.

Hereafter, the motion vector of the co-located block is also referred to as a co-located motion vector, and a reference picture of the co-located block is also referred to as a co-located reference picture. The co-located block is coded using the co-located motion vector and the co-located reference picture. Note that "co-located" may also be written as "collocated".

Likewise, the motion vector of the current block is also referred to as a current motion vector, and a reference picture of the current block is also referred to as a current reference picture. The current block is coded using the current motion vector and the current reference picture.

The current block and the co-located block mentioned above are each a prediction unit (PU). The prediction unit is a block of an image, and is defined as a data unit for prediction. In HEVC, a coding unit (CU) is defined as a data unit for coding, separately from the prediction unit. The prediction unit is a block in the coding unit. In the following description, the term "block" may be replaced with "prediction unit" or "coding unit".

The coding unit and the prediction unit are not fixed in size. For example, one picture may include a plurality of coding units of various sizes, and one picture may include a plurality of prediction units of various sizes.

This can cause a situation where a block that exactly matches an area of the current block is not defined in the co-located picture. Accordingly, in HEVC, the co-located block is selected from a plurality of blocks included in the co-located picture by a predetermined selection method.

The temporal motion vector predictor is generated by scaling the motion vector of the selected co-located block based on a POC (Picture Order Count) distance. POCs are ordinal numbers assigned to pictures in display order. A POC distance corresponds to a temporal distance between two pictures. Scaling based on a POC distance is also referred to as POC-based scaling. Expression 1 below is an arithmetic expression for performing POC-based scaling on the motion vector of the co-located block.

$$pmv=(tb/td) \times colmv \qquad \text{(Expression 1).}$$

Here, colmv is the motion vector of the co-located block. pmv is the temporal motion vector predictor derived from the motion vector of the co-located block. tb is a signed POC distance, representing a difference between the current picture and the current reference picture. td is a signed POC distance, representing a difference between the co-located picture and the co-located reference picture.

In the case where a valid temporal motion vector predictor is present, the temporal motion vector predictor is inserted into an ordered list of current motion vector candidates. The motion vector used for coding the current block is selected from the ordered list of current motion vector candidates. The selected motion vector is indicated by a parameter in a bitstream.

FIG. 1 is a flowchart showing an operation of an image coding apparatus according to a reference example. In particular, FIG. 1 shows a process of coding an image by inter prediction.

First, the image coding apparatus classifies each of reference pictures as a short-term reference picture or a long-term reference picture (Step S101). The image coding apparatus writes information indicating the classification of each of the reference pictures, to a header of the bitstream (Step S102).

Next, the image coding apparatus identifies the current reference picture (Step S103). The image coding apparatus then derives the current motion vector (Step S104). A derivation process will be described in detail later.

Following this, the image coding apparatus generates a prediction block, by performing motion compensation using the current reference picture and the current motion vector (Step S105).

The image coding apparatus subtracts the prediction block from the current block, to generate a residual block (Step S106). Lastly, the image coding apparatus codes the residual block, to generate the bitstream including the coded residual block (Step S107).

Figure 2:
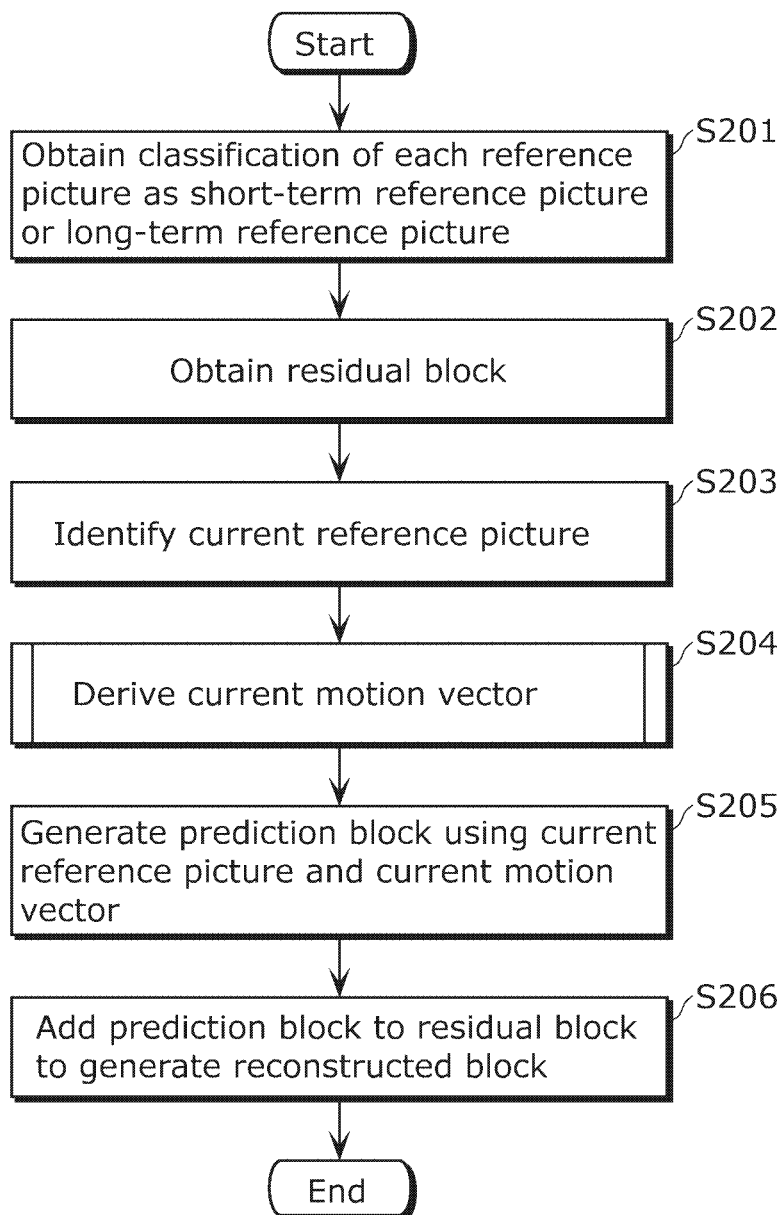
FIG. 2 is a flowchart showing an operation of an image decoding apparatus according to the reference example.

FIG. 2 is a flowchart showing an operation of an image decoding apparatus according to the reference example. In particular, FIG. 2 shows a process of decoding an image by inter prediction.

First, the image decoding apparatus obtains the bitstream, and obtains the information indicating the classification of each of the reference pictures by parsing the header of the bitstream (Step S201). The image decoding apparatus also obtains the residual block, by parsing the bitstream (Step S202).

Next, the image decoding apparatus identifies the current reference picture (Step S203). The image decoding apparatus then derives the current motion vector (Step S204). A derivation process will be described in detail later. Following this, the image decoding apparatus generates the prediction block, by performing motion compensation using the current reference picture and the current motion vector (Step S205). Lastly, the image decoding apparatus adds the prediction block to the residual block, to generate a reconstructed block (Step S206).

Figure 3:
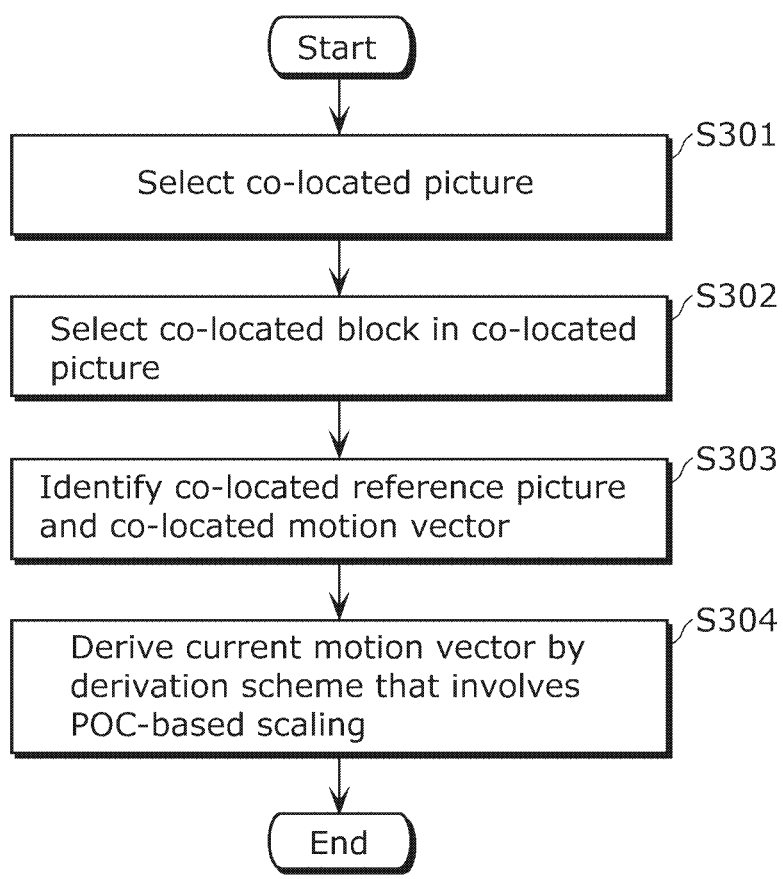
FIG. 3 is a flowchart showing details of a derivation process according to the reference example.

FIG. 3 is a flowchart showing details of the derivation process shown in FIGS. 1 and 2. The following describes the operation of the image coding apparatus. The operation of the image decoding apparatus is the same as the operation of the image coding apparatus, with "coding" being replaced with "decoding".

First, the image coding apparatus selects the co-located picture (Step S301). Next, the image coding apparatus selects the co-located block in the co-located picture (Step S302). The image coding apparatus then identifies the co-located reference picture and the co-located motion vector (Step S303). After this, the image coding apparatus derives the current motion vector by a derivation scheme that involves POC-based scaling (Step S304).

Figure 4:
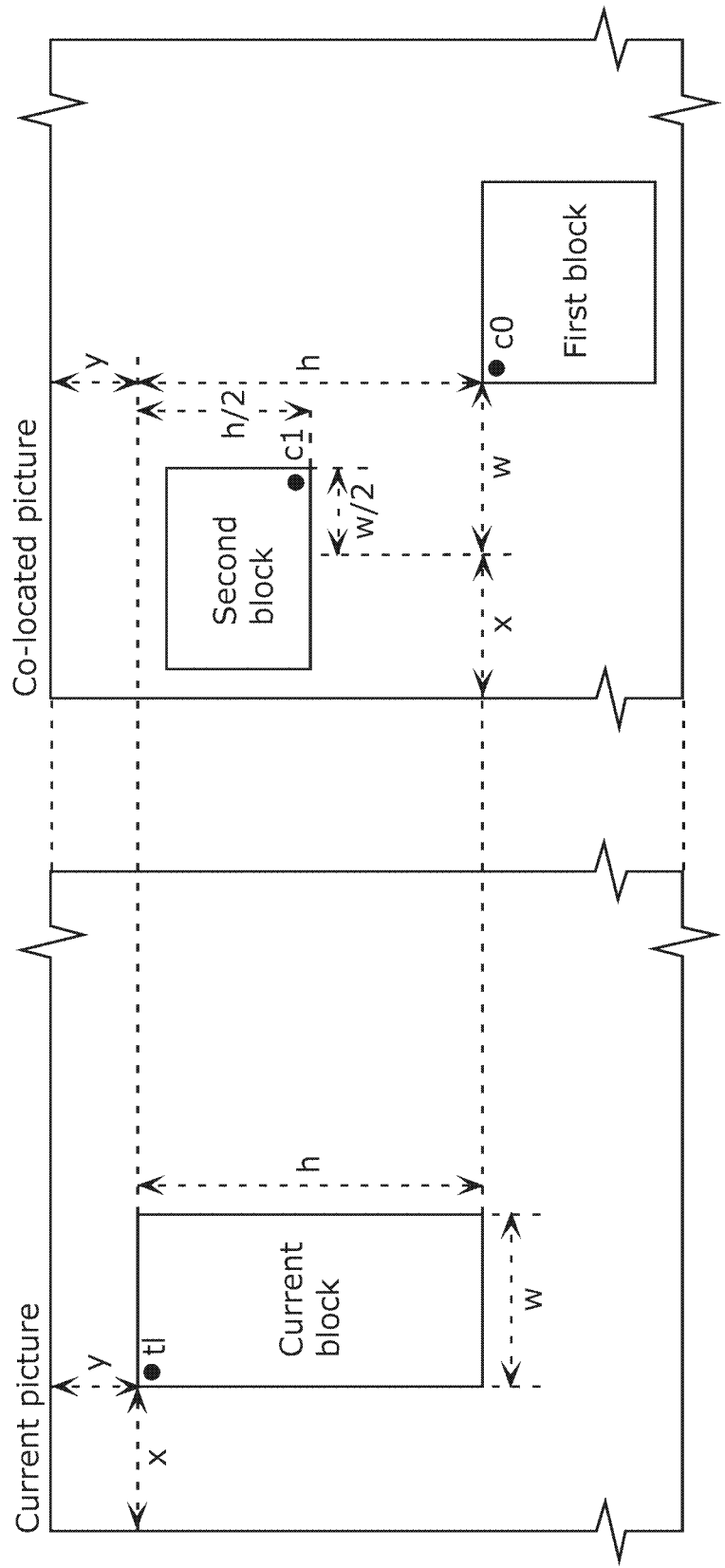
FIG. 4 is a diagram for explaining a co-located block according to the reference example.

FIG. 4 is a diagram for explaining the co-located block used in the derivation process shown in FIG. 3. The co-located block is selected from a plurality of blocks in the co-located picture.

The co-located picture is different from the current picture that includes the current block. For example, the co-located picture is a picture immediately preceding or immediately following the current picture in display order. In more detail, for example, the co-located picture is a reference picture listed first in any of two reference picture lists used for coding of B pictures (bi-predictive coding).

A first block including a sample c0 in the co-located picture is a leading candidate for the co-located block, and is also referred to as a primary co-located block. A second block including a sample c1 in the co-located picture is a second leading candidate for the co-located block, and is also referred to as a secondary co-located block.

Let $(x, y)$ be coordinates of a top left sample t1 in the current block, w be a width of the current block, and h be a height of the current block. Coordinates of the sample c0 are $(x+w, y+h)$. Coordinates of the sample c1 are $(x+(w/2)-1, y+(h/2)-1)$.

In the case where the first block is not available, the second block is selected as the co-located block. Examples of the case where the first block is not available include the case where the first block is not present because the current block is located rightmost or bottommost in the picture, and the case where the first block is coded by intra prediction.

The following describes a more specific example of the process of deriving the temporal motion vector predictor as the current motion vector with reference to FIG. 3 again.

First, the image coding apparatus selects the co-located picture (Step S301). Next, the image coding apparatus selects the co-located block (Step S302). In the case where the first block including the sample c0 shown in FIG. 4 is available, the first block is selected as the co-located block. In the case where the first block is not available and the second block including the sample c1 shown in FIG. 4 is available, the second block is selected as the co-located block.

In the case where the available co-located block is selected, the image coding apparatus sets the temporal motion vector predictor as available. In the case where the available co-located block is not selected, the image coding apparatus sets the temporal motion vector predictor as not available.

In the case where the temporal motion vector predictor is set as available, the image coding apparatus identifies the co-located motion vector as a base motion vector. The image coding apparatus also identifies the co-located reference picture (Step S303).

The image coding apparatus then derives the temporal motion vector predictor from the base motion vector by scaling according to Expression 1 (Step S304).

Through the process described above, the image coding apparatus and the image decoding apparatus each derive the temporal motion vector predictor as the current motion vector.

There are, however, cases where it is difficult to derive the appropriate current motion vector, depending on the relations between the current picture, the current reference picture, the co-located picture, and the co-located reference picture.

For instance, in the case where the current reference picture is a long-term reference picture, there is a possibility that the temporal distance between the current reference picture and the current picture is long. In the case where the co-located reference picture is a long-term reference picture, there is a possibility that the temporal distance between the co-located reference picture and the co-located picture is long.

These cases incur a possibility that an extremely large or small current motion vector is generated as a result of POC-based scaling. This causes degradation in prediction accuracy and degradation in coding efficiency. In particular, the extremely large or small current motion vector cannot be appropriately expressed with a fixed number of bits, leading to significant prediction accuracy degradation and coding efficiency degradation.

An image coding method according to an exemplary embodiment disclosed herein is an image coding method of coding each of blocks of pictures, the image coding method including: deriving a candidate for a motion vector of a current block to be coded, from a motion vector of a co-located block which is a block included in a picture different from a picture that includes the current block; adding the derived candidate to a list; selecting the motion vector of the current block from the list to which the candidate is added; and coding the current block using the selected motion vector and a reference picture of the current block, wherein the deriving includes: determining whether the reference picture of the current block is a long-term reference picture or a short-term reference picture, and whether a reference picture of the co-located block is a long-term reference picture or a short-term reference picture; deriving the candidate from the motion vector of the co-located block by a first derivation scheme that does not involve scaling based on a temporal distance, in the case of determining that each of the reference picture of the current block and the reference picture of the co-located block is a long-term reference picture; and deriving the candidate from the motion vector of the co-located block by a second derivation scheme that involves scaling based on a temporal distance, in the case of determining that each of the reference picture of the current block and the reference picture of the co-located block is a short-term reference picture.

Thus, the candidate for the current motion vector is appropriately derived without being extremely large or small. This contributes to improved prediction accuracy and improved coding efficiency.

For example, in the deriving: the deriving of the candidate from the motion vector of the co-located block may not be performed in the case of determining that one of the reference picture of the current block and the reference picture of the co-located block is a long-term reference picture and the other one of the reference picture of the current block and the reference picture of the co-located block is a short-term reference picture; and the deriving of the candidate from the motion vector of the co-located block may be performed in the case of determining that each of the reference picture of the current block and the reference picture of the co-located block is a long-term reference picture or in the case of determining that each of the reference picture of the current block and the reference picture of the co-located block is a short-term reference picture.

Thus, in the case where low prediction accuracy is expected, the candidate for the current motion vector is not derived from the motion vector of the co-located block. Prediction accuracy degradation can be prevented in this way.

For example, the coding may further include coding information indicating whether the reference picture of the current block is a long-term reference picture or a short-term reference picture, and information indicating whether the reference picture of the co-located block is a long-term reference picture or a short-term reference picture.

Thus, the information indicating, for each reference picture, whether the reference picture is a long-term reference picture or a short-term reference picture is provided from the coding side to the decoding side. This enables the coding side and the decoding side to obtain the same determination result and perform the same process.

For example, the deriving may include: determining whether the reference picture of the current block is a long-term reference picture or a short-term reference picture, using a temporal distance between the reference picture of the current block and the picture that includes the current block; and determining whether the reference picture of the co-located block is a long-term reference picture or a short-term reference picture, using a temporal distance between the reference picture of the co-located block and the picture that includes the co-located block.

Thus, for each reference picture, whether the reference picture is a long-term reference picture or a short-term reference picture is simply and appropriately determined based on the temporal distance.

For example, the deriving may include determining whether the reference picture of the co-located block is a long-term reference picture or a short-term reference picture, in a period during which the co-located block is coded.

Thus, whether the reference picture of the co-located block is a long-term reference picture or a short-term reference picture is determined more accurately.

For example, the deriving may include determining whether the reference picture of the co-located block is a long-term reference picture or a short-term reference picture, in a period during which the current block is coded.

Thus, information indicating whether the reference picture of the co-located block is a long-term reference picture or a short-term reference picture need not be retained for a long time.

For example, the deriving may include: deriving the motion vector of the co-located block as the candidate, in the case of determining that each of the reference picture of the current block and the reference picture of the co-located block is a long-term reference picture; and deriving the candidate by scaling the motion vector of the co-located block using a ratio, in the case of determining that each of the reference picture of the current block and the reference picture of the co-located block is a short-term reference picture, the ratio being a ratio of a temporal distance between the reference picture of the current block and the picture that includes the current block to a temporal distance between the reference picture of the co-located block and the picture that includes the co-located block.

Thus, in the case where the two reference pictures are each a long-term reference picture, scaling is omitted, with it being possible to reduce computation. In the case where the two reference pictures are each a short-term reference picture, the candidate for the current motion vector is appropriately derived based on the temporal distance.

For example, the deriving may further include, without deriving the candidate from the co-located block, selecting another co-located block and deriving the candidate from a motion vector of the other co-located block by the second derivation scheme, in the case of determining that the reference picture of the current block is a short-term reference picture and the reference picture of the co-located block is a long-term reference picture, the other co-located block being coded with reference to a short-term reference picture.

Thus, the block for deriving the candidate of high prediction accuracy is selected. This contributes to improved prediction accuracy.

Moreover, an image decoding method according to an exemplary embodiment disclosed herein is an image decoding method of decoding each of blocks of pictures, the image decoding method including: deriving a candidate for a motion vector of a current block to be decoded, from a motion vector of a co-located block which is a block included in a picture different from a picture that includes the current block; adding the derived candidate to a list; selecting the motion vector of the current block from the list to which the candidate is added; and decoding the current block using the selected motion vector and a reference picture of the current block, wherein the deriving includes: determining whether the reference picture of the current block is a long-term reference picture or a short-term reference picture, and whether a reference picture of the co-located block is a long-term reference picture or a short-term reference picture; deriving the candidate from the motion vector of the co-located block by a first derivation scheme that does not involve scaling based on a temporal distance, in the case of determining that each of the reference picture of the current block and the reference picture of the co-located block is a long-term reference picture; and deriving the candidate from the motion vector of the co-located block by a second derivation scheme that involves scaling based on a temporal distance, in the case of determining that each of the reference picture of the current block and the reference picture of the co-located block is a short-term reference picture.

Thus, the candidate for the current motion vector is appropriately derived without being extremely large or small. This contributes to improved prediction accuracy and improved coding efficiency.

For example, in the deriving: the deriving of the candidate from the motion vector of the co-located block may not be performed in the case of determining that one of the reference picture of the current block and the reference picture of the co-located block is a long-term reference picture and the other one of the reference picture of the current block and the reference picture of the co-located block is a short-term reference picture; and the deriving of the candidate from the motion vector of the co-located block may be performed in the case of determining that each of the reference picture of the current block and the reference picture of the co-located block is a long-term reference picture or in the case of determining that each of the reference picture of the current block and the reference picture of the co-located block is a short-term reference picture.

Thus, in the case where low prediction accuracy is expected, the candidate for the current motion vector is not derived from the motion vector of the co-located block. Prediction accuracy degradation can be prevented in this way.

For example, the decoding may further include decoding information indicating whether the reference picture of the current block is a long-term reference picture or a short-term reference picture, and information indicating whether the reference picture of the co-located block is a long-term reference picture or a short-term reference picture, wherein the deriving includes: determining whether the reference picture of the current block is a long-term reference picture or a short-term reference picture, using the information indicating whether the reference picture of the current block is a long-term reference picture or a short-term reference picture; and determining whether the reference picture of the co-located block is a long-term reference picture or a short-term reference picture, using the information indicating whether the reference picture of the co-located block is a long-term reference picture or a short-term reference picture.

Thus, the information indicating, for each reference picture, whether the reference picture is a long-term reference picture or a short-term reference picture is provided from the coding side to the decoding side. This enables the coding side and the decoding side to obtain the same determination result and perform the same process.

For example, the deriving may include: determining whether the reference picture of the current block is a long-term reference picture or a short-term reference picture, using a temporal distance between the reference picture of the current block and the picture that includes the current block; and determining whether the reference picture of the co-located block is a long-term reference picture or a short-term reference picture, using a temporal distance between the reference picture of the co-located block and the picture that includes the co-located block.

Thus, for each reference picture, whether the reference picture is a long-term reference picture or a short-term reference picture is simply and appropriately determined based on the temporal distance.

For example, the deriving may include determining whether the reference picture of the co-located block is a long-term reference picture or a short-term reference picture, in a period during which the co-located block is decoded.

Thus, whether the reference picture of the co-located block is a long-term reference picture or a short-term reference picture is determined more accurately.

For example, the deriving may include determining whether the reference picture of the co-located block is a long-term reference picture or a short-term reference picture, in a period during which the current block is decoded.

Thus, information indicating whether the reference picture of the co-located block is a long-term reference picture or a short-term reference picture need not be retained for a long time.

For example, the deriving may include: deriving the motion vector of the co-located block as the candidate, in the case of determining that each of the reference picture of the current block and the reference picture of the co-located block is a long-term reference picture; and deriving the candidate by scaling the motion vector of the co-located block using a ratio, in the case of determining that each of the reference picture of the current block and the reference picture of the co-located block is a short-term reference picture, the ratio being a ratio of a temporal distance between the reference picture of the current block and the picture that includes the current block to a temporal distance between the reference picture of the co-located block and the picture that includes the co-located block.

Thus, in the case where the two reference pictures are each a long-term reference picture, scaling is omitted, with it being possible to reduce computation. In the case where the two reference pictures are each a short-term reference picture, the candidate for the current motion vector is appropriately derived based on the temporal distance.

For example, the deriving may further include, without deriving the candidate from the co-located block, selecting another co-located block and deriving the candidate from a motion vector of the other co-located block by the second derivation scheme, in the case of determining that the reference picture of the current block is a short-term reference picture and the reference picture of the co-located block is a long-term reference picture, the other co-located block being decoded with reference to a short-term reference picture.

Thus, the block for deriving the candidate of high prediction accuracy is selected. This contributes to improved prediction accuracy.

Moreover, a content providing method according to an exemplary embodiment disclosed herein is a content providing method of transmitting, from a server in which image data coded by the image coding method described above is recorded, the image data in response to a request from an external terminal.

These general and specific aspects may be implemented using a system, an apparatus, an integrated circuit, a computer program, or a non-transitory computer-readable recording medium such as a CD-ROM, or any combination of systems, apparatuses, methods, integrated circuits, computer programs, and recording media.

Hereinafter, certain exemplary embodiments are described in greater detail with reference to the accompanying Drawings. Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

Embodiment 1

Figure 5:
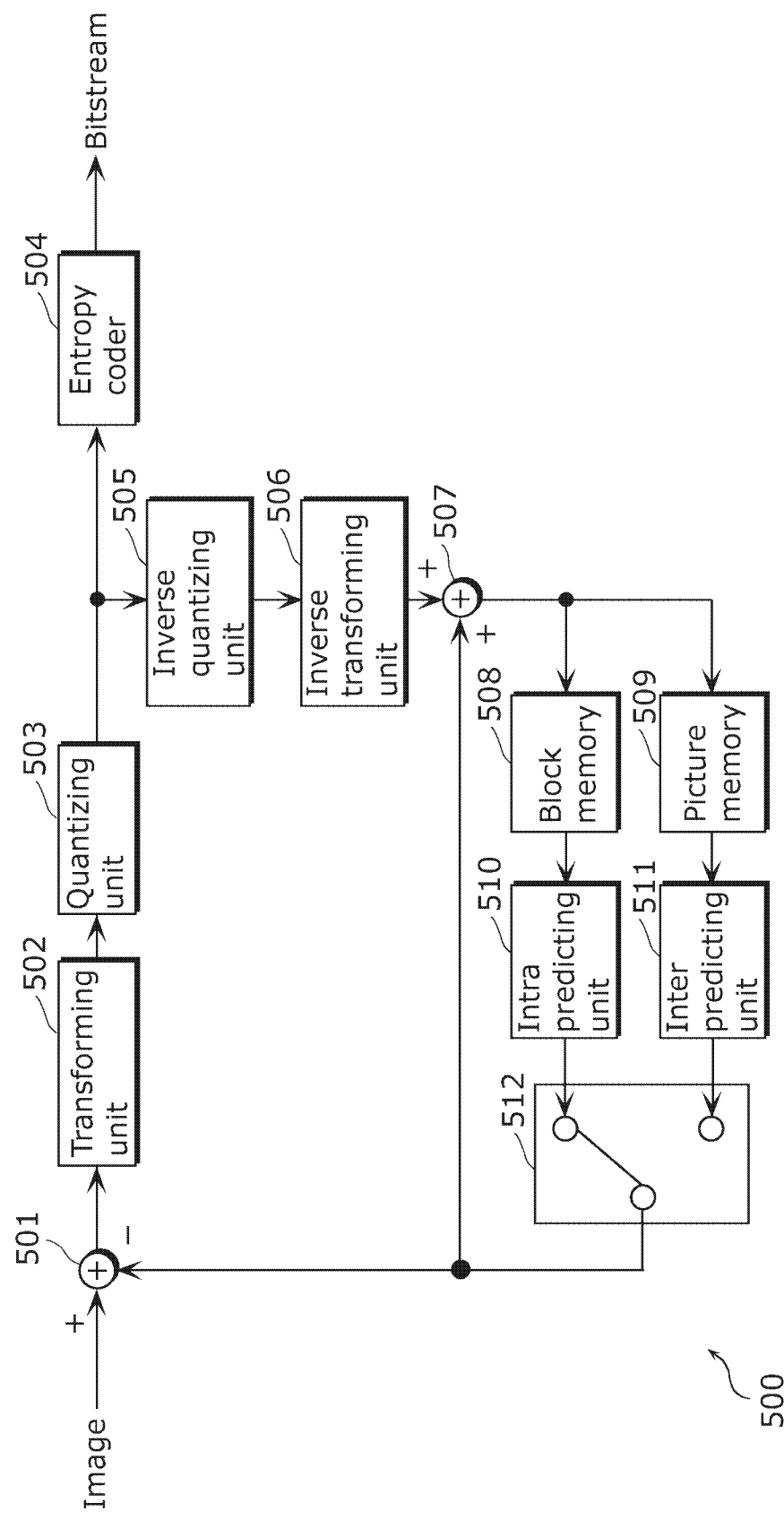
FIG. 5 is a block diagram of an image coding apparatus according to Embodiment 1.

FIG. 5 is a block diagram of an image coding apparatus according to Embodiment 1. An image coding apparatus 500 shown in FIG. 5 codes an image on a block basis, and outputs a bitstream including the coded image. In detail, the image coding apparatus 500 includes a subtracting unit 501, a transforming unit 502, a quantizing unit 503, an entropy coder 504, an inverse quantizing unit 505, an inverse transforming unit 506, an adding unit 507, a block memory 508, a picture memory 509, an intra predicting unit 510, an inter predicting unit 511, and a selecting unit 512.

The subtracting unit 501 subtracts a prediction image from an image provided to the image coding apparatus 500, to generate a differential image. The transforming unit 502 frequency-transforms the differential image generated by the subtracting unit 501, to generate a plurality of frequency coefficients. The quantizing unit 503 quantizes the plurality of frequency coefficients generated by the transforming unit 502, to generate a plurality of quantization coefficients. The entropy coder 504 codes the plurality of quantization coefficients generated by the quantizing unit 503, to generate a bitstream.

The inverse quantizing unit 505 inverse-quantizes the plurality of quantization coefficients generated by the quantizing unit 503, to restore the plurality of frequency coefficients. The inverse transforming unit 506 inverse-frequency-transforms the plurality of frequency coefficients restored by the inverse quantizing unit 505, to restore the differential image. The adding unit 507 adds the prediction image to the differential image restored by the inverse transforming unit 506, to restore (reconstruct) the image. The adding unit 507 stores the restored image (reconstructed image) in the block memory 508 and the picture memory 509.

The block memory 508 is a memory for storing the image restored by the adding unit 507, on a block basis. The picture memory 509 is a memory for storing the image restored by the adding unit 507, on a picture basis.

The intra predicting unit 510 performs intra prediction by referencing to the block memory 508. That is, the intra predicting unit 510 predicts a pixel value in a picture from another pixel value in the picture. The intra predicting unit 510 thus generates the prediction image. The inter predicting unit 511 performs inter prediction by referencing to the picture memory 509. That is, the inter predicting unit 511 predicts a pixel value in a picture from a pixel value in another picture. The inter predicting unit 511 thus generates the prediction image.

The selecting unit 512 selects any of the prediction image generated by the intra predicting unit 510 and the prediction image generated by the inter predicting unit 511, and outputs the selected prediction image to the subtracting unit 501 and the adding unit 507.

Though not shown in FIG. 5, the image coding apparatus 500 may include a deblocking filtering unit. The deblocking filtering unit may perform a deblocking filtering process on the image restored by the adding unit 507, to remove noise near block boundaries. The image coding apparatus 500 may also include a controlling unit that controls each process in the image coding apparatus 500.

Figure 6:
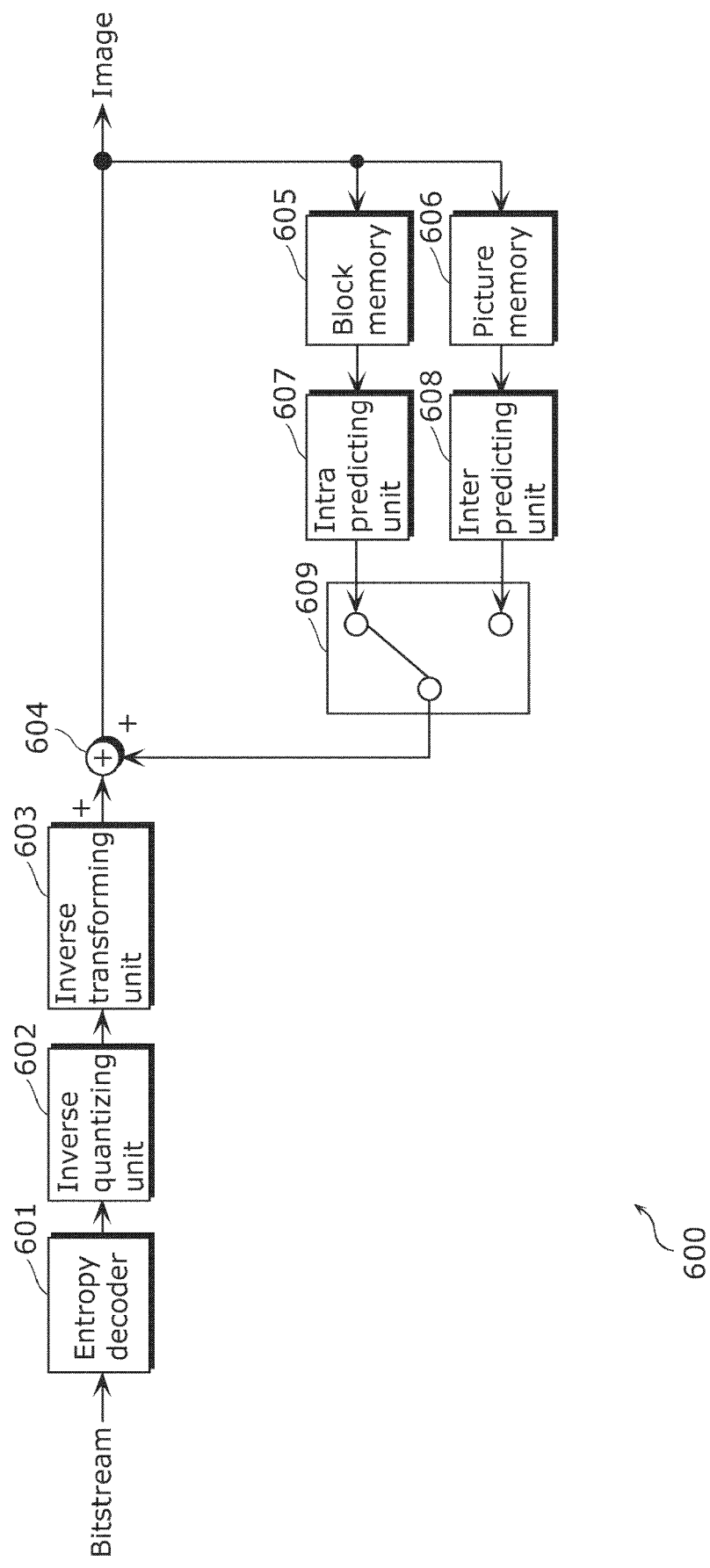
FIG. 6 is a block diagram of an image decoding apparatus according to Embodiment 1.

FIG. 6 is a block diagram of an image decoding apparatus according to this embodiment. An image decoding apparatus 600 shown in FIG. 6 obtains the bitstream, and decodes the image on a block basis. In detail, the image decoding apparatus 600 includes an entropy decoder 601, an inverse quantizing unit 602, an inverse transforming unit 603, an adding unit 604, a block memory 605, a picture memory 606, an intra predicting unit 607, an inter predicting unit 608, and a selecting unit 609.

The entropy decoder 601 decodes the coded plurality of quantization coefficients included in the bitstream. The inverse quantizing unit 602 inverse-quantizes the plurality of quantization coefficients decoded by the entropy decoder 601, to restore the plurality of frequency coefficients. The inverse transforming unit 603 inverse-frequency-transforms the plurality of frequency coefficients restored by the inverse quantizing unit 602, to restore the differential image.

The adding unit 604 adds the prediction image to the differential image restored by the inverse transforming unit 603, to restore (reconstruct) the image. The adding unit 604 outputs the restored image (reconstructed image). The adding unit 604 also stores the restored image in the block memory 605 and the picture memory 606.

The block memory 605 is a memory for storing the image restored by the adding unit 604, on a block basis. The picture memory 606 is a memory for storing the image restored by the adding unit 604, on a picture basis.

The intra predicting unit 607 performs intra prediction by referencing to the block memory 605. That is, the intra predicting unit 607 predicts a pixel value in a picture from another pixel value in the picture. The intra predicting unit 607 thus generates the prediction image. The inter predicting unit 608 performs inter prediction by referencing to the picture memory 606. That is, the inter predicting unit 608 predicts a pixel value in a picture from a pixel value in another picture. The inter predicting unit 608 thus generates the prediction image.

The selecting unit 609 selects any of the prediction image generated by the intra predicting unit 607 and the prediction image generated by the inter predicting unit 608, and outputs the selected prediction image to the adding unit 604.

Though not shown in FIG. 6, the image decoding apparatus 600 may include a deblocking filtering unit. The deblocking filtering unit may perform a deblocking filtering process on the image restored by the adding unit 604, to remove noise near block boundaries. The image decoding apparatus 600 may also include a controlling unit that controls each process in the image decoding apparatus 600.

The coding process and the decoding process mentioned above are performed on a coding unit basis. The transformation process, the quantization process, the inverse transformation process, and the inverse quantization process are performed on a transform unit (TU) basis where the transform unit is included in the coding unit. The prediction process is performed on a prediction unit basis where the prediction unit is included in the coding unit.

Figure 7:
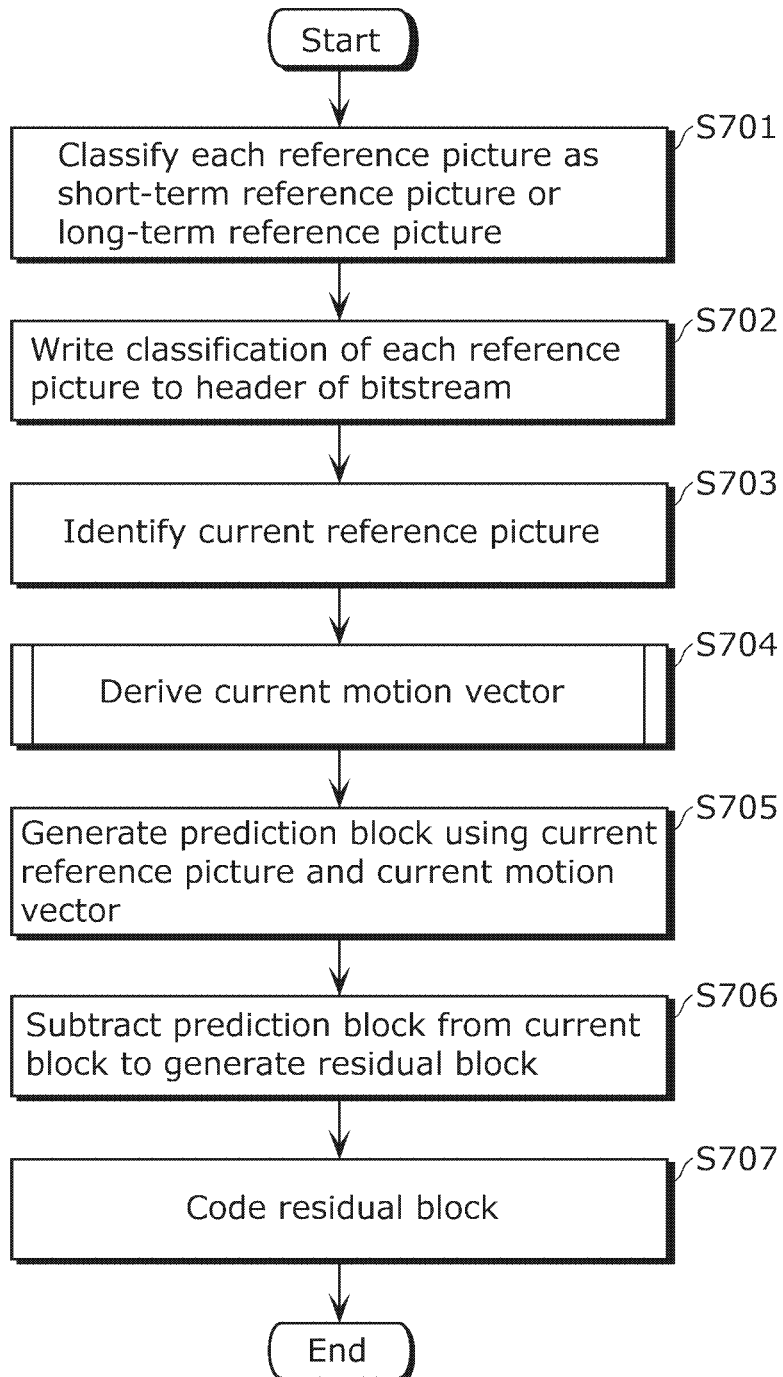
FIG. 7 is a flowchart showing an operation of the image coding apparatus according to Embodiment 1.

FIG. 7 is a flowchart showing an operation of the image coding apparatus 500 shown in FIG. 5. In particular, FIG. 7 shows a process of coding an image by inter prediction.

First, the inter predicting unit 511 classifies each of reference pictures as a short-term reference picture or a long-term reference picture (Step S701).

The long-term reference picture is a reference picture suitable for long-term use. The long-term reference picture is defined as a reference picture for longer use than the short-term reference picture. Accordingly, there is a high possibility that the long-term reference picture is retained in the picture memory 509 for a long time. The long-term reference picture is designated by an absolute POC that does not depend on the current picture. Meanwhile, the short-term reference picture is designated by a POC relative to the current picture.

Next, the entropy coder 504 writes information indicating the classification of each of the reference pictures, to a header of the bitstream (Step S702). That is, the entropy coder 504 writes information indicating, for each of the reference pictures, whether the reference picture is a long-term reference picture or a short-term reference picture.

Following this, the inter predicting unit 511 identifies the reference picture of the current block to be coded (to be predicted) (Step S703). The inter predicting unit 511 may identify a reference picture of a block adjacent to the current block, as the current reference picture. Alternatively, the inter predicting unit 511 may identify the current reference picture by a predetermined reference index. The inter predicting unit 511 then derives the current motion vector (Step S704). A derivation process will be described in detail later.

The inter predicting unit 511 generates the prediction block, by performing motion compensation using the current reference picture and the current motion vector (Step S705). After this, the subtracting unit 501 subtracts the prediction block from the current block (original image), to generate the residual block (Step S706). Lastly, the entropy coder 504 codes the residual block, to generate the bitstream including the residual block (Step S707).

Figure 8:
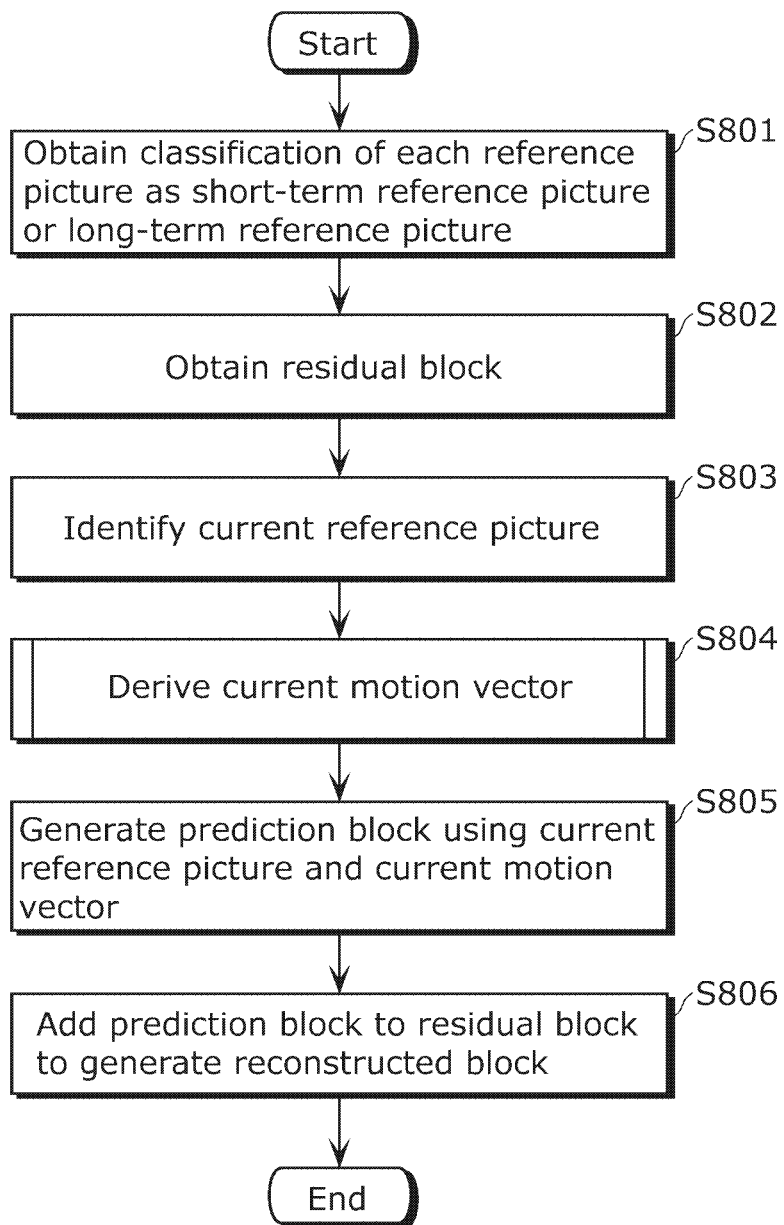
FIG. 8 is a flowchart showing an operation of the image decoding apparatus according to Embodiment 1.

FIG. 8 is a flowchart showing an operation of the image decoding apparatus 600 shown in FIG. 6. In particular, FIG. 8 shows a process of decoding an image by inter prediction.

First, the entropy decoder 601 obtains the bitstream, and obtains the information indicating the classification of each of the reference pictures by parsing the header of the bitstream (Step S801). That is, the entropy decoder 601 obtains the information indicating, for each of the reference pictures, whether the reference picture is a long-term reference picture or a short-term reference picture. The entropy decoder 601 also obtains the residual block, by parsing the bitstream (Step S802).

Next, the inter predicting unit 608 identifies the current reference picture (Step S803). The inter predicting unit 608 may identify a reference picture of a block adjacent to the current block, as the current reference picture. Alternatively, the inter predicting unit 608 may identify the current reference picture by a predetermined reference index.

Following this, the inter predicting unit 608 derives the current motion vector (Step S804). A derivation process will be described in detail later. The inter predicting unit 608 then generates the prediction block, by performing motion compensation using the current reference picture and the current motion vector (Step S805). Lastly, the adding unit 604 adds the prediction block to the residual block, to generate the reconstructed block (Step S806).

Figure 9:
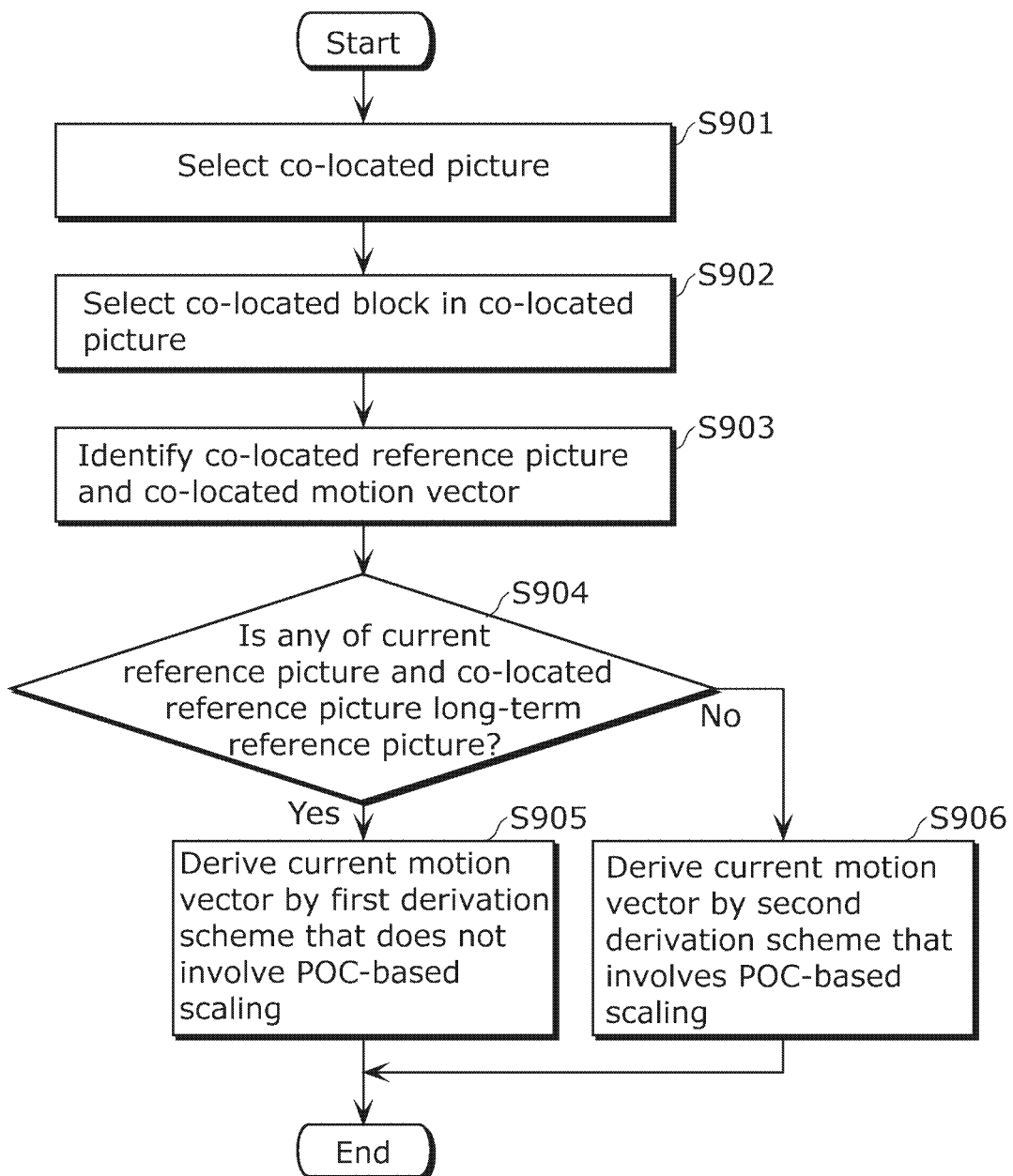
FIG. 9 is a flowchart showing details of a derivation process according to Embodiment 1.

FIG. 9 is a flowchart showing details of the derivation process shown in FIGS. 7 and 8. The following mainly describes the operation of the inter predicting unit 511 shown in FIG. 5. The operation of the inter predicting unit 608 shown in FIG. 6 is the same as the operation of the inter predicting unit 511 shown in FIG. 5, with "coding" being replaced with "decoding".

First, the inter predicting unit 511 selects the co-located picture from a plurality of available reference pictures (Step S901). The plurality of available reference pictures are coded pictures, and are retained in the picture memory 509.

Next, the inter predicting unit 511 selects the co-located block in the co-located picture (Step S902). The inter predicting unit 511 then identifies the co-located reference picture and the co-located motion vector (Step S903).

Following this, the inter predicting unit 511 determines whether or not any of the current reference picture and the co-located reference picture is a long-term reference picture (Step S904). In the case of determining that any of the current reference picture and the co-located reference picture is a long-term reference picture (Step S904: Yes), the inter predicting unit 511 derives the current motion vector by a first derivation scheme (Step S905).

The first derivation scheme is a scheme using the co-located motion vector. In more detail, the first derivation scheme is a scheme of directly deriving the co-located motion vector as the current motion vector, without POC-based scaling. The first derivation scheme may be a scheme of deriving the current motion vector by scaling the co-located motion vector at a predetermined ratio.

In the case of determining that none of the current reference picture and the co-located reference picture is a long-term reference picture (Step S904: No), the inter predicting unit 511 derives the current motion vector by a second derivation scheme (Step S906). That is, in the case of determining that the current reference picture and the co-located reference picture are each a short-term reference picture, the inter predicting unit 511 derives the current motion vector by the second derivation scheme.

The second derivation scheme is a scheme using the current reference picture, the co-located reference picture, and the co-located motion vector. In more detail, the second derivation scheme is a scheme of deriving the current motion vector by performing POC-based scaling (Expression 1) on the co-located motion vector.

The following describes a more specific example of the process of deriving the current motion vector with reference to FIG. 9 again. The derivation process described earlier may be changed as follows.

First, the inter predicting unit 511 selects the co-located picture (Step S901). In more detail, in the case where a slice header parameter slice_type is B and a slice header parameter collocated_from_l0_flag is 0, a picture RefPicList1[0] is selected as the co-located picture. The picture RefPicList1[0] is a reference picture listed first in an ordered reference picture list RefPicList1.

In the case where the slice header parameter slice_type is not B or in the case where the slice header parameter collocated_from_l0_flag is not 0, a picture RefPicList0[0] is selected as the co-located picture. The picture RefPicList0[0] is a reference picture listed first in an ordered reference picture list RefPicList0.

Next, the inter predicting unit 511 selects the co-located block (Step S902). In the case where the first block including the sample c0 shown in FIG. 4 is available, the first block is selected as the co-located block. In the case where the first block is not available and the second block including the sample c1 shown in FIG. 4 is available, the second block is selected as the co-located block.

In the case where the available co-located block is selected, the inter predicting unit 511 sets the temporal motion vector predictor as available. In the case where the available co-located block is not selected, the inter predicting unit 511 sets the temporal motion vector predictor as not available.

In the case where the temporal motion vector predictor is set as available, the inter predicting unit 511 identifies the co-located motion vector as the base motion vector. The inter predicting unit 511 also identifies the co-located reference picture (Step S903). In the case where the co-located block has a plurality of motion vectors, that is, in the case where the co-located block is coded using a plurality of motion vectors, the inter predicting unit 511 selects the base motion vector according to predetermined priority order.

For example, in the case where the current reference picture is a short-term reference picture, the inter predicting unit 511 may preferentially select a motion vector that points to a location in a short-term reference picture from among the plurality of motion vectors, as the base motion vector.

In detail, in the case where a motion vector that points to a location in a short-term reference picture is present, the inter predicting unit 511 selects the motion vector as the base motion vector. In the case where a motion vector that points to a location in a short-term reference picture is not present, the inter predicting unit 511 selects a motion vector that points to a location in a long-term reference picture, as the base motion vector.

After this, in the case where any of the current reference picture and the co-located reference picture is a long-term reference picture (Step S904: Yes), the inter predicting unit 511 derives the base motion vector as the temporal motion vector predictor (Step S905).

In the case where none of the two reference pictures is a long-term reference picture (Step S904: No), on the other hand, the inter predicting unit 511 derives the temporal motion vector predictor from the base motion vector by POC-based scaling (Step S906).

As described above, the temporal motion vector predictor is set as available or not available. The inter predicting unit 511 inserts the temporal motion vector predictor set as available, into an ordered list of current motion vector candidates. The ordered list holds not only the temporal motion vector predictor but various motion vectors as candidates.

The inter predicting unit 511 selects one motion vector from the ordered list, as the current motion vector. Here, the inter predicting unit 511 selects a motion vector of highest prediction accuracy for the current block or a motion vector that allows the current block to be coded with highest coding efficiency, from the ordered list. An index corresponding to the selected motion vector is written to the bitstream.

Through the process described above, the current motion vector is appropriately derived from the co-located motion vector, without being extremely large or small. This contributes to improved prediction accuracy and improved coding efficiency.

Note that the status of each reference picture as to whether the reference picture is a long-term reference picture or a short-term reference picture may be changed according to time. For example, a short-term reference picture may later be changed to a long-term reference picture, and a long-term reference picture may later be changed to a short-term reference picture.

Moreover, the inter predicting unit 511 may determine whether the co-located reference picture is a long-term reference picture or a short-term reference picture, in a period during which the co-located block is coded. The image coding apparatus 500 may then include an additional memory for holding the determination result from when the co-located block is coded to when the current block is coded.

In this way, whether the co-located reference picture is a long-term reference picture or a short-term reference picture is determined more accurately.

As an alternative, the inter predicting unit 511 may determine whether the co-located reference picture is a long-term reference picture or a short-term reference picture, in a period during which the current block is coded.

In this way, the information of whether the co-located reference picture is a long-term reference picture or a short-term reference picture need not be retained for a long time.

Moreover, the inter predicting unit 511 may determine whether the current reference picture is a long-term reference picture or a short-term reference picture, using a temporal distance between the current reference picture and the current picture.

As an example, in the case where the temporal distance between the current reference picture and the current picture is more than a predetermined threshold, the inter predicting unit 511 determines that the current reference picture is a long-term reference picture. In the case where the temporal distance is not more than the predetermined threshold, the inter predicting unit 511 determines that the current reference picture is a short-term reference picture.

Likewise, the inter predicting unit 511 may determine whether the co-located reference picture is a long-term reference picture or a short-term reference picture, using a temporal distance between the co-located reference picture and the co-located picture.

As an example, in the case where the temporal distance between the co-located reference picture and the co-located picture is more than a predetermined threshold, the inter predicting unit 511 determines that the co-located reference picture is a long-term reference picture. In the case where the temporal distance is not more than the predetermined threshold, the inter predicting unit 511 determines that the co-located reference picture is a short-term reference picture.

The inter predicting unit 608 in the image decoding apparatus 600 may determine, for each reference picture, whether or not the reference picture is a long-term reference picture or a short-term reference picture based on a temporal distance, in the same manner as the inter predicting unit 511 in the image coding apparatus 500. In such a case, the information indicating, for each reference picture, whether the reference picture is a long-term reference picture or a short-term reference picture need not be coded.

Regarding each of the other processes described in this embodiment, too, each structural element in the image decoding apparatus 600 performs the same process as the corresponding structural element in the image coding apparatus 500, as a result of which the image coded with high coding efficiency is appropriately decoded.

The operations described above are also applicable to the other embodiments. Any of the structures and operations described in this embodiment may be incorporated in the other embodiments, and any of the structures and operations described in the other embodiments may be incorporated in this embodiment.

Embodiment 2

An image coding apparatus and an image decoding apparatus according to Embodiment 2 have the same structures as those in Embodiment 1. Hence, the operations of the image coding apparatus and the image decoding apparatus according to this embodiment are described below, using the structure of the image coding apparatus 500 shown in FIG. 5 and the structure of the image decoding apparatus 600 shown in FIG. 6.

The image coding apparatus 500 according to this embodiment performs the operation shown in FIG. 7, as in Embodiment 1. The image decoding apparatus 600 according to this embodiment performs the operation shown in FIG. 8, as in Embodiment 1. This embodiment differs from Embodiment 1 in the current motion vector derivation process. This is described in detail below.

Figure 10:
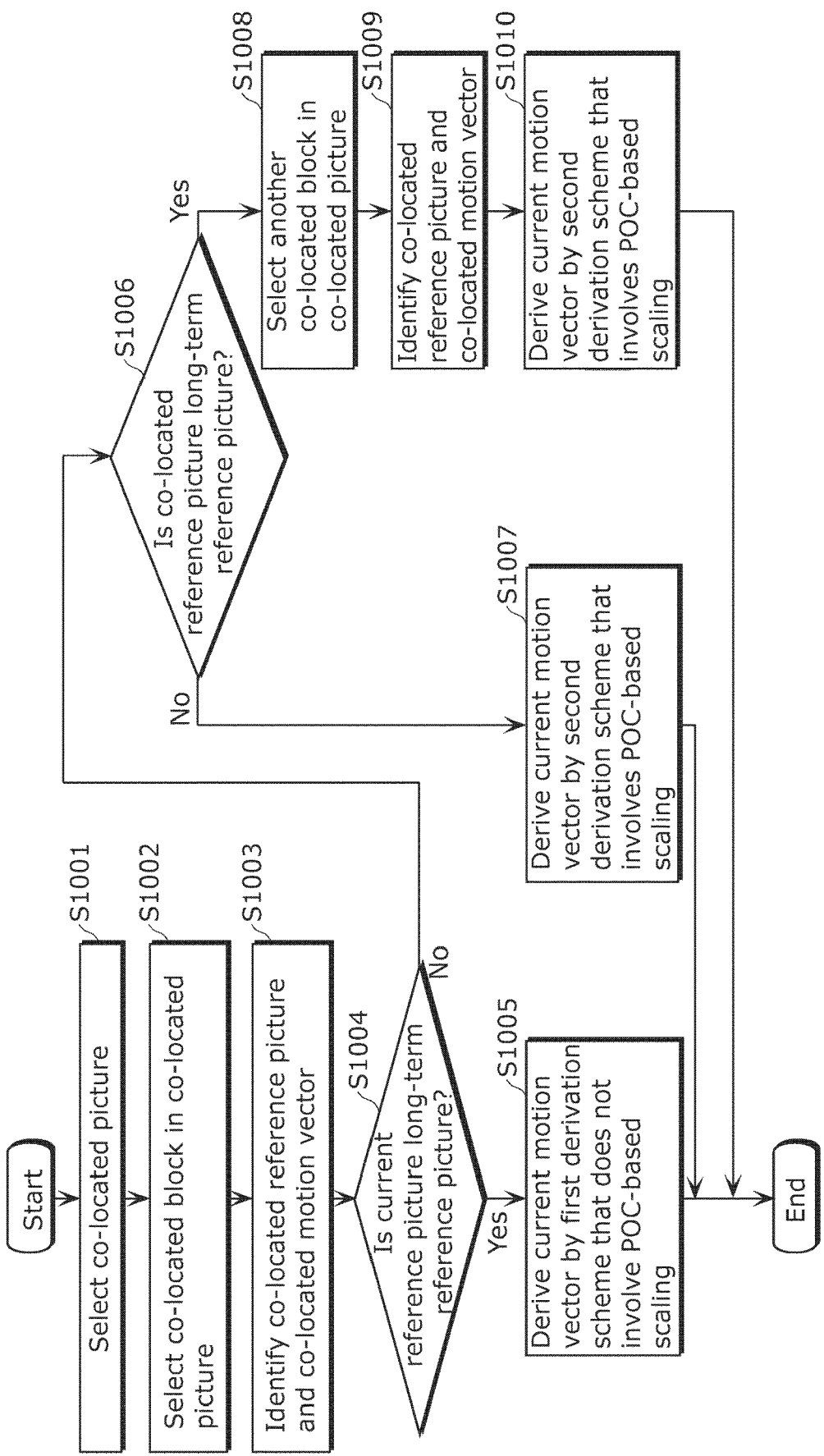
FIG. 10 is a flowchart showing details of a derivation process according to Embodiment 2.

FIG. 10 is a flowchart showing details of the derivation process according to this embodiment. The inter predicting unit 511 according to this embodiment performs the operation shown in FIG. 10, instead of the operation shown in FIG. 9. The following mainly describes the operation of the inter predicting unit 511 shown in FIG. 5. The operation of the inter predicting unit 608 shown in FIG. 6 is the same as the operation of the inter predicting unit 511 shown in FIG. 5, with "coding" being replaced with "decoding".

First, the inter predicting unit 511 selects the co-located picture from the plurality of available reference pictures (Step S1001). Next, the inter predicting unit 511 selects the co-located block in the co-located picture (Step S1002). The inter predicting unit 511 then identifies the co-located reference picture and the co-located motion vector (Step S1003).

Following this, the inter predicting unit 511 determines whether or not the current reference picture is a long-term reference picture (Step S1004). In the case of determining that the current reference picture is a long-term reference picture (Step S1004: Yes), the inter predicting unit 511 derives the current motion vector by the first derivation scheme same as in Embodiment 1 (Step S1005).

In the case of determining that the current reference picture is not a long-term reference picture (Step S1004: No), the inter predicting unit 511 determines whether or not the co-located reference picture is a long-term reference picture (Step S1006).

In the case of determining that the co-located reference picture is not a long-term reference picture (Step S1006: No), the inter predicting unit 511 derives the current motion vector by the second derivation scheme same as in Embodiment 1 (Step S1007). That is, in the case of determining that the current reference picture and the co-located reference picture are each a short-term reference picture, the inter predicting unit 511 derives the current motion vector by the second derivation scheme.

In the case of determining that the co-located reference picture is a long-term reference picture (Step S1006: Yes), the inter predicting unit 511 selects another co-located block in the co-located picture (Step S1008). In the example shown in FIG. 10, a block coded with reference to a short-term reference picture is selected as the other co-located block.

After this, the inter predicting unit 511 identifies the co-located reference picture and the co-located motion vector corresponding to the other co-located block (Step S1009). The inter predicting unit 511 then derives the current motion vector by the second derivation scheme that uses POC-based scaling (Step S1010).

In detail, in the case where the reference picture of the current block is a short-term reference picture and the reference picture of the co-located block is a long-term reference picture, the inter predicting unit 511 does not derive the current motion vector from the motion vector of the co-located block. The inter predicting unit 511 instead selects another co-located block coded with reference to a short-term reference picture, and derives the current motion vector from the motion vector of the selected other co-located block.

As an example, in the case where the reference picture of the current block is a short-term reference picture and the reference picture of the co-located block is a long-term reference picture, the inter predicting unit 511 searches for a block coded with reference to a short-term reference picture. The inter predicting unit 511 selects the block coded with reference to the short-term reference picture, as the other co-located block.

As another example, in the case where the reference picture of the current block is a short-term reference picture and the reference picture of the co-located block is a long-term reference picture, the inter predicting unit 511 first searches for a block coded with reference to a short-term reference picture.

In the case where the block coded with reference to the short-term reference picture is present, the inter predicting unit 511 selects the block as the other co-located block. In the case where the block coded with reference to the short-term reference picture is not present, the inter predicting unit 511 searches for a block coded with reference to a long-term reference picture. The inter predicting unit 511 selects the block coded with reference to the long-term reference picture, as the other co-located block.

For example, the inter predicting unit 511 first selects the first block shown in FIG. 4 as the co-located block. In the case where the current reference picture is a short-term reference picture and the co-located reference picture is a long-term reference picture, then the inter predicting unit 511 newly selects the second block shown in FIG. 4 as the co-located block.

In the above-mentioned example, the inter predicting unit 511 may select the second block shown in FIG. 4 as the co-located block only in the case where the reference picture of the second block is a short-term reference picture. The block selected as the co-located block here is not limited to the second block shown in FIG. 4, and a block other than the second block may be selected as the co-located block.

Figure 11:
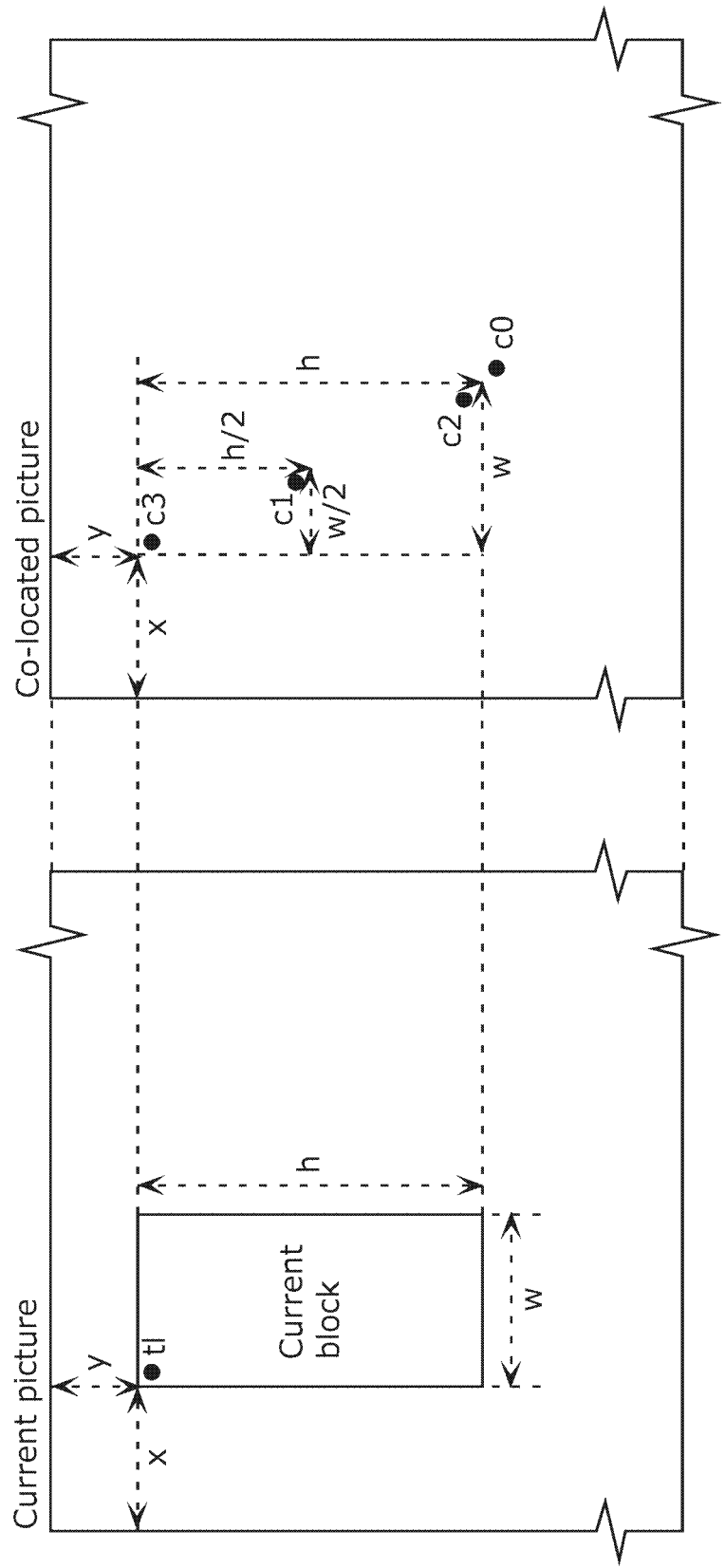
FIG. 11 is a diagram for explaining a co-located block according to Embodiment 2.

FIG. 11 is a diagram for explaining the co-located block according to this embodiment. Samples c0, c1, c2, and c3 in the co-located picture are shown in FIG. 11. The samples c0 and c1 in FIG. 11 are equal to the samples c0 and c1 in FIG. 4. Not only the second block including the sample c1 but also a third block including the sample c2 or a fourth block including the sample c3 may be selected as the other co-located block.

Coordinates of the sample c2 are (x+w−1, y+h−1). Coordinates of the sample c3 are (x+1, y+1).

The inter predicting unit 511 determines, for each of the first, second, third, and fourth blocks in this order, whether or not the block is available. The inter predicting unit 511 determines the available block as the final co-located block. Examples of the case where the block is not available include the case where the block is not present and the case where the block is coded by intra prediction.

In the case where the current reference picture is a short-term reference picture, the inter predicting unit 511 may determine that a block coded with reference to a long-term reference picture is not available.

Though the above describes the example of the co-located block selection method, the co-located block selection method is not limited to the above example. A block including a sample other than the samples c0, c1, c2, and c3 may be selected as the co-located block. Besides, the priority order of the blocks is not limited to the example described in this embodiment.

The following describes a more specific example of the process of deriving the current motion vector with reference to FIG. 10 again. The derivation process described earlier may be changed as follows.

First, the inter predicting unit 511 selects the co-located picture as in Embodiment 1 (Step S1001). Next, the inter predicting unit 511 selects the first block including the sample c0 shown in FIG. 11 as the co-located block, and identifies the co-located reference picture (Steps S1002 and S1003).

Following this, the inter predicting unit 511 determines whether or not the co-located block is available. In the case where the current reference picture is a short-term reference picture and the co-located reference picture is a long-term reference picture, the inter predicting unit 511 determines that the co-located block is not available (Steps S1004 and S1006).

In the case where the co-located block is not available, the inter predicting unit 511 searches for and selects another co-located block which is available (Step S1008). In detail, the inter predicting unit 511 selects a block coded with reference to a short-term reference picture, from among the second block including the sample c1, the third block including the sample c2, and the fourth block including the sample c3 in FIG. 11. The inter predicting unit 511 then identifies the reference picture of the co-located block (Step S1009).

In the case where the available co-located block is selected, the inter predicting unit 511 sets the temporal motion vector predictor as available. In the case where the available co-located block is not selected, the inter predicting unit 511 sets the temporal motion vector predictor as not available.

In the case where the temporal motion vector predictor is set as available, the inter predicting unit 511 identifies the co-located motion vector as the base motion vector (Steps S1003 and S1009). In the case where the co-located block has a plurality of motion vectors, that is, in the case where the co-located block is coded using a plurality of motion vectors, the inter predicting unit 511 selects the base motion vector according to predetermined priority order as in Embodiment 1.

In the case where any of the current reference picture and the co-located reference picture is a long-term reference picture (Step S1004: Yes), the inter predicting unit 511 derives the base motion vector as the temporal motion vector predictor (Step S1005).

In the case where none of the current reference picture and the co-located reference picture is a long-term reference picture (Step S1004: No), on the other hand, the inter predicting unit 511 derives the temporal motion vector predictor from the base motion vector by POC-based scaling (Steps S1007 and S1010).

In the case where the temporal motion vector predictor is set as not available, the inter predicting unit 511 does not derive the temporal motion vector predictor.

As in Embodiment 1, the inter predicting unit 511 adds the temporal motion vector predictor set as available, to the list as the candidate for the current motion vector. The inter predicting unit 511 then selects the current motion vector from the list.

As described above, in this embodiment, in the case where the reference picture of the current block is a short-term reference picture and the reference picture of the co-located block is a long-term reference picture, the current motion vector is not derived from the motion vector of the co-located block.

It is extremely difficult to derive the current motion vector of high prediction accuracy, in the case where one of the current reference picture and the co-located reference picture is a long-term reference picture and the other one of the current reference picture and the co-located reference picture is a short-term reference picture. In view of this, the image coding apparatus 500 and the image decoding apparatus 600 according to this embodiment prevent prediction accuracy degradation by the operation described above.

Embodiment 3

An image coding apparatus and an image decoding apparatus according to Embodiment 3 have the same structures as those in Embodiment 1. Hence, the operations of the image coding apparatus and the image decoding apparatus according to this embodiment are described below, using the structure of the image coding apparatus 500 shown in FIG. 5 and the structure of the image decoding apparatus 600 shown in FIG. 6.

The image coding apparatus 500 according to this embodiment performs the operation shown in FIG. 7, as in Embodiment 1. The image decoding apparatus 600 according to this embodiment performs the operation shown in FIG. 8, as in Embodiment 1. This embodiment differs from Embodiment 1 in the current motion vector derivation process. This is described in detail below.

Figure 12:
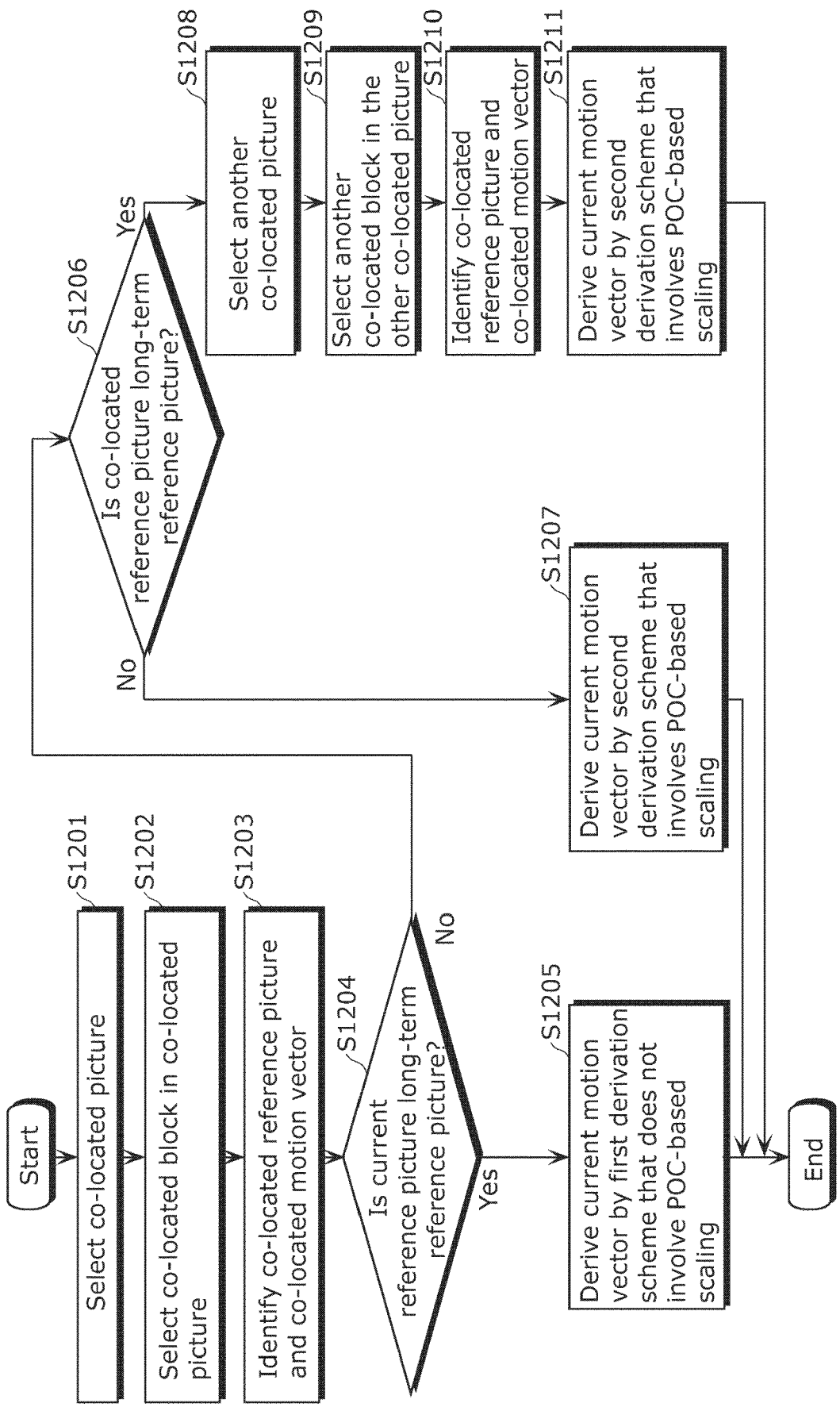
FIG. 12 is a flowchart showing details of a derivation process according to Embodiment 3.

FIG. 12 is a flowchart showing details of the derivation process according to this embodiment. The inter predicting unit 511 according to this embodiment performs the operation shown in FIG. 12, instead of the operation shown in FIG. 9. The following mainly describes the operation of the inter predicting unit 511 shown in FIG. 5. The operation of the inter predicting unit 608 shown in FIG. 6 is the same as the operation of the inter predicting unit 511 shown in FIG. 5, with "coding" being replaced with "decoding".

First, the inter predicting unit 511 selects the co-located picture from the plurality of available reference pictures (Step S1201). Next, the inter predicting unit 511 selects the co-located block in the co-located picture (Step S1202). The inter predicting unit 511 then identifies the co-located reference picture and the co-located motion vector (Step S1203).

Following this, the inter predicting unit 511 determines whether or not the current reference picture is a long-term reference picture (Step S1204). In the case of determining that the current reference picture is a long-term reference picture (Step S1204: Yes), the inter predicting unit 511 derives the current motion vector by the first derivation scheme same as in Embodiment 1 (Step S1205).

In the case of determining that the current reference picture is not a long-term reference picture (Step S1204: No), the inter predicting unit 511 determines whether or not the co-located reference picture is a long-term reference picture (Step S1206).

In the case of determining that the co-located reference picture is not a long-term reference picture (Step S1206: No), the inter predicting unit 511 derives the current motion vector by the second derivation scheme same as in Embodiment 1 (Step S1207). That is, in the case of determining that the current reference picture and the co-located reference picture are each a short-term reference picture, the inter predicting unit 511 derives the current motion vector by the second derivation scheme.

In the case of determining that the co-located reference picture is a long-term reference picture (Step S1206: Yes), the inter predicting unit 511 selects another co-located picture (Step S1208). The inter predicting unit 511 then selects another co-located block in the other co-located picture (Step S1209). In the example shown in FIG. 12, a block coded with reference to a short-term reference picture is selected as the other co-located block.

After this, the inter predicting unit 511 identifies the co-located reference picture and the co-located motion vector corresponding to the other co-located block (Step S1210). The inter predicting unit 511 then derives the current motion vector by the second derivation scheme that uses POC-based scaling (Step S1211).

In detail, in the case where the reference picture of the current block is a short-term reference picture and the reference picture of the co-located block is a long-term reference picture, the inter predicting unit 511 does not derive the current motion vector from the motion vector of the co-located block.

The inter predicting unit 511 instead selects another co-located picture. The inter predicting unit 511 further selects another co-located block coded with reference to a short-term reference picture, from the selected other co-located picture. The inter predicting unit 511 derives the current motion vector from the motion vector of the selected other co-located block.

As an example, in the case where the current reference picture is a short-term reference picture and the co-located reference picture is a long-term reference picture, the inter predicting unit 511 searches for a picture that includes a block coded with reference to a short-term reference picture. The inter predicting unit 511 selects the picture that includes the block coded with reference to the short-term reference picture, as the other co-located picture.

As another example, in the case where the current reference picture is a short-term reference picture and the co-located reference picture is a long-term reference picture, the inter predicting unit 511 first searches for a picture that includes a block coded with reference to a short-term reference picture.

In the case where the picture that includes the block coded with reference to the short-term reference picture is present, the inter predicting unit 511 selects the picture as the other co-located picture.

In the case where the picture that includes the block coded with reference to the short-term reference picture is not present, the inter predicting unit 511 searches for a picture that includes a block coded with reference to a long-term reference picture. The inter predicting unit 511 selects the picture that includes the block coded with reference to the long-term reference picture, as the other co-located picture.

For example, in the case where the picture RefPicList0[0] is the co-located picture, the picture RefPicList1[0] is the other co-located picture. In the case where the picture RefPicList1[0] is the co-located picture, the picture RefPicList0[0] is the other co-located picture.

In other words, the picture listed first in one of the two reference picture lists used for coding of B pictures (bi-predictive coding) is the co-located picture, and the picture listed first in the other one of the two reference picture lists is the other co-located picture.

The following describes a more specific example of the process of deriving the current motion vector with reference to FIG. 12 again. The derivation process described earlier may be changed as follows.

First, the inter predicting unit 511 selects one of the picture RefPicList0[0] and the picture RefPicList1[0], as the co-located picture (Step S1201). The inter predicting unit 511 selects, from the selected co-located picture, the first block including the sample c0 shown in FIG. 11 as the co-located block, and identifies the co-located reference picture (Steps S1202 and S1203).

Following this, the inter predicting unit 511 determines whether or not the co-located block is available. In the case where the current reference picture is a short-term reference picture and the co-located reference picture is a long-term reference picture, the inter predicting unit 511 determines that the co-located block is not available (Steps S1204 and S1206).

In the case where the co-located block is not available, the inter predicting unit 511 newly selects an available co-located block. For example, the inter predicting unit 511 selects the second block including the sample c1 shown in FIG. 11, as the co-located block. The inter predicting unit 511 then identifies the co-located reference picture.

In the case where the available co-located block is not selected, the inter predicting unit 511 selects another co-located picture. Here, the inter predicting unit 511 selects the other one of the picture RefPicList0[0] and the picture RefPicList1[0], as the co-located picture (Step S1208).

The inter predicting unit 511 selects, from the selected co-located picture, the first block including the sample c0 shown in FIG. 1 as the co-located block, and identifies the co-located reference picture (Steps S1209 and S1210).

Following this, the inter predicting unit 511 determines whether or not the co-located block is available. As in the previous determination, in the case where the current reference picture is a short-term reference picture and the co-located reference picture is a long-term reference picture, the inter predicting unit 511 determines that the co-located block is not available.

In the case where the co-located block is not available, the inter predicting unit 511 newly selects an available co-located block (Step S1209). In detail, the inter predicting unit 511 selects the second block including the sample c1 shown in FIG. 11, as the co-located block. The inter predicting unit 511 then identifies the co-located reference picture (Step S1210).

In the case where the available co-located block is eventually selected, the inter predicting unit 511 sets the temporal motion vector predictor as available. In the case where the available co-located block is eventually not selected, the inter predicting unit 511 sets the temporal motion vector predictor as not available.

In the case where the temporal motion vector predictor is set as available, the inter predicting unit 511 identifies the motion vector of the co-located block as the base motion vector (Steps S1203 and S1210). In the case where the co-located block has a plurality of motion vectors, that is, in the case where the co-located block is coded using a plurality of motion vectors, the inter predicting unit 511 selects the base motion vector according to predetermined priority order as in Embodiment 1.

In the case where any of the current reference picture and the co-located reference picture is a long-term reference picture (Step S1204: Yes), the inter predicting unit 511 derives the base motion vector as the temporal motion vector predictor (Step S1205).

In the case where none of the current reference picture and the co-located reference picture is a long-term reference picture (Step S1204: No), on the other hand, the inter predicting unit 511 derives the temporal motion vector predictor from the base motion vector by POC-based scaling (Steps S1207 and S1211).

In the case where the temporal motion vector predictor is set as not available, the inter predicting unit 511 does not derive the temporal motion vector predictor.

As in Embodiment 1, the inter predicting unit 511 adds the temporal motion vector predictor set as available, to the list as the candidate for the current motion vector. The inter predicting unit 511 then selects the current motion vector from the list.

As described above, the image coding apparatus 500 and the image decoding apparatus 600 according to this embodiment select the block suitable for current motion vector derivation from a plurality of pictures, and derive the current motion vector from the motion vector of the selected block. This contributes to improved coding efficiency.

Embodiment 4

Embodiment 4 confirmatorily describes the characteristic structures and the characteristic procedures included in Embodiments 1 to 3.

Figure 13A:
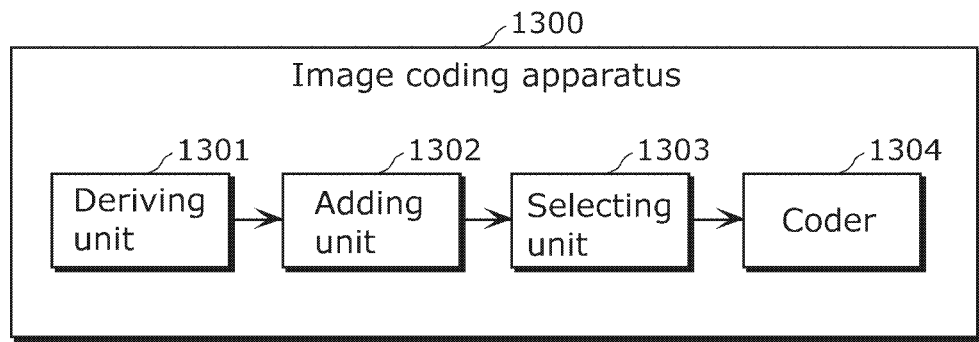
FIG. 13A is a block diagram of an image coding apparatus according to Embodiment 4.

FIG. 13A is a block diagram of an image coding apparatus according to this embodiment. An image coding apparatus 1300 shown in FIG. 13A codes each of blocks of pictures. The image coding apparatus 1300 includes a deriving unit 1301, an adding unit 1302, a selecting unit 1303, and a coder 1304.

For example, the deriving unit 1301, the adding unit 1302, and the selecting unit 1303 correspond to the inter predicting unit 511 shown in FIG. 5 and the like, and the coder 1304 corresponds to the entropy coder 504 shown in FIG. 5 and the like.

Figure 13B:
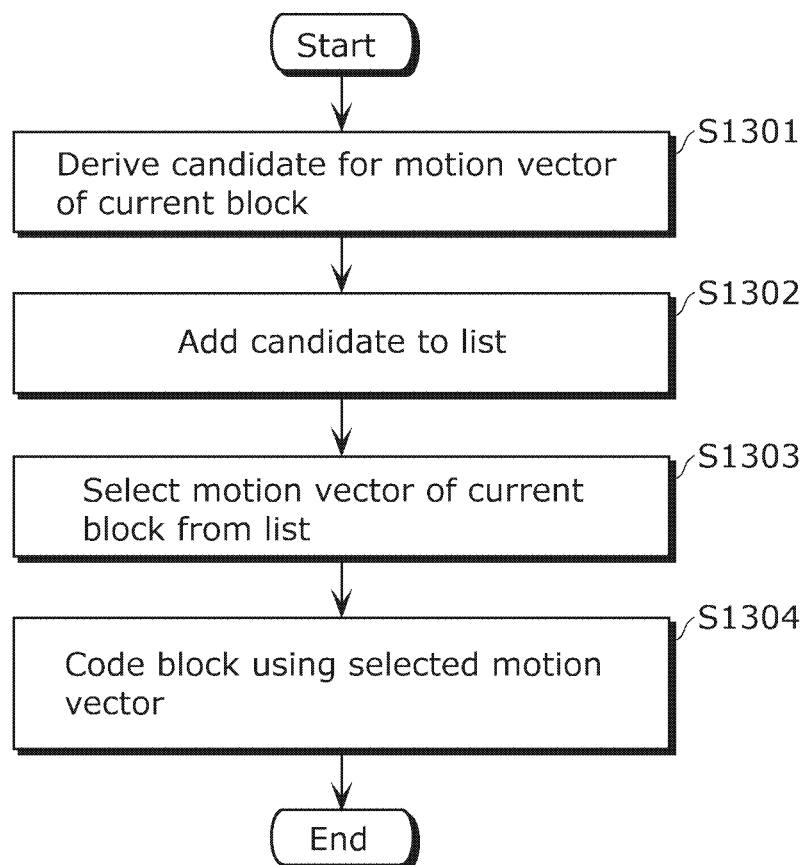
FIG. 13B is a flowchart showing an operation of the image coding apparatus according to Embodiment 4.

FIG. 13B is a flowchart showing an operation of the image coding apparatus 1300 shown in FIG. 13A.

The deriving unit 1301 derives a candidate for a motion vector of a current block, from a motion vector of a co-located block (Step S1301). The co-located block is a block included in a picture different from a picture that includes the current block to be coded.

In the derivation of the candidate, the deriving unit 1301 determines whether a reference picture of the current block is a long-term reference picture or a short-term reference picture. The deriving unit 1301 also determines whether a reference picture of the co-located block is a long-term reference picture or a short-term reference picture.

In the case of determining that the reference picture of the current block and the reference picture of the co-located block are each a long-term reference picture, the deriving unit 1301 derives the candidate from the motion vector of the co-located block by a first derivation scheme. The first derivation scheme is a derivation scheme that does not involve scaling based on a temporal distance.

In the case of determining that the reference picture of the current block and the reference picture of the co-located block are each a short-term reference picture, on the other hand, the deriving unit 1301 derives the candidate from the motion vector of the co-located block by a second derivation scheme. The second derivation scheme is a derivation scheme that involves scaling based on a temporal distance.

The adding unit 1302 adds the derived candidate to a list (Step S1302). The selecting unit 1303 selects the motion vector of the current block from the list to which the candidate is added (Step S1303).

The coder 1304 codes the current block using the selected motion vector and the reference picture of the current block (Step S1304).

Figure 14A:
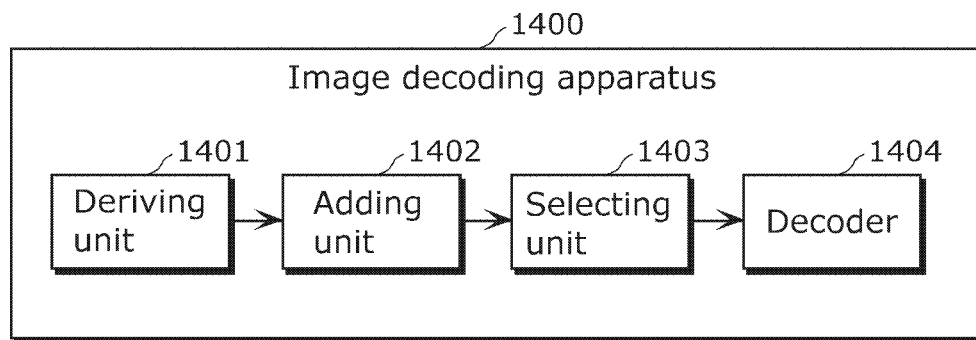
FIG. 14A is a block diagram of an image decoding apparatus according to Embodiment 4.

FIG. 14A is a block diagram of an image decoding apparatus according to this embodiment. An image decoding apparatus 1400 shown in FIG. 14A decodes each of blocks of pictures. The image decoding apparatus 1400 includes a deriving unit 1401, an adding unit 1402, a selecting unit 1403, and a decoder 1404.

For example, the deriving unit 1401, the adding unit 1402, and the selecting unit 1403 correspond to the inter predicting unit 608 shown in FIG. 6 and the like, and the decoder 1404 corresponds to the entropy decoder 601 shown in FIG. 6 and the like.

Figure 14B:
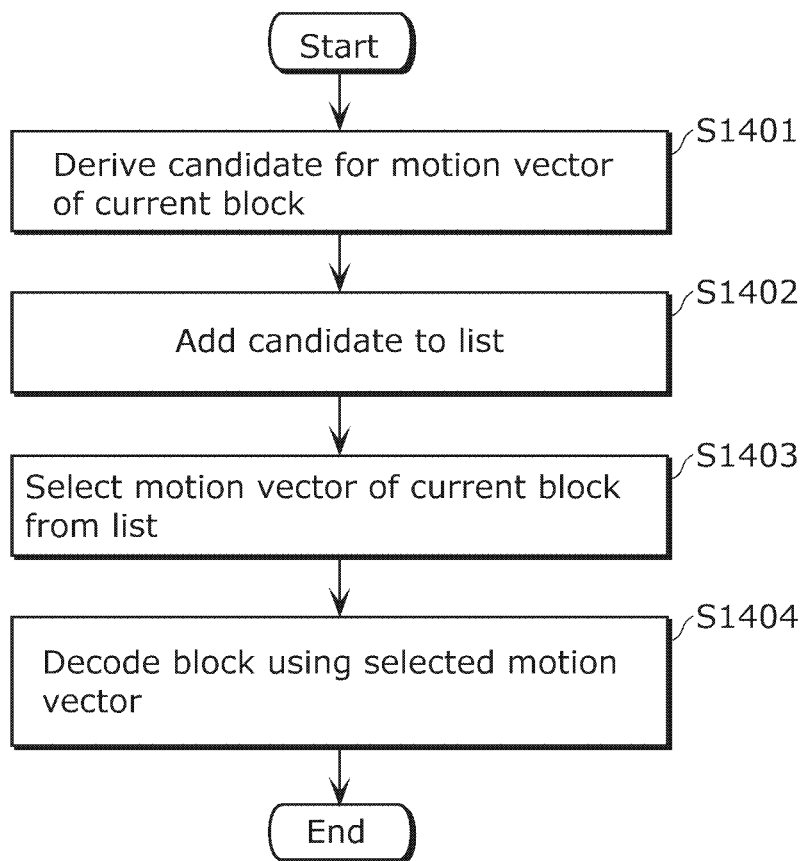
FIG. 14B is a flowchart showing an operation of the image decoding apparatus according to Embodiment 4.

FIG. 14B is a flowchart showing an operation of the image decoding apparatus 1400 shown in FIG. 14A.

The deriving unit 1401 derives a candidate for a motion vector of a current block, from a motion vector of a co-located block (Step S1401). The co-located block is a block included in a picture different from a picture that includes a current block to be decoded.

In the derivation of the candidate, the deriving unit 1401 determines whether a reference picture of the current block is a long-term reference picture or a short-term reference picture. The deriving unit 1401 also determines whether a reference picture of the co-located block is a long-term reference picture or a short-term reference picture.

In the case of determining that the reference picture of the current block and the reference picture of the co-located block are each a long-term reference picture, the deriving unit 1401 derives the candidate from the motion vector of the co-located block by a first derivation scheme. The first derivation scheme is a derivation scheme that does not involve scaling based on a temporal distance.

In the case of determining that the reference picture of the current block and the reference picture of the co-located block are each a short-term reference picture, on the other hand, the deriving unit 1401 derives the candidate from the motion vector of the co-located block by a second derivation scheme. The second derivation scheme is a derivation scheme that involves scaling based on a temporal distance.

The adding unit 1402 adds the derived candidate to a list (Step S1402). The selecting unit 1403 selects the motion vector of the current block from the list to which the candidate is added (Step S1403).

The decoder 1404 decodes the current block using the selected motion vector and the reference picture of the current block (Step S1404).

Through the process described above, the candidate for the current motion vector is appropriately derived from the motion vector of the co-located block, without being extremely large or small. This contributes to improved prediction accuracy and improved coding efficiency.

Here, the deriving units 1301 and 1401 may each not derive the candidate from the motion vector of the co-located block, in the case of determining that one of the reference picture of the current block and the reference picture of the co-located block is a long-term reference picture and the other one of the reference picture of the current block and the reference picture of the co-located block is a short-term reference picture.

In this case, the deriving units 1301 and 1401 may each further select another co-located block coded or decoded with reference to a short-term reference picture, and derive the candidate from the other co-located block by the second derivation scheme. As an alternative, the deriving units 1301 and 1401 may each derive the candidate by another derivation scheme. As another alternative, the deriving units 1301 and 1401 may each eventually not derive the candidate corresponding to the temporal motion vector predictor.

The deriving units 1301 and 1401 may determine whether the reference picture of the current block is a long-term reference picture or a short-term reference picture, using a temporal distance between the reference picture of the current block and the picture that includes the current block.

The deriving units 1301 and 1401 may each determine whether the reference picture of the co-located block is a long-term reference picture or a short-term reference picture, using a temporal distance between the reference picture of the co-located block and the picture that includes the co-located block.

The deriving units 1301 and 1401 may each determine whether the reference picture of the co-located block is a long-term reference picture or a short-term reference picture, in a period during which the co-located block is coded or decoded.

The deriving units 1301 and 1401 may each determine whether the reference picture of the co-located block is a long-term reference picture or a short-term reference picture, in a period during which the current block is coded or decoded.

The first derivation scheme may be a scheme of deriving the motion vector of the co-located block as the candidate. The second derivation scheme may be a scheme of deriving the candidate by scaling the motion vector of the co-located block using a ratio of the temporal distance between the reference picture of the current block and the picture that includes the current block to the temporal distance between the reference picture of the co-located block and the picture that includes the co-located block.

The coder 1304 may further code information indicating whether the reference picture of the current block is a long-term reference picture or a short-term reference picture, and information indicating whether the reference picture of the co-located block is a long-term reference picture or a short-term reference picture.

The decoder 1404 may further decode information indicating whether the reference picture of the current block is a long-term reference picture or a short-term reference picture, and information indicating whether the reference picture of the co-located block is a long-term reference picture or a short-term reference picture.

The deriving unit 1401 may then determine whether the reference picture of the current block is a long-term reference picture or a short-term reference picture using the decoded information, and determine whether the reference picture of the co-located block is a long-term reference picture or a short-term reference picture using the decoded information.

Information indicating classification of each reference picture may be stored, as a parameter, in a bitstream at a location described below.

Figure 15A:
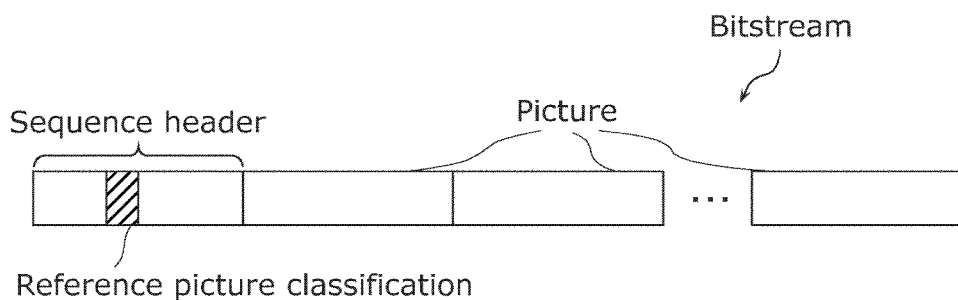
FIG. 15A is a diagram showing a first example of a storage location of a parameter indicating a reference picture classification.

FIG. 15A is a diagram showing a first example of the storage location of the parameter indicating the reference picture classification. As shown in FIG. 15A, the parameter indicating the reference picture classification may be stored in a sequence header. The sequence header is also referred to as a sequence parameter set.

Figure 15B:
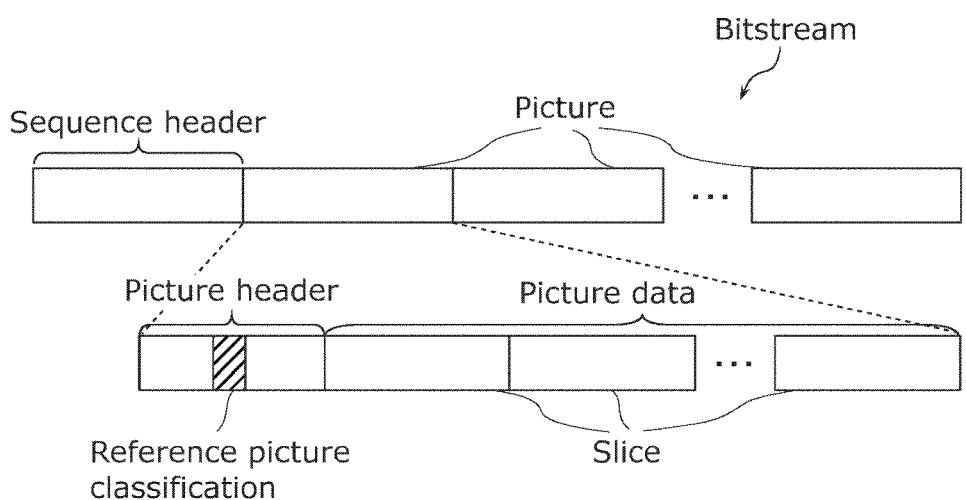
FIG. 15B is a diagram showing a second example of the storage location of the parameter indicating the reference picture classification.

FIG. 15B is a diagram showing a second example of the storage location of the parameter indicating the reference picture classification. As shown in FIG. 15B, the parameter indicating the reference picture classification may be stored in a picture header. The picture header is also referred to as a picture parameter set.

Figure 15C:
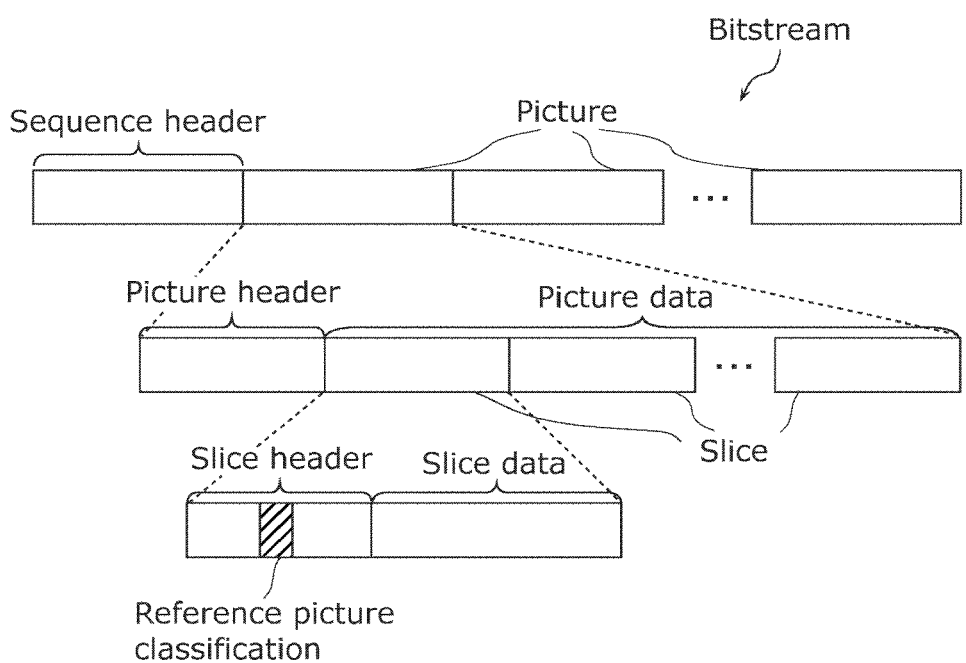
FIG. 15C is a diagram showing a third example of the storage location of the parameter indicating the reference picture classification.

FIG. 15C is a diagram showing a third example of the storage location of the parameter indicating the reference picture classification. As shown in FIG. 15C, the parameter indicating the reference picture classification may be stored in a slice header.

Information indicating a prediction mode (inter prediction or intra prediction) may be stored, as a parameter, in the bitstream at a location described below.

Figure 16:
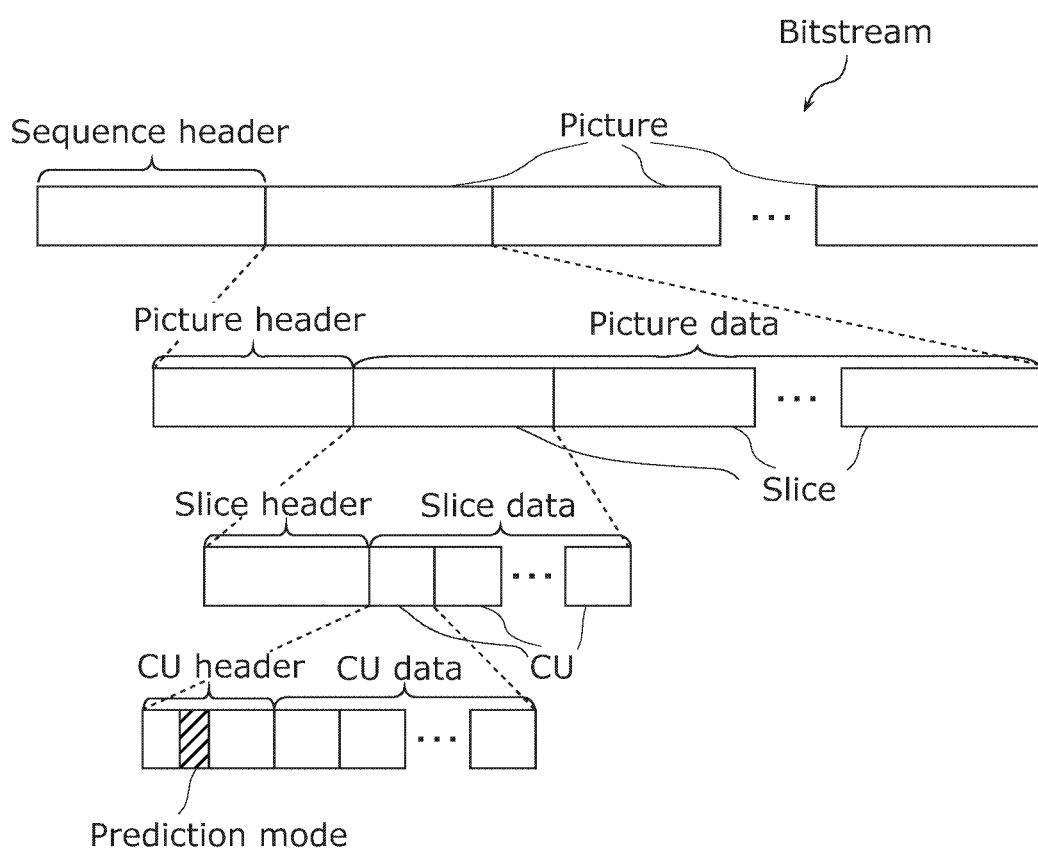
FIG. 16 is a diagram showing an example of a storage location of a parameter indicating a prediction mode.

FIG. 16 is a diagram showing an example of the storage location of the parameter indicating the prediction mode. As shown in FIG. 16, the parameter may be stored in a CU header (coding unit header). The parameter indicates whether a prediction unit in a coding unit is coded by inter prediction or intra prediction. This parameter may be used to determine whether or not the co-located block is available.

Each of the structural elements in each of the above-described embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or a semiconductor memory. Here, the software program for realizing the image coding apparatus and the like according to each of the embodiments is a program described below.

The program causes a computer to execute an image coding method of coding each of blocks of pictures, the image coding method including: deriving a candidate for a motion vector of a current block to be coded, from a motion vector of a co-located block which is a block included in a picture different from a picture that includes the current block; adding the derived candidate to a list; selecting the motion vector of the current block from the list to which the candidate is added; and coding the current block using the selected motion vector and a reference picture of the current block, wherein the deriving includes: determining whether the reference picture of the current block is a long-term reference picture or a short-term reference picture, and whether a reference picture of the co-located block is a long-term reference picture or a short-term reference picture; deriving the candidate from the motion vector of the co-located block by a first derivation scheme that does not involve scaling based on a temporal distance, in the case of determining that each of the reference picture of the current block and the reference picture of the co-located block is a long-term reference picture; and deriving the candidate from the motion vector of the co-located block by a second derivation scheme that involves scaling based on a temporal distance, in the case of determining that each of the reference picture of the current block and the reference picture of the co-located block is a short-term reference picture.

The program may cause the computer to execute an image decoding method of decoding each of blocks of pictures, the image decoding method including: deriving a candidate for a motion vector of a current block to be decoded, from a motion vector of a co-located block which is a block included in a picture different from a picture that includes the current block; adding the derived candidate to a list; selecting the motion vector of the current block from the list to which the candidate is added; and decoding the current block using the selected motion vector and a reference picture of the current block, wherein the deriving includes: determining whether the reference picture of the current block is a long-term reference picture or a short-term reference picture, and whether a reference picture of the co-located block is a long-term reference picture or a short-term reference picture; deriving the candidate from the motion vector of the co-located block by a first derivation scheme that does not involve scaling based on a temporal distance, in the case of determining that each of the reference picture of the current block and the reference picture of the co-located block is a long-term reference picture; and deriving the candidate from the motion vector of the co-located block by a second derivation scheme that involves scaling based on a temporal distance, in the case of determining that each of the reference picture of the current block and the reference picture of the co-located block is a short-term reference picture.

Each of the structural elements may be a circuit. These circuits may wholly constitute one circuit, or be separate circuits. Each of the structural elements may be realized by a general-purpose processor or realized by a special-purpose processor.

The herein disclosed subject matter is to be considered descriptive and illustrative only, and the appended Claims are of a scope intended to cover and encompass not only the particular embodiments disclosed, but also equivalent structures, methods, and/or uses.

For example, an image coding and decoding apparatus may include the image coding apparatus and the image decoding apparatus. A process executed by a specific processing unit may be executed by another processing unit. Processes may be executed in different order, and two or more processes may be executed in parallel.

Embodiment 5

The processing described in each of embodiments can be simply implemented in an independent computer system, by recording, in a recording medium, a program for implementing the configurations of the moving picture coding method (image coding method) and the moving picture decoding method (image decoding method) described in each of embodiments. The recording media may be any recording media as long as the program can be recorded, such as a magnetic disk, an optical disk, a magnetic optical disk, an IC card, and a semiconductor memory.

Hereinafter, the applications to the moving picture coding method (image coding method) and the moving picture decoding method (image decoding method) described in each of embodiments and systems using thereof will be described. The system has a feature of having an image coding and decoding apparatus that includes an image coding apparatus using the image coding method and an image decoding apparatus using the image decoding method. Other configurations in the system can be changed as appropriate depending on the cases.

Figure 17:
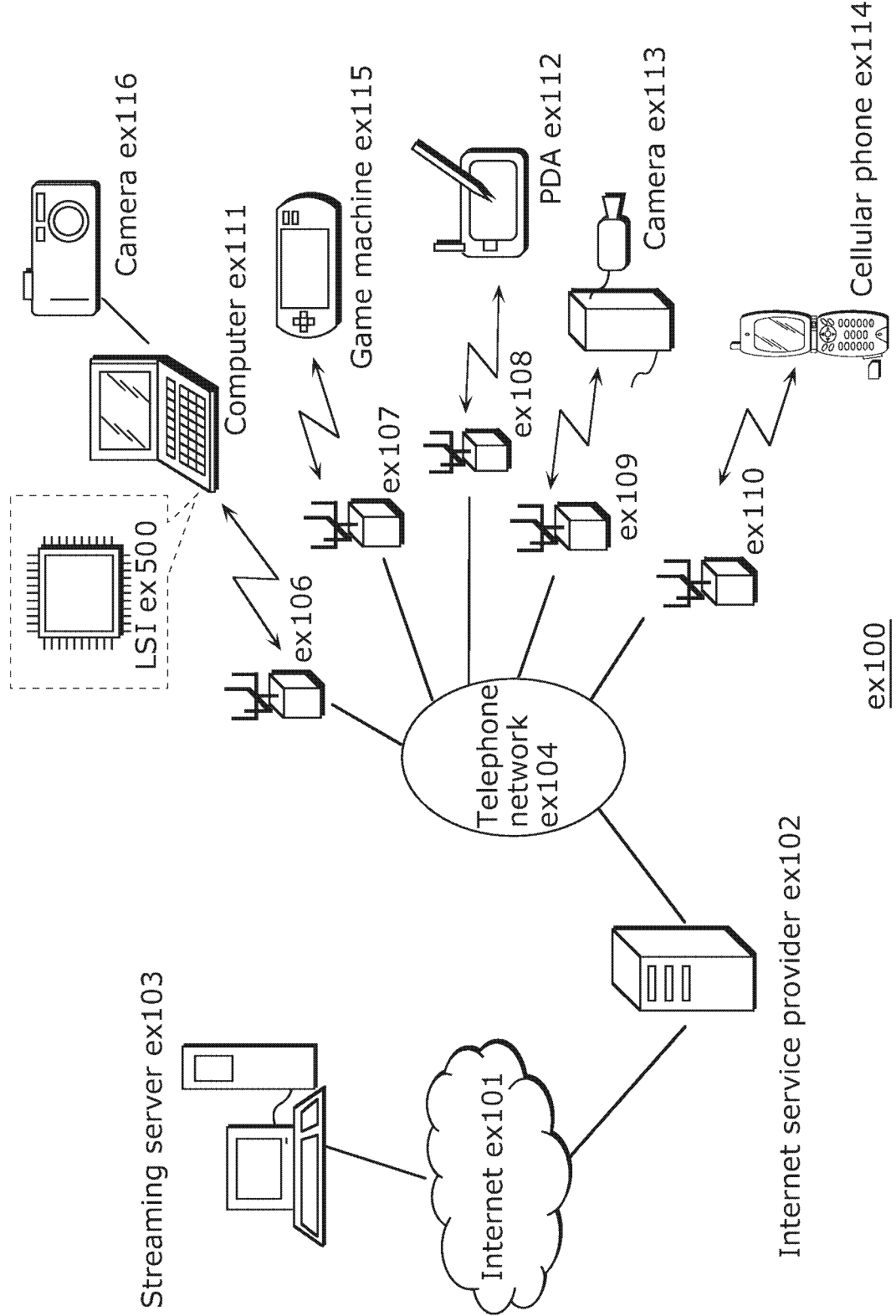
FIG. 17 illustrates an overall configuration of a content providing system for implementing content distribution services.

FIG. 17 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 17, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital camera, is capable of capturing both still images and video. Furthermore, the cellular phone ex114 may be the one that meets any of the standards such as Global System for Mobile Communications (GSM) (registered trademark), Code Division Multiple Access (CDMA), Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of embodiments (i.e., the camera functions as the image coding apparatus according to an aspect of the present disclosure), and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data (i.e., functions as the image decoding apparatus according to an aspect of the present disclosure).

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the video data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Figure 18:
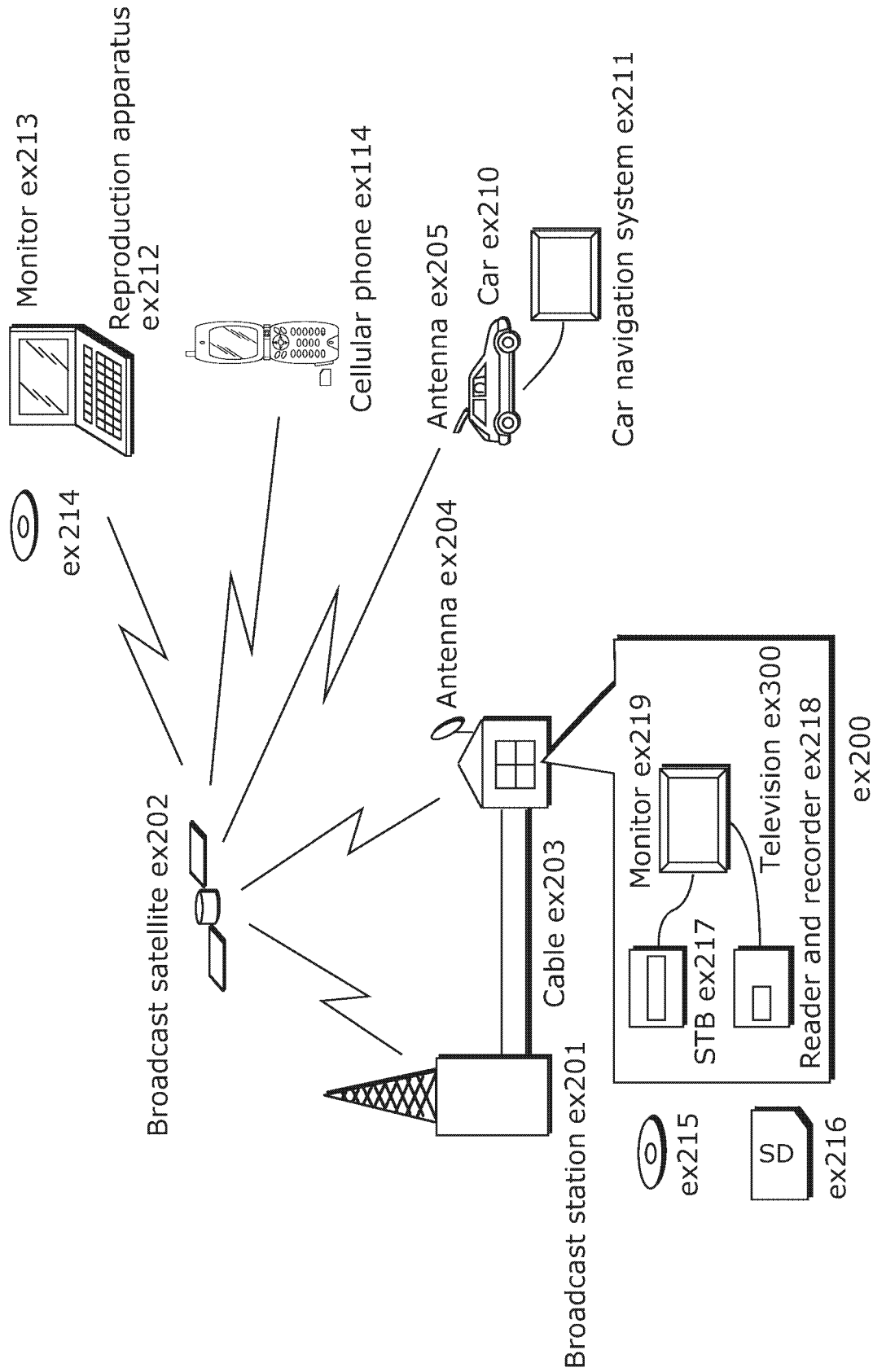
FIG. 18 illustrates an overall configuration of a digital broadcasting system.

Aside from the example of the content providing system ex100, at least one of the moving picture coding apparatus (image coding apparatus) and the moving picture decoding apparatus (image decoding apparatus) described in each of embodiments may be implemented in a digital broadcasting system ex200 illustrated in FIG. 18. More specifically, a broadcast station ex201 communicates or transmits, via radio waves to a broadcast satellite ex202, multiplexed data obtained by multiplexing audio data and others onto video data. The video data is data coded by the moving picture coding method described in each of embodiments (i.e., data coded by the image coding apparatus according to an aspect of the present disclosure). Upon receipt of the multiplexed data, the broadcast satellite ex202 transmits radio waves for broadcasting. Then, a home-use antenna ex204 with a satellite broadcast reception function receives the radio waves. Next, a device such as a television (receiver) ex300 and a set top box (STB) ex217 decodes the received multiplexed data, and reproduces the decoded data (i.e., functions as the image decoding apparatus according to an aspect of the present disclosure).

Furthermore, a reader/recorder ex218 (i) reads and decodes the multiplexed data recorded on a recording medium ex215, such as a DVD and a BD, or (i) codes video signals in the recording medium ex215, and in some cases, writes data obtained by multiplexing an audio signal on the coded data. The reader/recorder ex218 can include the moving picture decoding apparatus or the moving picture coding apparatus as shown in each of embodiments. In this case, the reproduced video signals are displayed on the monitor ex219, and can be reproduced by another device or system using the recording medium ex215 on which the multiplexed data is recorded. It is also possible to implement the moving picture decoding apparatus in the set top box ex217 connected to the cable ex203 for a cable television or to the antenna ex204 for satellite and/or terrestrial broadcasting, so as to display the video signals on the monitor ex219 of the television ex300. The moving picture decoding apparatus may be implemented not in the set top box but in the television ex300.

Figure 19:
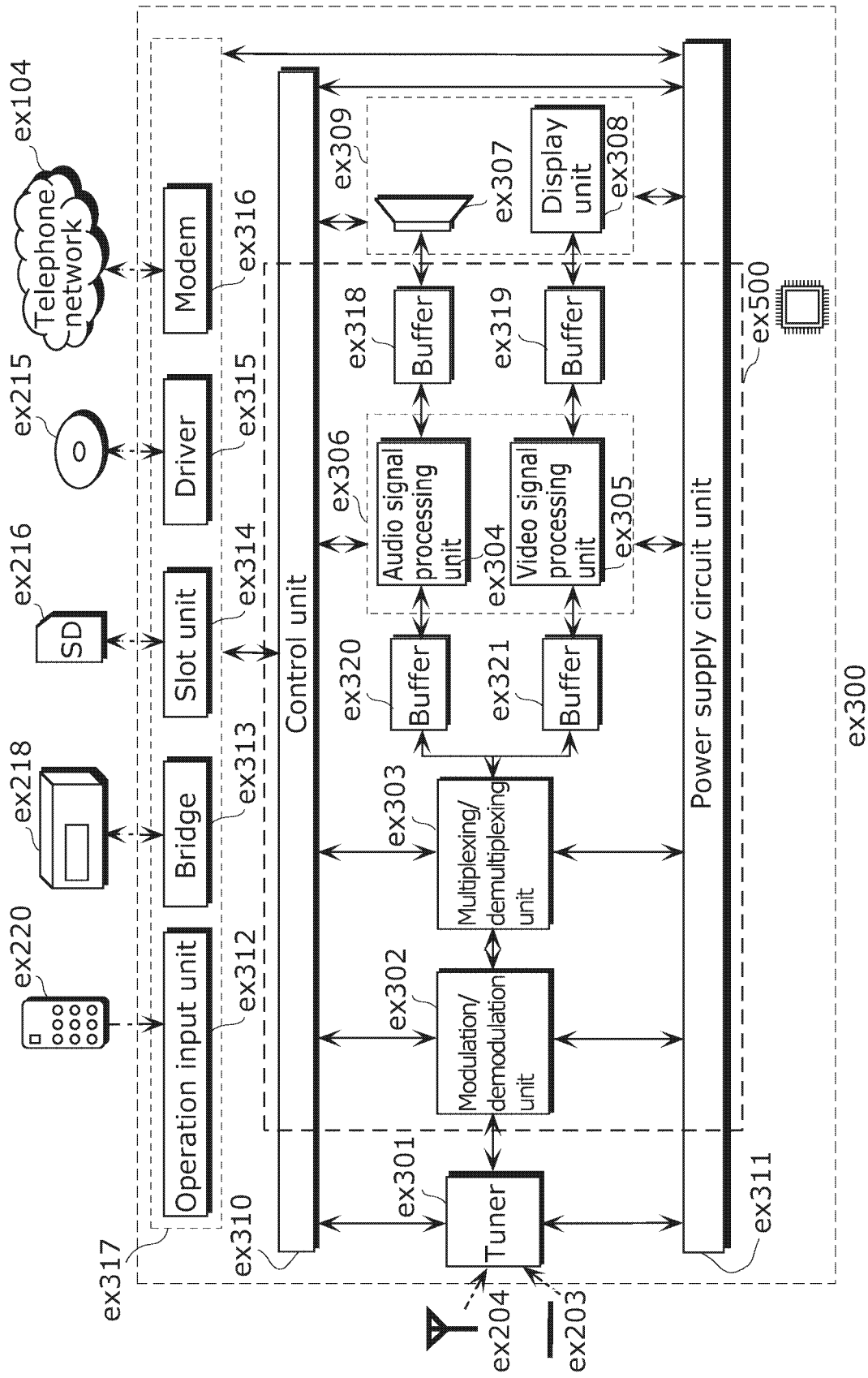
FIG. 19 is a block diagram illustrating an example of a configuration of a television.

FIG. 19 illustrates the television (receiver) ex300 that uses the moving picture coding method and the moving picture decoding method described in each of embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively (which function as the image coding apparatus and the image decoding apparatus according to the aspects of the present disclosure); and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

Figure 20:
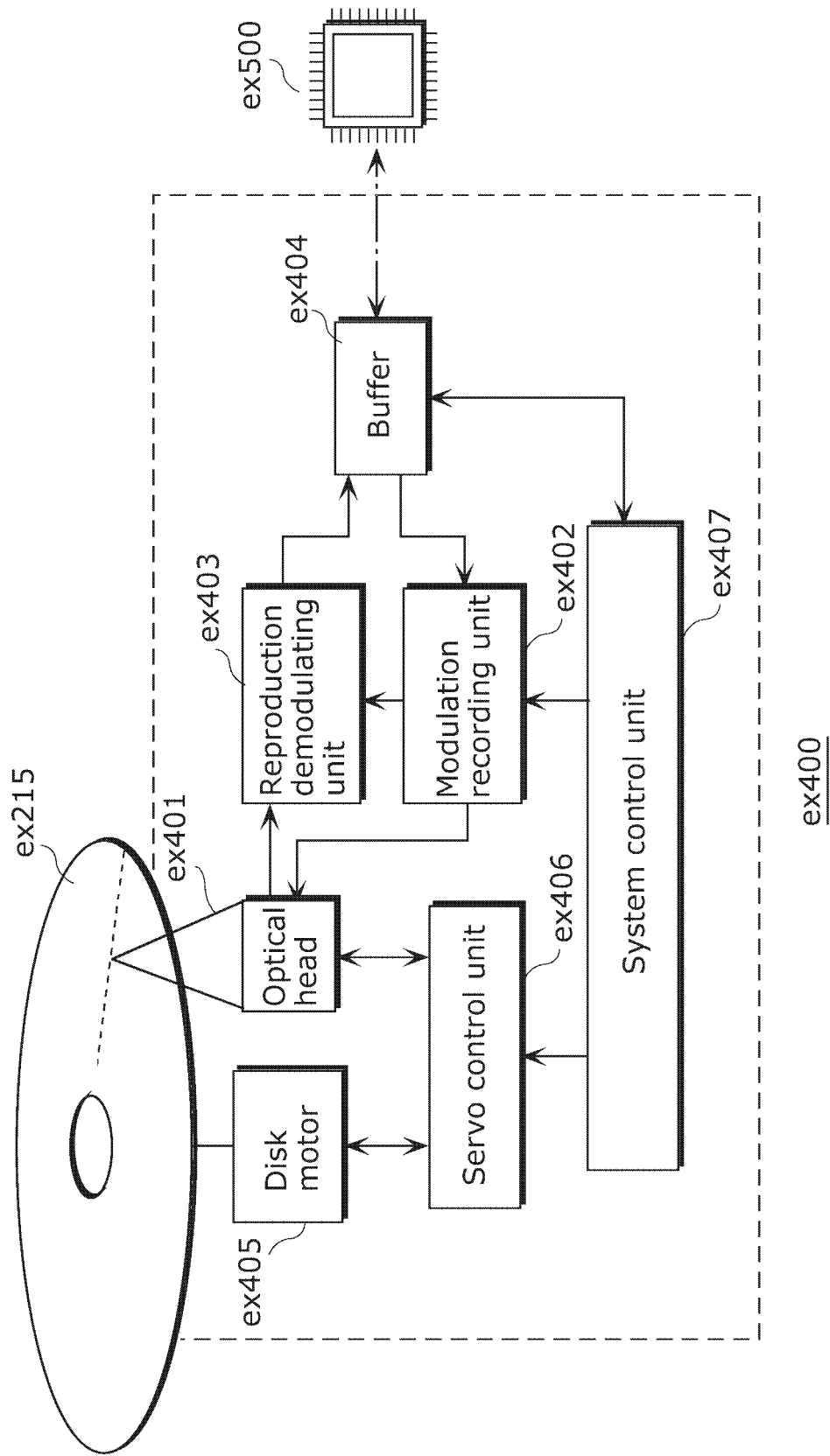
FIG. 20 is a block diagram illustrating an example of a configuration of an information reproducing/recording unit that reads and writes information from or on a recording medium that is an optical disk.

As an example, FIG. 20 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

Figure 21:
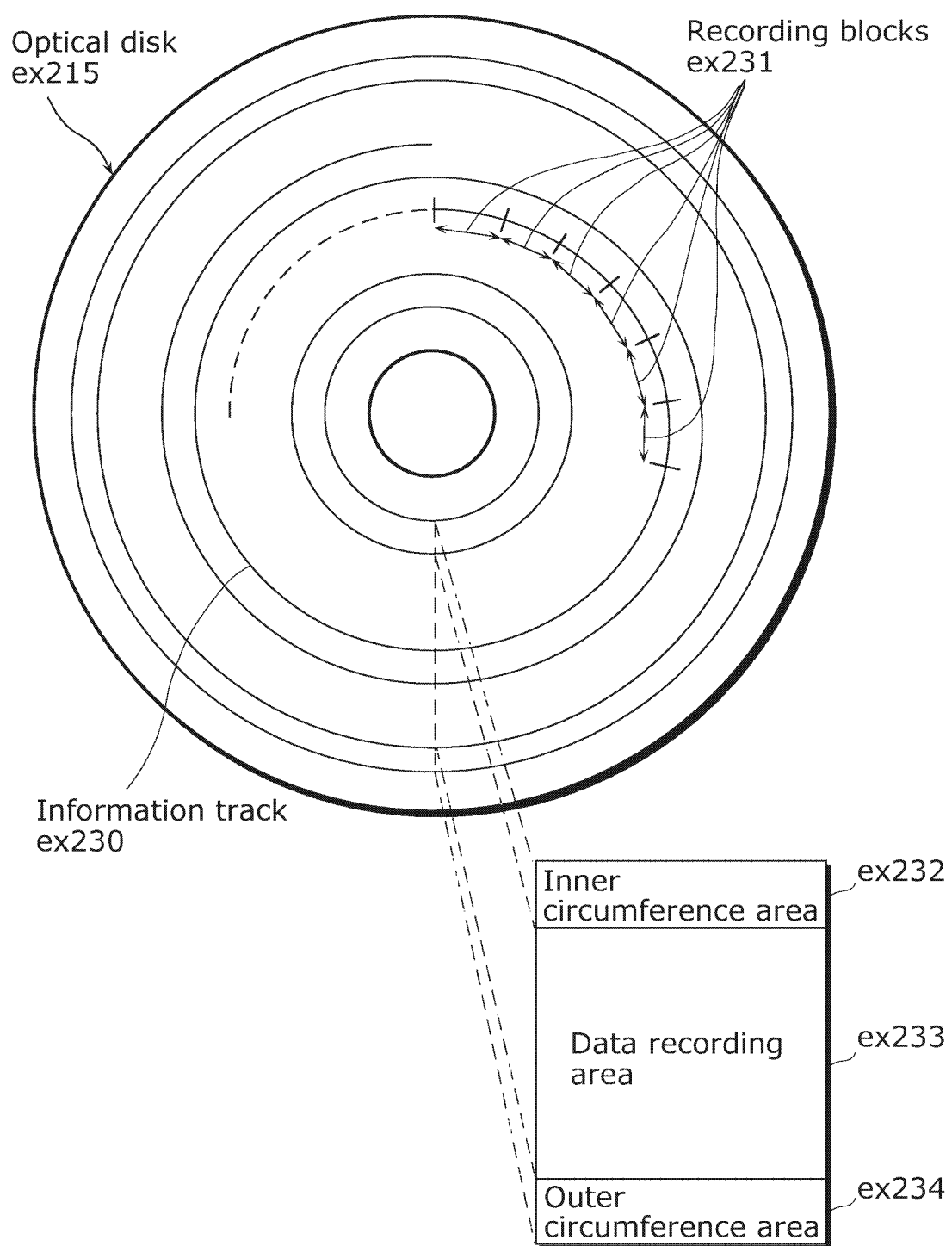
FIG. 21 shows an example of a configuration of a recording medium that is an optical disk.

FIG. 21 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidimensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 19. The same will be true for the configuration of the computer ex111, the cellular phone ex114, and others.

Figure 22A:
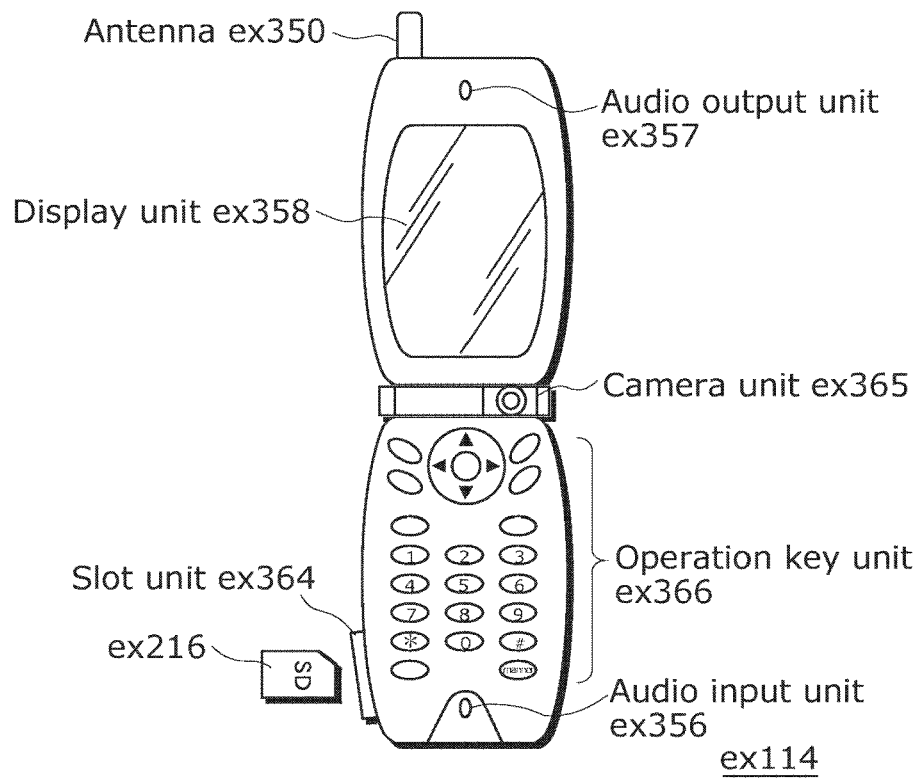
FIG. 22A shows an example of a cellular phone.

FIG. 22A illustrates the cellular phone ex114 that uses the moving picture coding method and the moving picture decoding method described in embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Figure 22B:
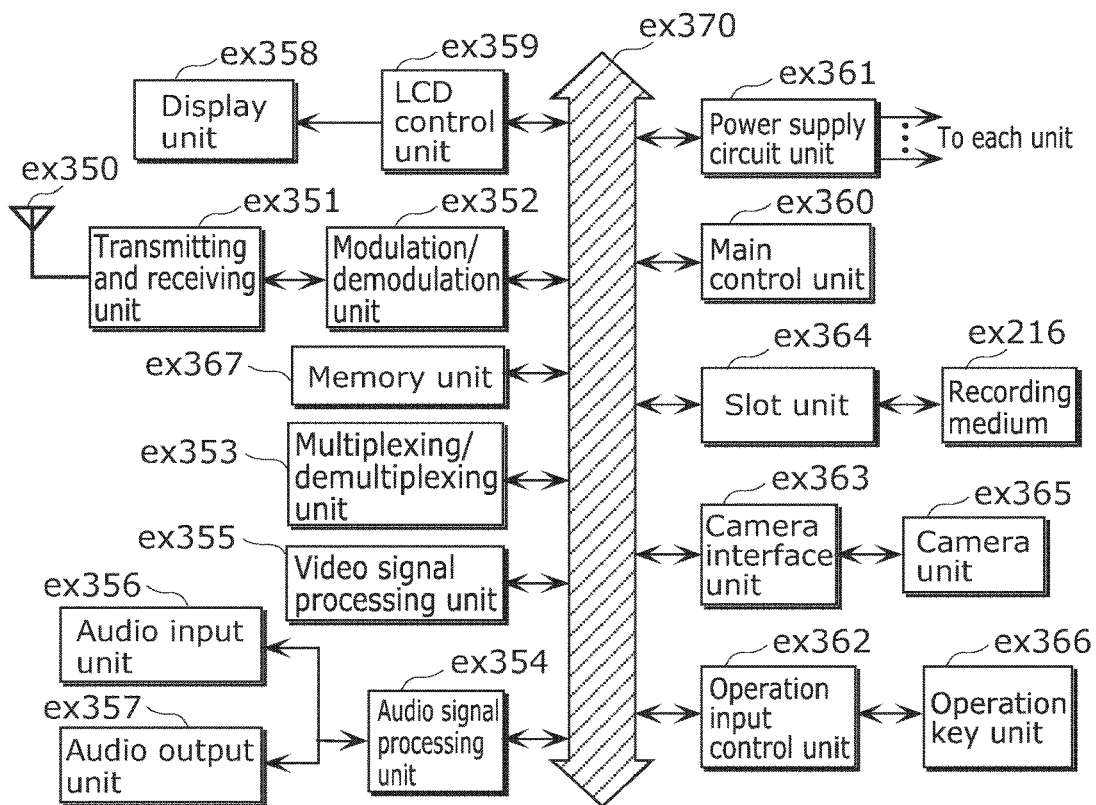
FIG. 22B shows an example of a configuration of the cellular phone.

Next, an example of a configuration of the cellular phone ex114 will be described with reference to FIG. 22B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350. Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex357.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the moving picture coding method shown in each of embodiments (i.e., functions as the image coding apparatus according to the aspect of the present disclosure), and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the multiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method. Then, the modulation/demodulation unit (modulation/demodulation circuit unit) ex352 performs spread spectrum processing on the multiplexed data, and the transmitting and receiving unit ex351 performs digital-to-analog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a moving picture decoding method corresponding to the moving picture coding method shown in each of embodiments (i.e., functions as the image decoding apparatus according to the aspect of the present disclosure), and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the moving picture coding method and the moving picture decoding method in each of embodiments can be used in any of the devices and systems described. Thus, the advantages described in each of embodiments can be obtained.

Furthermore, various modifications and revisions can be made in any of the embodiments in the present disclosure.

Embodiment 6

Video data can be generated by switching, as necessary, between (i) the moving picture coding method or the moving picture coding apparatus shown in each of embodiments and (ii) a moving picture coding method or a moving picture coding apparatus in conformity with a different standard, such as MPEG-2, MPEG-4 AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the moving picture coding method and by the moving picture coding apparatus shown in each of embodiments will be hereinafter described. The multiplexed data is a digital stream in the MPEG-2 Transport Stream format.

Figure 23:
FIG. 23 shows a structure of multiplexed data.

FIG. 23 illustrates a structure of the multiplexed data. As illustrated in FIG. 23, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the moving picture coding method or by the moving picture coding apparatus shown in each of embodiments, or in a moving picture coding method or by a moving picture coding apparatus in conformity with a conventional standard, such as MPEG-2, MPEG-4 AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary audio to be mixed with the primary audio.

Figure 24:
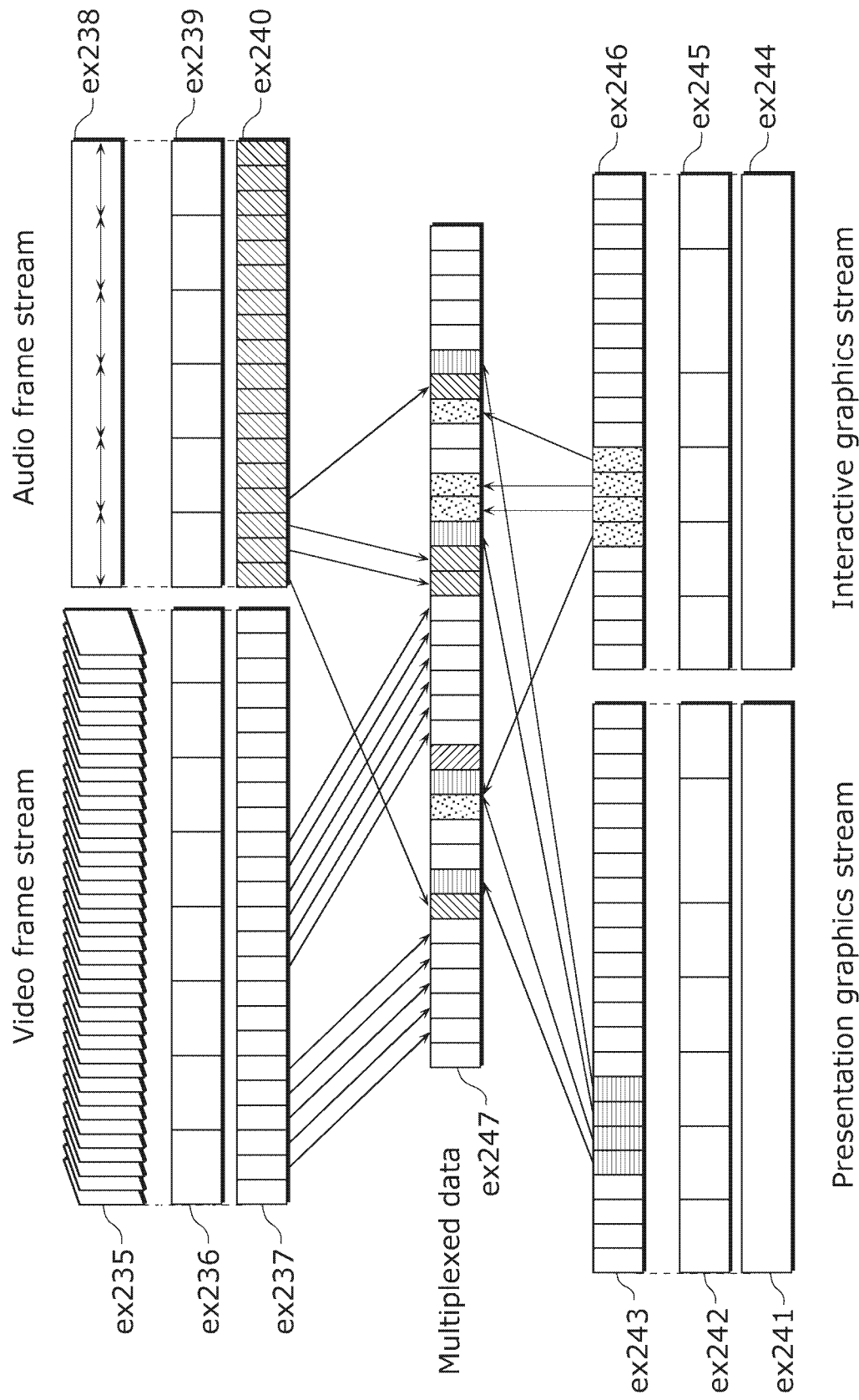
FIG. 24 schematically illustrates how each of streams is multiplexed in multiplexed data.

FIG. 24 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

Figure 25:
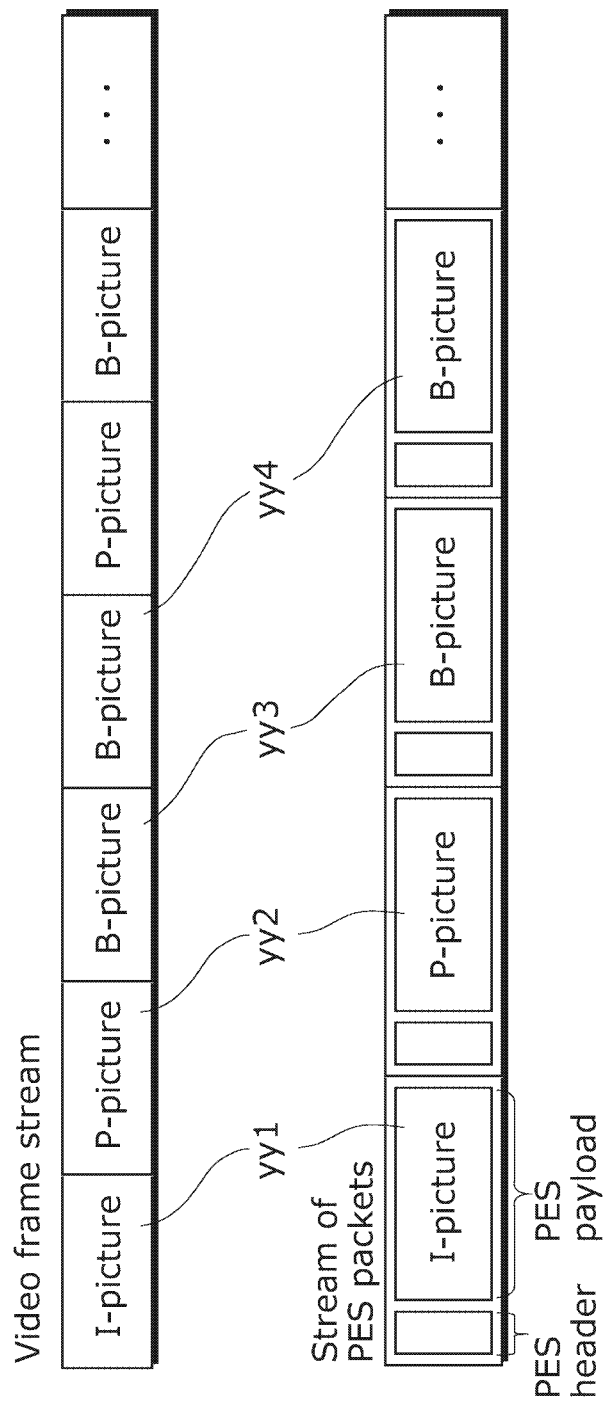
FIG. 25 illustrates how a video stream is stored in a stream of PES packets in more detail.

FIG. 25 illustrates how a video stream is stored in a stream of PES packets in more detail. The first bar in FIG. 25 shows a video frame stream in a video stream. The second bar shows the stream of PES packets. As indicated by arrows denoted as yy1, yy2, yy3, and yy4 in FIG. 25, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 26 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 26. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

Figure 27:
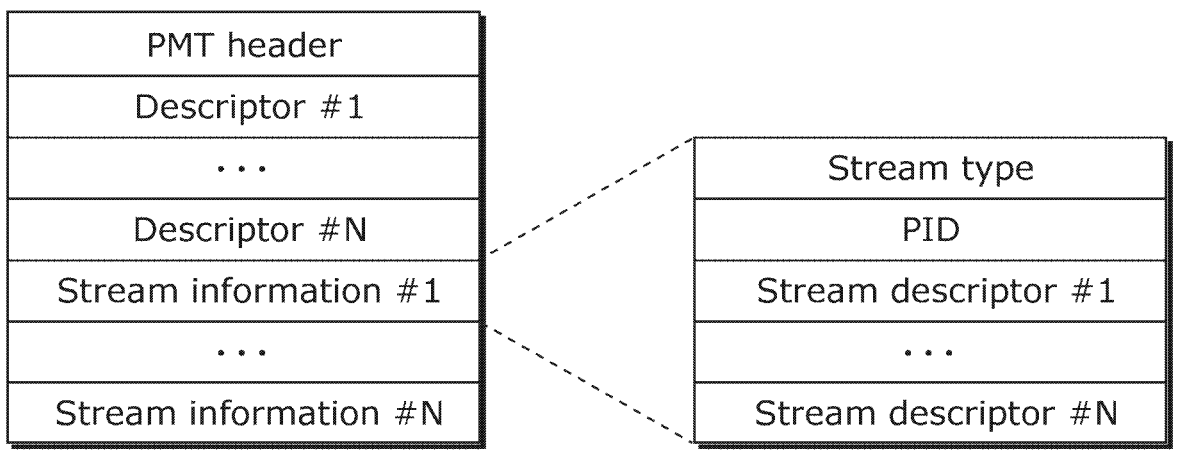
FIG. 27 shows a data structure of a PMT.

FIG. 27 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Figure 28:
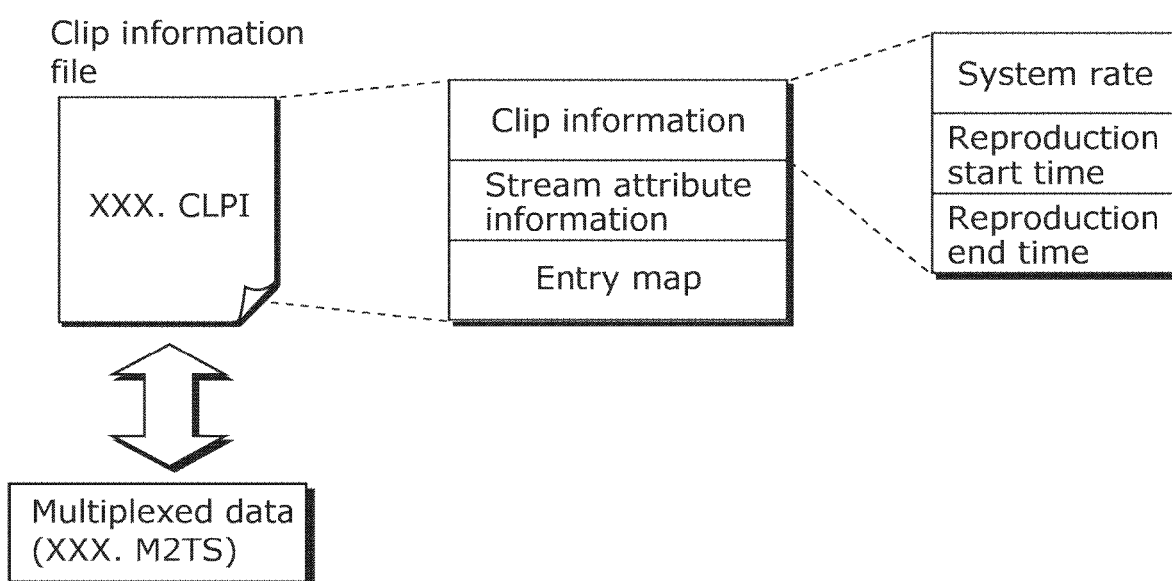
FIG. 28 shows an internal structure of multiplexed data information.

Each of the multiplexed data information files is management information of the multiplexed data as shown in FIG. 28. The multiplexed data information files are in one to one correspondence with the multiplexed data, and each of the files includes multiplexed data information, stream attribute information, and an entry map.

As illustrated in FIG. 28, the multiplexed data information includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

Figure 29:
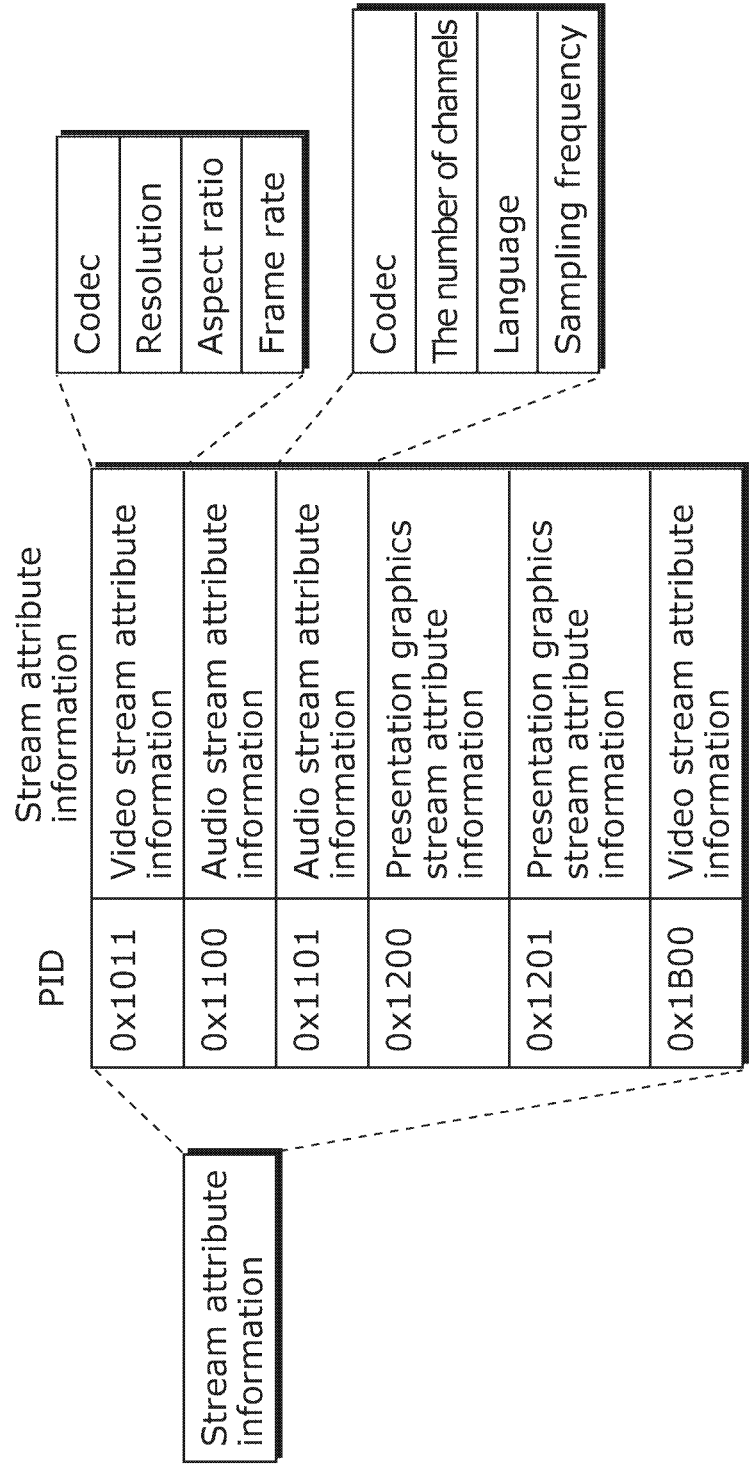
FIG. 29 shows an internal structure of stream attribute information.

As shown in FIG. 29, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In the present embodiment, the multiplexed data to be used is of a stream type included in the PMT. Furthermore, when the multiplexed data is recorded on a recording medium, the video stream attribute information included in the multiplexed data information is used. More specifically, the moving picture coding method or the moving picture coding apparatus described in each of embodiments includes a step or a unit for allocating unique information indicating video data generated by the moving picture coding method or the moving picture coding apparatus in each of embodiments, to the stream type included in the PMT or the video stream attribute information. With the configuration, the video data generated by the moving picture coding method or the moving picture coding apparatus described in each of embodiments can be distinguished from video data that conforms to another standard.

Figure 30:
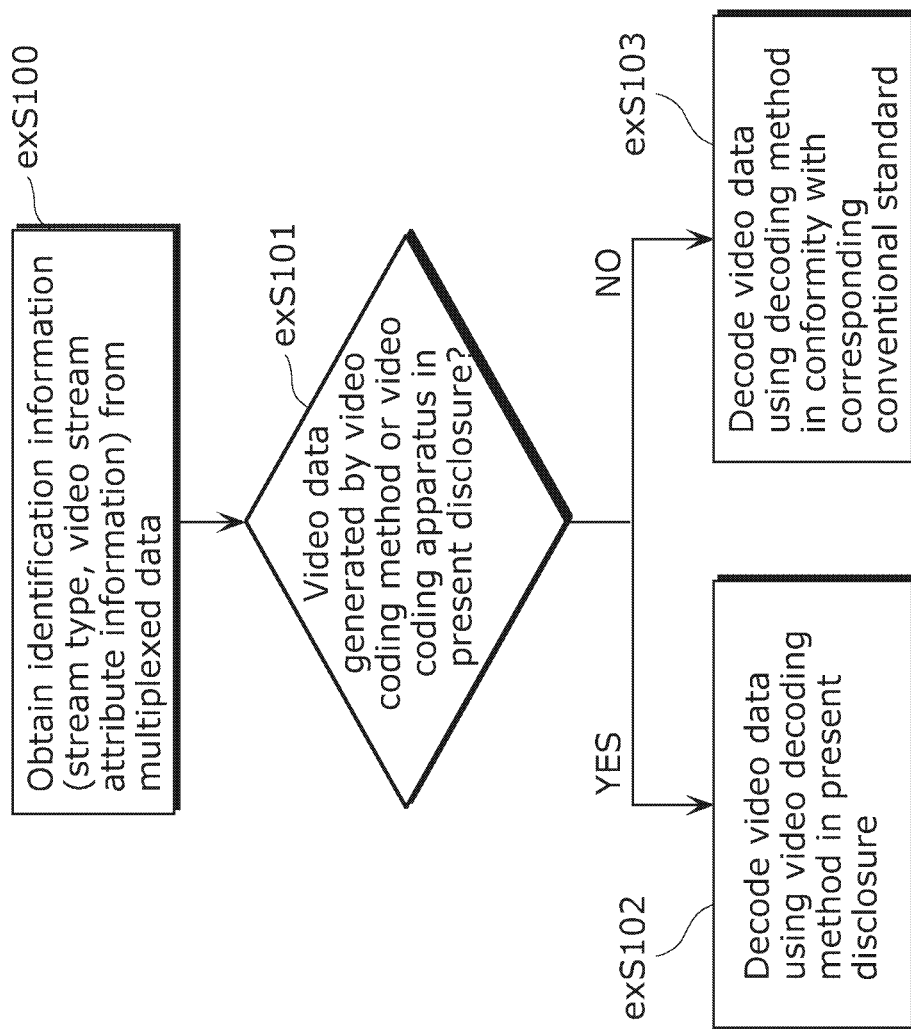
FIG. 30 shows steps for identifying video data.

Furthermore, FIG. 30 illustrates steps of the moving picture decoding method according to the present embodiment. In Step exS100, the stream type included in the PMT or the video stream attribute information included in the multiplexed data information is obtained from the multiplexed data. Next, in Step exS101, it is determined whether or not the stream type or the video stream attribute information indicates that the multiplexed data is generated by the moving picture coding method or the moving picture coding apparatus in each of embodiments. When it is determined that the stream type or the video stream attribute information indicates that the multiplexed data is generated by the moving picture coding method or the moving picture coding apparatus in each of embodiments, in Step exS102, decoding is performed by the moving picture decoding method in each of embodiments. Furthermore, when the stream type or the video stream attribute information indicates conformance to the conventional standards, such as MPEG-2, MPEG-4 AVC, and VC-1, in Step exS103, decoding is performed by a moving picture decoding method in conformity with the conventional standards.

As such, allocating a new unique value to the stream type or the video stream attribute information enables determination whether or not the moving picture decoding method or the moving picture decoding apparatus that is described in each of embodiments can perform decoding. Even when multiplexed data that conforms to a different standard is input, an appropriate decoding method or apparatus can be selected. Thus, it becomes possible to decode information without any error. Furthermore, the moving picture coding method or apparatus, or the moving picture decoding method or apparatus in the present embodiment can be used in the devices and systems described above.

Embodiment 7

Each of the moving picture coding method, the moving picture coding apparatus, the moving picture decoding method, and the moving picture decoding apparatus in each of embodiments is typically achieved in the form of an integrated circuit or a Large Scale Integrated (LSI) circuit.

Figure 31:
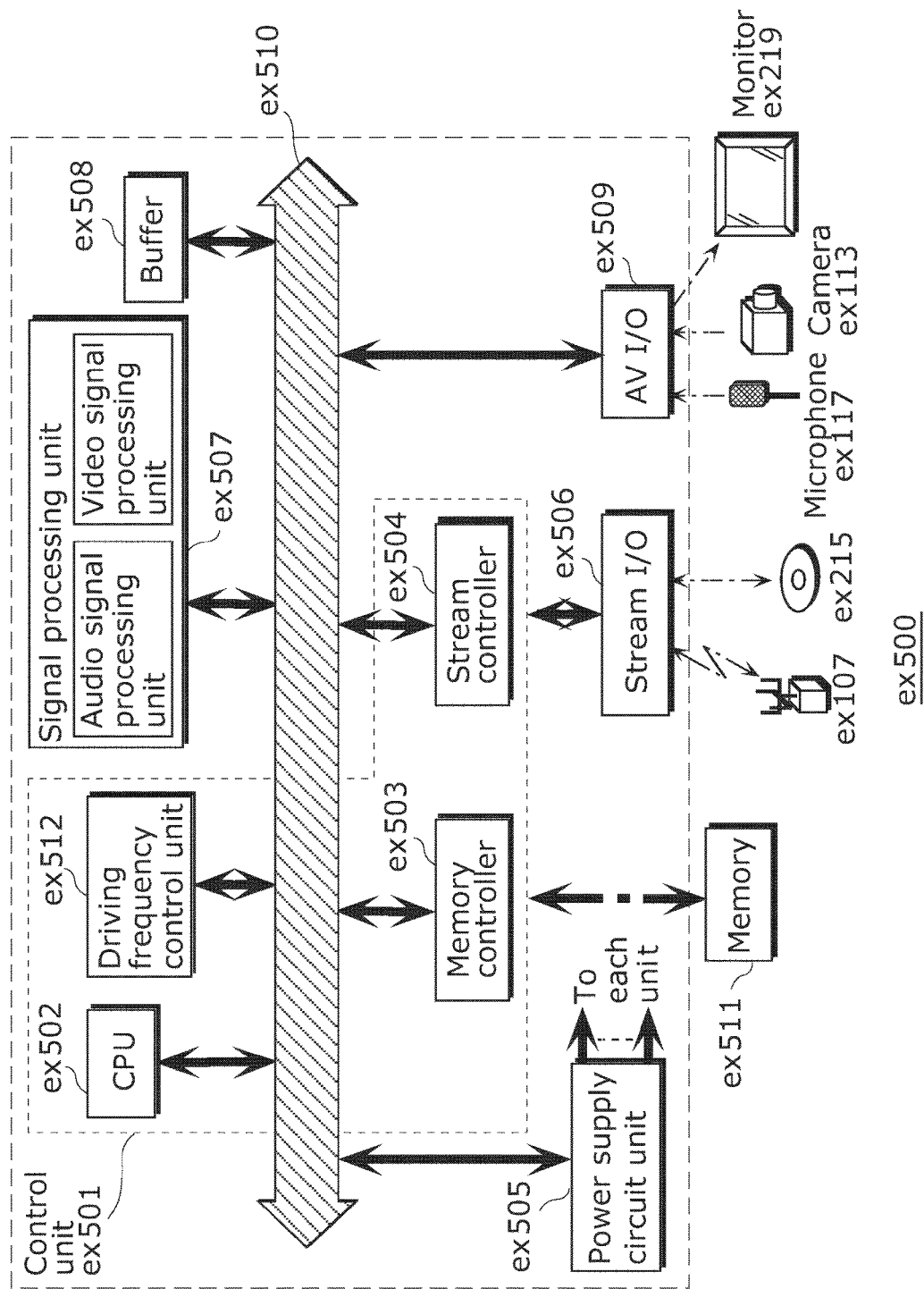
FIG. 31 is a block diagram illustrating an example of a configuration of an integrated circuit for implementing the moving picture coding method and the moving picture decoding method according to each of Embodiments.

As an example of the LSI, FIG. 31 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording medium ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex501 includes the CPU ex502, the memory controller ex503, the stream controller ex504, the driving frequency control unit ex512, the configuration of the control unit ex501 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present disclosure is applied to biotechnology.

Embodiment 8

When video data generated in the moving picture coding method or by the moving picture coding apparatus described in each of embodiments is decoded, compared to when video data that conforms to a conventional standard, such as MPEG-2, MPEG-4 AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

Figure 32:
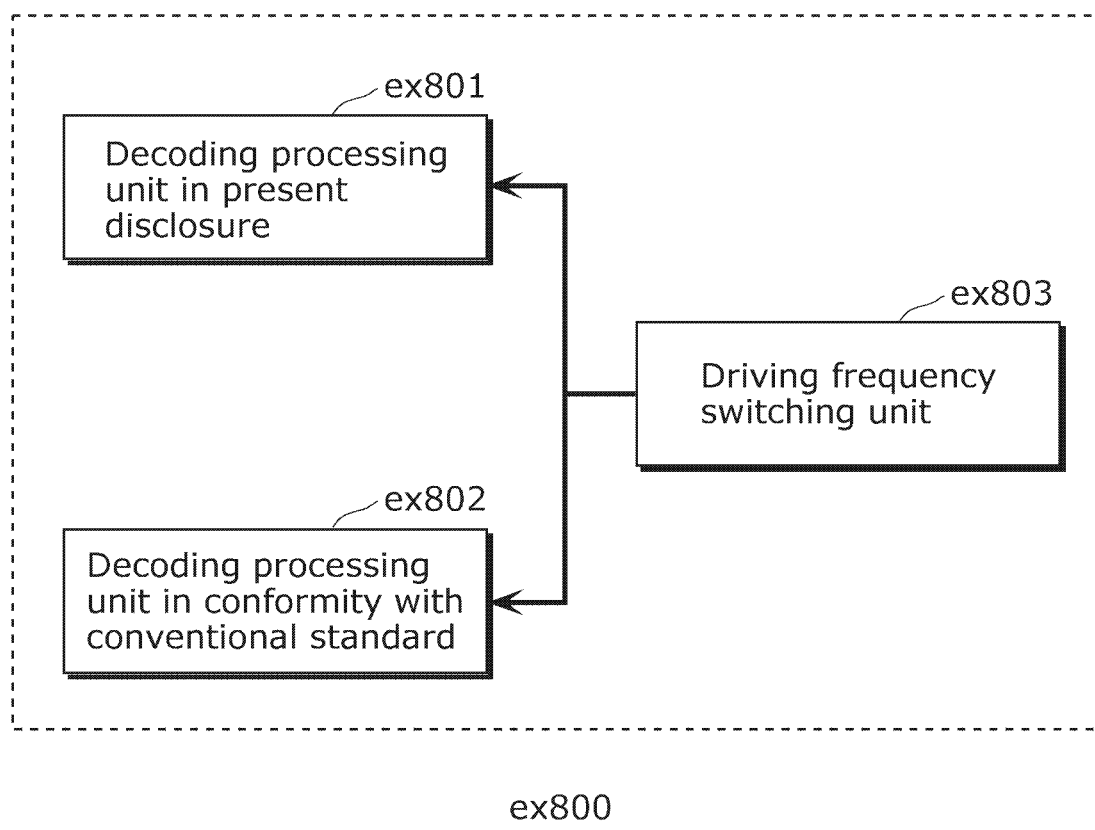
FIG. 32 shows a configuration for switching between driving frequencies.

In order to solve the problem, the moving picture decoding apparatus, such as the television ex300 and the LSI ex500 is configured to determine to which standard the video data conforms, and switch between the driving frequencies according to the determined standard. FIG. 32 illustrates a configuration ex800 in the present embodiment. A driving frequency switching unit ex803 sets a driving frequency to a higher driving frequency when video data is generated by the moving picture coding method or the moving picture coding apparatus described in each of embodiments. Then, the driving frequency switching unit ex803 instructs a decoding processing unit ex801 that executes the moving picture decoding method described in each of embodiments to decode the video data. When the video data conforms to the conventional standard, the driving frequency switching unit ex803 sets a driving frequency to a lower driving frequency than that of the video data generated by the moving picture coding method or the moving picture coding apparatus described in each of embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 31. Here, each of the decoding processing unit ex801 that executes the moving picture decoding method described in each of embodiments and the decoding processing unit ex802 that conforms to the conventional standard corresponds to the signal processing unit ex507 in FIG. 31. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 6 is probably used for identifying the video data. The identification information is not limited to the one described in Embodiment 6 but may be any information as long as the information indicates to which standard the video data conforms. For example, when which standard video data conforms to can be determined based on an external signal for determining that the video data is used for a television or a disk, etc., the determination may be made based on such an external signal. Furthermore, the CPU ex502 selects a driving frequency based on, for example, a look-up table in which the standards of the video data are associated with the driving frequencies as shown in FIG. 34. The driving frequency can be selected by storing the look-up table in the buffer ex508 and in an internal memory of an LSI, and with reference to the look-up table by the CPU ex502.

Figure 33:
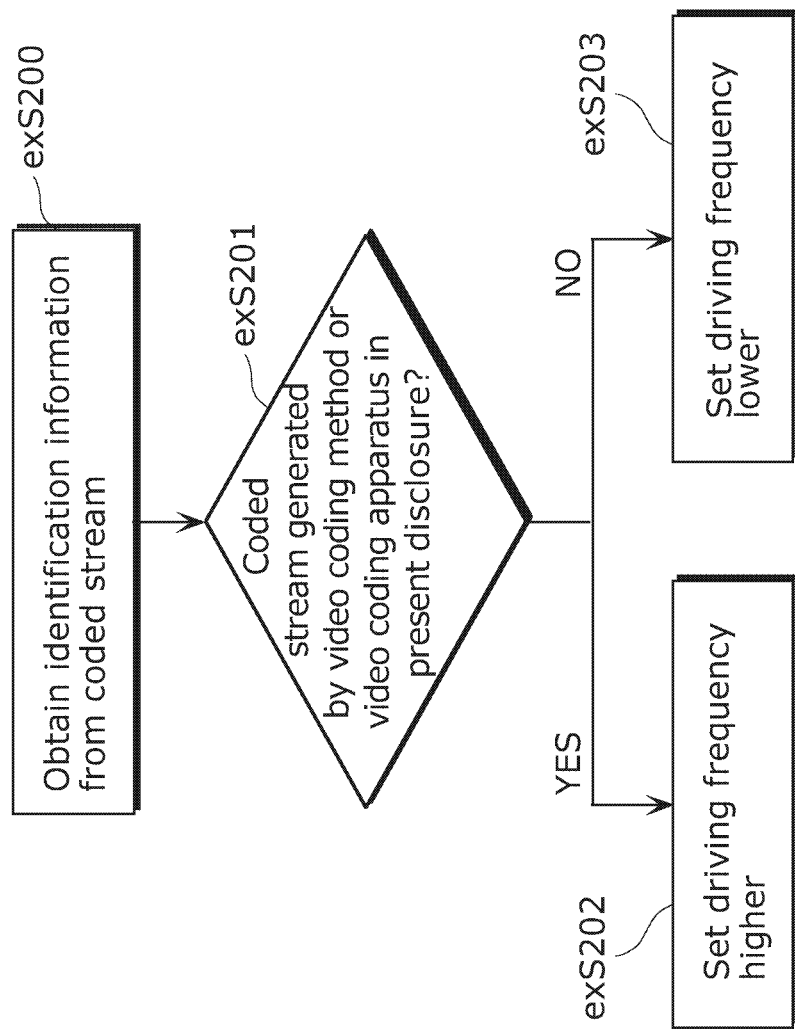
FIG. 33 shows steps for identifying video data and switching between driving frequencies.

FIG. 33 illustrates steps for executing a method in the present embodiment. First, in Step exS200, the signal processing unit ex507 obtains identification information from the multiplexed data. Next, in Step exS201, the CPU ex502 determines whether or not the video data is generated by the coding method and the coding apparatus described in each of embodiments, based on the identification information. When the video data is generated by the moving picture coding method and the moving picture coding apparatus described in each of embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG-4 AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the moving picture coding method and the moving picture coding apparatus described in each of embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG-4 AVC is larger than the processing amount for decoding video data generated by the moving picture coding method and the moving picture coding apparatus described in each of embodiments, the driving frequency is probably set in reverse order to the setting described above.

Furthermore, the method for setting the driving frequency is not limited to the method for setting the driving frequency lower. For example, when the identification information indicates that the video data is generated by the moving picture coding method and the moving picture coding apparatus described in each of embodiments, the voltage to be applied to the LSI ex500 or the apparatus including the LSI ex500 is probably set higher. When the identification information indicates that the video data conforms to the conventional standard, such as MPEG-2, MPEG-4 AVC, and VC-1, the voltage to be applied to the LSI ex500 or the apparatus including the LSI ex500 is probably set lower. As another example, when the identification information indicates that the video data is generated by the moving picture coding method and the moving picture coding apparatus described in each of embodiments, the driving of the CPU ex502 does not probably have to be suspended. When the identification information indicates that the video data conforms to the conventional standard, such as MPEG-2, MPEG-4 AVC, and VC-1, the driving of the CPU ex502 is probably suspended at a given time because the CPU ex502 has extra processing capacity. Even when the identification information indicates that the video data is generated by the moving picture coding method and the moving picture coding apparatus described in each of embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG-4 AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 9

There are cases where a plurality of video data that conforms to different standards, is provided to the devices and systems, such as a television and a cellular phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

Figure 35A:
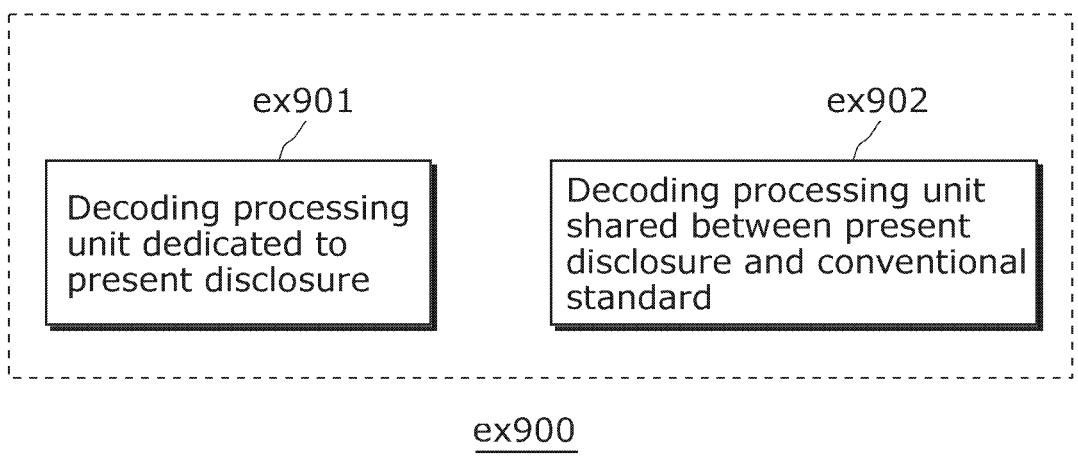
FIG. 35A shows an example of a configuration for sharing a module of a signal processing unit.

In order to solve the problem, what is conceived is a configuration in which the decoding processing unit for implementing the moving picture decoding method described in each of embodiments and the decoding processing unit that conforms to the conventional standard, such as MPEG-2, MPEG-4 AVC, and VC-1 are partly shared. Ex900 in FIG. 35A shows an example of the configuration. For example, the moving picture decoding method described in each of embodiments and the moving picture decoding method that conforms to MPEG-4 AVC have, partly in common, the details of processing, such as entropy coding, inverse quantization, deblocking filtering, and motion compensated prediction. The details of processing to be shared probably include use of a decoding processing unit ex902 that conforms to MPEG-4 AVC. In contrast, a dedicated decoding processing unit ex901 is probably used for other processing unique to an aspect of the present disclosure. Since the aspect of the present disclosure is characterized by inter prediction in particular, for example, the dedicated decoding processing unit ex901 is used for inter prediction. Otherwise, the decoding processing unit is probably shared for one of the entropy decoding, deblocking filtering, and inverse quantization, or all of the processing. The decoding processing unit for implementing the moving picture decoding method described in each of embodiments may be shared for the processing to be shared, and a dedicated decoding processing unit may be used for processing unique to that of MPEG-4 AVC.

Figure 35B:
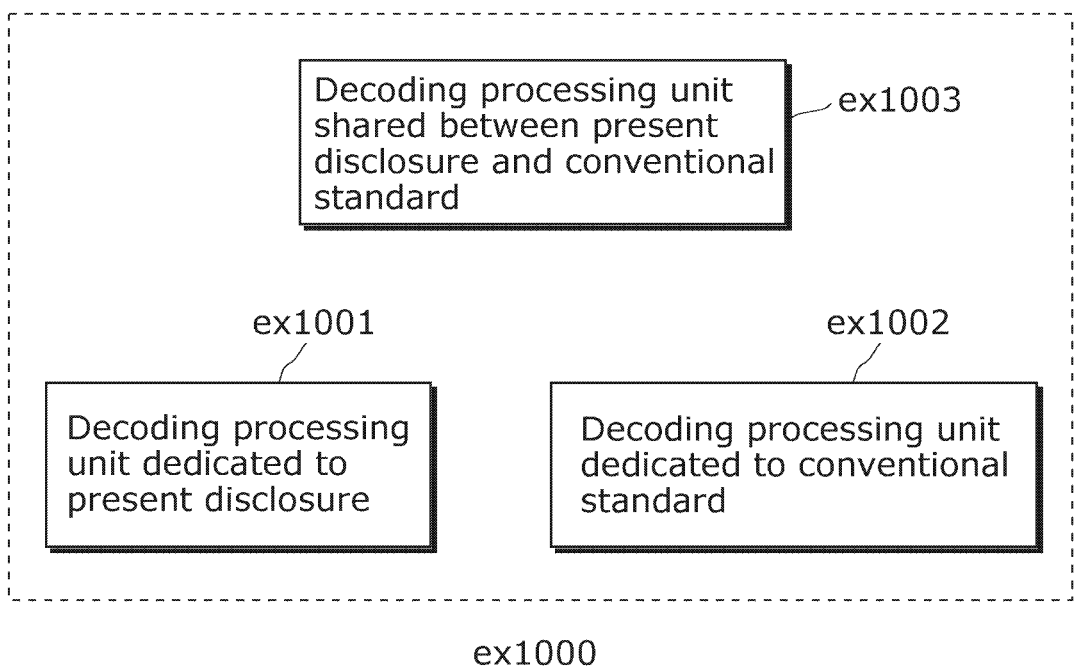
FIG. 35B shows another example of a configuration for sharing a module of a signal processing unit.

Furthermore, ex1000 in FIG. 35B shows another example in that processing is partly shared. This example uses a configuration including a dedicated decoding processing unit ex1001 that supports the processing unique to an aspect of the present disclosure, a dedicated decoding processing unit ex1002 that supports the processing unique to another conventional standard, and a decoding processing unit ex1003 that supports processing to be shared between the moving picture decoding method according to the aspect of the present disclosure and the conventional moving picture decoding method. Here, the dedicated decoding processing units ex1001 and ex1002 are not necessarily specialized for the processing according to the aspect of the present disclosure and the processing of the conventional standard, respectively, and may be the ones capable of implementing general processing. Furthermore, the configuration of the present embodiment can be implemented by the LSI ex500.

As such, reducing the scale of the circuit of an LSI and reducing the cost are possible by sharing the decoding processing unit for the processing to be shared between the moving picture decoding method according to the aspect of the present disclosure and the moving picture decoding method in conformity with the conventional standard.

INDUSTRIAL APPLICABILITY

One or more exemplary embodiments disclosed herein are applicable to a television receiver, a digital video recorder, a car navigation system, a cellular phone, a digital camera, a digital video camera, and the like.

The invention claimed is:
1. An image decoding method of decoding each block among blocks of pictures, the image decoding method comprising:
  selecting a collocated picture from a plurality of referable reference pictures, the collocated picture being different from a current picture that includes a current block to be decoded;
  deriving a candidate for motion vectors of the current block, from a first motion vector of a first block included in the collocated picture;
  adding the derived candidate to a list of motion vector candidates;
  selecting, based on an index, one candidate that includes a second motion vector from the list of motion vector candidates; and
  decoding the current block using (i) the second motion vector included in the selected one candidate and (ii) a reference picture of the current block,
  wherein the deriving includes:
    determining whether a collocated reference picture of the first block is a long-term reference picture or a short-term reference picture, the collocated reference picture being a reference picture referred to by the first block included in the collocated picture;
    determining whether the reference picture of the current block is a long-term reference picture or a short-term reference picture;
    deriving the second motion vector so as to be the same as the first motion vector without scaling based on a temporal distance in the case of determining that (i) the collocated reference picture of the first block is a long-term reference picture and (ii) the reference picture of the current block is a long-term reference picture; and
    deriving the second motion vector from the first motion vector by scaling based on a temporal distance in the case of determining that (i) the collocated reference picture of the first block is a short-term reference picture and (ii) the reference picture of the current block is a short-term reference picture,
  wherein the scaling is based on a ratio of temporal distance calculated by using (i) a difference between a Picture Order Count (POC) assigned to the current picture and the POC assigned to the reference picture and (ii) a difference between the POC assigned to the collocated picture and the POC assigned to the collocated reference picture, and wherein the POC is a sequential number assigned for each of the current picture, the reference picture, the collocated picture, and the collocated reference picture based on display order.

\* \* \* \* \*

UNITED STATES PATENT AND TRADEMARK OFFICE
CERTIFICATE OF CORRECTION

PATENT NO. : 11,115,677 B2  
APPLICATION NO. : 16/813994  
DATED : September 7, 2021  
INVENTOR(S) : Viktor Wahadaniah It is certified that error appears in the above-identified patent and that said Letters Patent is hereby corrected as shown below:

On the Title Page

In Item (56), page 4, Column 1, Lines 22 and 23, "Benjamin Bross et al., High Efficiency Video Coding (HEVC) text specification Meeting; Jan. 2, 2012-Oct. 2, 2012; San Jose; (Joint" should read --Benjamin Bross et al., "High Efficiency Video Coding (HEVC) text specification draft 6"; 8 JCT-VC Meeting, 99. MPEG Meeting; Jan. 2, 2012-Oct. 2, 2012; San Jose; (Joint--

Signed and Sealed this  
Twenty-eighth Day of December, 2021

Drew Hirshfeld  
*Performing the Functions and Duties of the*  
*Under Secretary of Commerce for Intellectual Property and*  
*Director of the United States Patent and Trademark Office*